US012750534B2

(12) United States Patent
Lim et al.

(10) Patent No.: US 12,750,534 B2
(45) **Date of Patent: *Sep. 29, 2026**

(54) IMAGE ENCODING/DECODING METHOD AND DEVICE

(71) Applicants: ELECTRONICS AND TELECOMMUNICATIONS RESEARCH INSTITUTE, Daejeon (KR); INDUSTRY ACADEMY COOPERATION FOUNDATION OF SEJONG UNIVERSITY, Seoul (KR)

(72) Inventors: Sung Chang Lim, Daejeon (KR); Jung Won Kang, Daejeon (KR); Hyun Suk Ko, Daejeon (KR); Jin Ho Lee, Daejeon (KR); Dong San Jun, Daejeon (KR); Ha Hyun Lee, Seoul (KR); Seung Hyun Cho, Daejeon (KR); Hui Yong Kim, Daejeon (KR); Jin Soo Choi, Daejeon (KR); Yung Lyul Lee, Seoul (KR); Jun Woo Choi, Seoul (KR)

(73) Assignees: Electronics and Telecommunications Research Institute, Daejeon (KR); INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/005,435

(22) Filed: Dec. 30, 2024

(65) Prior Publication Data

US 2025/0133239 A1 Apr. 24, 2025

Related U.S. Application Data

(63) Continuation of application No. 18/513,906, filed on Nov. 20, 2023, now Pat. No. 12,225,240, which is a (Continued)

(30) Foreign Application Priority Data

Jul. 13, 2016 (KR) ........................ 10-2016-0088670

(51) Int. Cl.
*H04N 19/91* (2014.01)
*H04N 19/146* (2014.01)
(Continued)

(52) U.S. Cl.
CPC ........... *H04N 19/91* (2014.11); *H04N 19/146* (2014.11); *H04N 19/149* (2014.11);
(Continued)

(58) Field of Classification Search
CPC .... H04N 19/44; H04N 19/149; H04N 19/159; H04N 19/176; H04N 19/91;
(Continued)

(56) References Cited

U.S. PATENT DOCUMENTS 10,142,657 B2 11/2018 Lee
2003/0128753 A1 7/2003 Lee et al.
(Continued)

FOREIGN PATENT DOCUMENTS

CN 105120272 A 12/2015
EP 2 595 380 A1 5/2013
(Continued)

OTHER PUBLICATIONS

An, Jicheng., et al. "Non-CE7: Boundary-Dependent Transform for Inter-Predicted Residue" document JCTVC-G281, Joint Collaborative Team on Video Coding (JCT-VC) of ITUT SG16 WP3 and ISO. IEC JTC1/SC29/WG11, 7th Meeting, Geneva, Switzerland, 2011. (11 pages in English).
(Continued)

*Primary Examiner* — Asmamaw G Tarko
(74) *Attorney, Agent, or Firm* — NSIP Law

(57) ABSTRACT

The present invention relates to an image encoding/decoding method and apparatus. An image encoding method accord-
(Continued)

ing to the present invention may comprise generating a transform block by performing at least one of transform and quantization; grouping at least one coefficient included in the transform block into at least one coefficient group (CG); scanning at least one coefficient included in the coefficient group; and encoding the at least one coefficient.

20 Claims, 37 Drawing Sheets

Related U.S. Application Data continuation of application No. 16/308,208, filed as application No. PCT/KR2017/007363 on Jul. 10, 2017, now Pat. No. 11,863,798.

(51) Int. Cl.
*H04N 19/149* (2014.01)
*H04N 19/159* (2014.01)
*H04N 19/176* (2014.01)
*H04N 19/182* (2014.01)
*H04N 19/44* (2014.01)

(52) U.S. Cl.
CPC ......... *H04N 19/159* (2014.11); *H04N 19/176* (2014.11); *H04N 19/182* (2014.11); *H04N 19/44* (2014.11)

(58) Field of Classification Search
CPC .. H04N 19/129; H04N 19/136; H04N 19/146; H04N 19/167; H04N 19/18; H04N 19/182; H04N 19/649; H04N 19/88; Y02P 90/30
USPC .......................................................... 375/240
See application file for complete search history.

(56) References Cited

U.S. PATENT DOCUMENTS

| | | | | |
|---|---|---|---|---|
| 2008/0310504 | A1 | 12/2008 | Ye et al. | |
| 2009/0097571 | A1 | 4/2009 | Yamada et al. | |
| 2009/0232204 | A1 | 9/2009 | Lee et al. | |
| 2012/0170649 | A1 | 7/2012 | Chen et al. | |
| 2012/0230420 | A1 | 9/2012 | Pojals et al. | |
| 2013/0003855 | A1 | 1/2013 | Park et al. | |
| 2013/0114730 | A1 | 5/2013 | Joshi et al. | |
| 2013/0128985 | A1 | 5/2013 | He et al. | |
| 2014/0056361 | A1 | 2/2014 | Karczewicz et al. | |
| 2014/0126629 | A1 | 5/2014 | Park et al. | |
| 2014/0254661 | A1 | 9/2014 | Saxena et al. | |
| 2014/0307788 | A1* | 10/2014 | Lim | H04N 19/52 375/240.12 |
| 2015/0078432 | A1 | 3/2015 | Wang et al. | |
| 2015/0131739 | A1 | 5/2015 | Lee et al. | |
| 2016/0198185 | A1 | 7/2016 | Oh et al. | |
| 2016/0219290 | A1 | 7/2016 | Zhao et al. | |
| 2017/0094314 | A1* | 3/2017 | Zhao | H04N 19/176 |

FOREIGN PATENT DOCUMENTS

| | | | |
|---|---|---|---|
| KR | 10-2003-0081469 | A | 10/2003 |
| KR | 10-2013-0129462 | A | 11/2013 |
| KR | 10-2061201 | B1 | 12/2019 |
| WO | WO 2008/157431 | A2 | 12/2008 |
| WO | WO 2012/122284 | A1 | 9/2012 |

OTHER PUBLICATIONS

Chen, Jianle., et al. "Algorithm Description of Joint Exploration Test Model 3", Joint Video Exploration Team (JVET) of ITU-T SG 16 WP 3 and ISO/IEC JTC 1/SC 29/WG 11, 3rd Meeting: Geneva, CH, 26 May-Jun. 1, 2016. (37 pages in English).

International Search Report issued on Oct. 24, 2017, in corresponding International Application No. PCT/KR2017/007363. (5 pages in Korean, 5 pages in English).

Korean Office Action issued on Mar. 30, 2022, in counterpart Korean Patent Application No. 10-2021-0176678.

Rapaka. K., et al. "Non Square TU Partitioning" Document: JVET-B0047, Joint Video Exploration Team (JVET) of ITU-T SG 16 WP 3 and ISO/IEC JTC 1/SC 29/WG 11, 2nd Meeting: San Diego, USA, Feb. 20-26, 2016. (3 pages in English).

U.S. Appl. No. 16/308,208, filed Dec. 7, 2018, Sung Change Lim et al., Electronics and Telecommunications Research Institute et al.

U.S. Appl. No. 18/513,906, filed Nov. 20, 2023, Sung Change Lim et al., Electronics and Telecommunications Research Institute et al.

* cited by examiner

FIG. 7

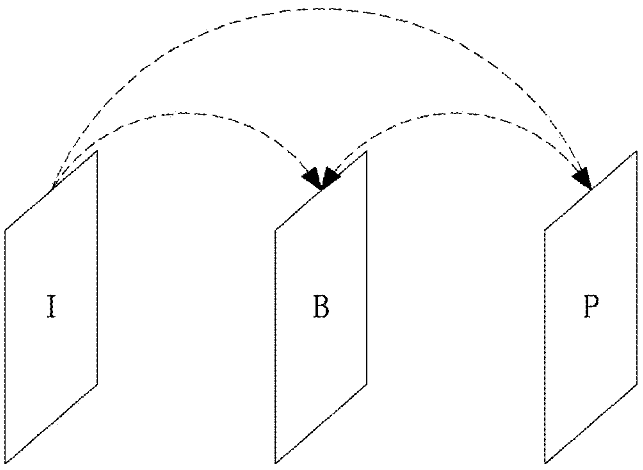

FIG. 8

| Intra Prediction Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| vertical direction transform set | 2 | 1 | 0 | 1 | 0 | 1 | 0 | 1 | 0 | 1 | 0 | 1 | 0 | 1 | 0 | 0 | 0 | 0 |
| horizontal direction transform set | 2 | 1 | 0 | 1 | 0 | 1 | 0 | 1 | 0 | 1 | 0 | 1 | 0 | 1 | 2 | 2 | 2 | 2 |
| Intra Prediction Mode | 18 | 19 | 20 | 21 | 22 | 23 | 24 | 25 | 26 | 27 | 28 | 29 | 30 | 31 | 32 | 33 | 34 | |
| vertical direction transform set | 0 | 0 | 0 | 0 | 0 | 1 | 0 | 1 | 0 | 1 | 0 | 1 | 0 | 1 | 0 | 1 | 0 | |
| horizontal direction transform set | 2 | 2 | 2 | 2 | 2 | 1 | 0 | 1 | 0 | 1 | 0 | 1 | 0 | 1 | 0 | 1 | 0 | |
| Intra Prediction Mode | 35 | 36 | 37 | 38 | 39 | 40 | 41 | 42 | 43 | 44 | 45 | 46 | 47 | 48 | 49 | 50 | 51 | 52 |
| vertical direction transform set | 1 | 0 | 1 | 0 | 1 | 0 | 1 | 0 | 1 | 0 | 1 | 2 | 2 | 2 | 2 | 2 | 2 | 2 |
| horizontal direction transform set | 1 | 0 | 1 | 0 | 1 | 0 | 1 | 0 | 1 | 0 | 1 | 0 | 0 | 0 | 0 | 0 | 0 | 0 |
| Intra Prediction Mode | 53 | 54 | 55 | 56 | 57 | 58 | 59 | 60 | 61 | 62 | 63 | 64 | 65 | 66 | | | | |
| vertical direction transform set | 2 | 2 | 1 | 0 | 1 | 0 | 1 | 0 | 1 | 0 | 1 | 0 | 1 | 0 | | | | |
| horizontal direction transform set | 0 | 0 | 1 | 0 | 1 | 0 | 1 | 0 | 1 | 0 | 1 | 0 | 1 | 0 | | | | |

FIG. 14

| | | | | | | | |
|---|---|---|---|---|---|---|---|
| 9.76 | 9.62 | 9.6 | 9.86 | 9.81 | 10 | 9.85 | 10.1 |
| 9.74 | 9.68 | 9.44 | 9.68 | 9.59 | 9.74 | 9.64 | 9.91 |
| 9.82 | 9.65 | 9.3 | 9.49 | 9.27 | 9.5 | 9.5 | 9.86 |
| 9.79 | 9.63 | 9.26 | 9.46 | 9.27 | 9.61 | 9.58 | 10.1 |
| 9.78 | 9.79 | 9.44 | 9.43 | 9.26 | 9.54 | 9.46 | 9.87 |
| 9.68 | 9.8 | 9.48 | 9.48 | 9.26 | 9.6 | 9.41 | 9.72 |
| 9.75 | 9.78 | 9.47 | 9.52 | 9.36 | 9.63 | 9.42 | 9.67 |
| 9.93 | 9.87 | 9.63 | 9.77 | 9.62 | 9.7 | 9.5 | 9.87 |

| | | | | | | | |
|---|---|---|---|---|---|---|---|
| 9.76 | 9.62 | 9.6 | 9.86 | 9.81 | 10 | 9.85 | 10.1 |
| 9.74 | 9.68 | 9.44 | 9.68 | 9.59 | 9.74 | 9.64 | 9.91 |
| 9.82 | 9.65 | 9.3 | 9.49 | 9.27 | 9.5 | 9.5 | 9.86 |
| 9.79 | 9.63 | 9.26 | 9.46 | 9.27 | 9.61 | 9.58 | 10.1 |
| 9.78 | 9.79 | 9.44 | 9.43 | 9.26 | 9.54 | 9.46 | 9.87 |
| 9.68 | 9.8 | 9.48 | 9.48 | 9.26 | 9.6 | 9.41 | 9.72 |
| 9.75 | 9.78 | 9.47 | 9.52 | 9.36 | 9.63 | 9.42 | 9.67 |
| 9.93 | 9.87 | 9.63 | 9.77 | 9.62 | 9.7 | 9.5 | 9.87 |

FIG. 18

| | | | |
|---|---|---|---|
| a(0,0) | a(1,0) | a(2,0) | a(3,0) |
| a(0,1) | a(1,1) | a(2,1) | a(3,1) |
| a(0,2) | a(1,2) | a(2,2) | a(3,2) |
| a(0,3) | a(1,3) | a(2,3) | a(3,3) |

(a) before rearrangement

| | | | |
|---|---|---|---|
| a(3,3) | a(3,2) | a(3,1) | a(3,0) |
| a(2,3) | a(2,2) | a(2,1) | a(2,0) |
| a(1,3) | a(1,2) | a(1,1) | a(1,0) |
| a(0,3) | a(0,2) | a(0,1) | a(0,0) |

(b) after rearrangement

| | | | |
|---|---|---|---|
| a'(0,0) | a'(1,0) | a'(2,0) | a'(3,0) |
| a'(0,1) | a'(1,1) | a'(2,1) | a'(3,1) |
| a'(0,2) | a'(1,2) | a'(2,2) | a'(3,2) |
| a'(0,3) | a'(1,3) | a'(2,3) | a'(3,3) |

(c) rearranged data

FIG. 20

| | | | | | | | |
|---|---|---|---|---|---|---|---|
| 45 | 20 | 23 | 10 | 16 | 20 | 9 | 60 |
| 40 | 12 | 10 | 12 | 10 | 15 | 30 | 45 |
| 20 | 8 | 8 | 10 | 10 | 10 | 20 | 30 |
| 16 | 10 | 4 | 5 | 10 | 10 | 20 | 30 |
| 8 | 3 | 1 | 2 | 7 | 5 | 8 | 10 |
| 10 | 15 | 10 | 8 | 8 | 16 | 18 | 40 |
| 40 | 30 | 15 | 10 | 19 | 27 | 30 | 40 |
| 60 | 39 | 15 | 10 | 25 | 28 | 35 | 60 |

| | | | | | | | |
|---|---|---|---|---|---|---|---|
| 63 | 65 | 16 | 10 | 86 | 87 | 19 | −9 |
| 60 | 60 | 12 | 10 | 81 | 83 | 21 | −12 |
| 3 | 1 | −6 | 1 | 1 | 5 | 9 | −10 |
| 0 | −2 | −4 | 1 | −5 | −3 | 5 | −5 |
| 69 | 66 | 5 | −3 | 94 | 91 | 11 | −8 |
| 64 | 62 | 7 | −2 | 86 | 83 | 11 | −6 |
| 0 | 2 | 6 | 1 | −5 | −4 | 3 | 4 |
| 1 | 2 | 2 | 1 | −6 | −8 | −6 | 4 |

| | | | | | | | |
|---|---|---|---|---|---|---|---|
| 72 | −6 | 6 | 4 | 94 | −19 | 24 | −7 |
| −11 | 1 | 0 | −5 | 10 | 1 | −8 | 11 |
| 19 | 1 | −4 | 2 | 8 | −1 | 10 | −6 |
| −8 | 5 | 0 | 1 | 10 | −2 | −4 | 3 |
| 87 | −16 | 5 | 5 | 108 | −4 | 18 | −3 |
| −23 | 12 | −2 | 0 | −9 | −2 | −2 | −1 |
| 0 | −6 | 3 | 0 | −1 | 0 | 3 | 2 |
| 3 | −4 | 2 | −1 | −6 | 9 | −4 | 4 |

FIG. 23a

| | | | | | | | |
|---|---|---|---|---|---|---|---|
| 63 | 62 | 61 | 60 | 59 | 58 | 57 | 56 |
| 36 | 35 | 34 | 33 | 32 | 31 | 30 | 55 |
| 37 | 16 | 15 | 14 | 13 | 12 | 29 | 54 |
| 38 | 17 | 4 | 3 | 2 | 11 | 28 | 53 |
| 39 | 18 | 5 | 0 | 1 | 10 | 27 | 52 |
| 40 | 19 | 6 | 7 | 8 | 9 | 26 | 51 |
| 41 | 20 | 21 | 22 | 23 | 24 | 25 | 50 |
| 42 | 43 | 44 | 45 | 46 | 47 | 48 | 49 |

FIG. 23b

| | | | | | | | |
|---|---|---|---|---|---|---|---|
| 60 | 61 | 52 | 53 | 48 | 49 | 40 | 41 |
| 62 | 63 | 54 | 55 | 50 | 51 | 42 | 43 |
| 56 | 57 | 0 | 1 | 2 | 3 | 16 | 18 |
| 58 | 59 | 4 | 5 | 6 | 7 | 17 | 19 |
| 44 | 45 | 8 | 9 | 10 | 11 | 20 | 21 |
| 46 | 47 | 12 | 13 | 14 | 15 | 22 | 23 |
| 36 | 37 | 24 | 25 | 28 | 29 | 32 | 33 |
| 38 | 39 | 26 | 27 | 30 | 31 | 34 | 35 |

FIG. 23c

| | | | | | | | |
|---|---|---|---|---|---|---|---|
| 0 | 2 | 3 | 9 | 10 | 20 | 21 | 35 |
| 1 | 4 | 8 | 11 | 19 | 22 | 34 | 36 |
| 5 | 7 | 12 | 18 | 23 | 33 | 37 | 48 |
| 6 | 13 | 17 | 24 | 32 | 38 | 47 | 49 |
| 14 | 16 | 25 | 31 | 39 | 46 | 50 | 57 |
| 15 | 26 | 30 | 40 | 45 | 51 | 56 | 58 |
| 27 | 29 | 41 | 44 | 52 | 55 | 59 | 62 |
| 28 | 42 | 43 | 53 | 54 | 60 | 61 | 63 |

(a)

| | | | | | | | |
|---|---|---|---|---|---|---|---|
| 6.58 | 5.1 | 4.42 | 3.44 | 2.35 | 1.68 | 1.04 | 1.12 |
| 5.03 | 4.26 | 3.43 | 2.66 | 1.84 | 1.26 | 0.76 | 0.56 |
| 4.56 | 3.26 | 2.85 | [illegible] | 1.53 | 0.99 | 0.65 | 0.45 |
| 3.21 | 2.68 | 2.2 | 1.81 | 1.12 | 0.83 | 0.55 | 0.36 |
| 1.98 | 1.6 | 1.45 | 1.14 | 1.02 | 0.77 | 0.47 | 0.22 |
| 1.46 | 1.26 | 1.05 | 0.95 | 0.87 | 0.65 | 0.32 | 0.14 |
| 1.14 | 0.93 | 0.88 | 0.83 | 0.75 | 0.47 | 0.22 | 0.09 |
| 1.01 | 0.87 | 0.81 | 0.76 | 0.57 | 0.33 | 0.14 | 0.06 |

(b)

(a) (b) (c)

IMAGE ENCODING/DECODING METHOD AND DEVICE

CROSS-REFERENCE TO RELATED APPLICATIONS

This application is a Continuation Application of U.S. patent application Ser. No. 18/513,906 filed on Nov. 20, 2023, which is a Continuation Application of U.S. patent application Ser. No. 16/308,208, filed on Dec. 7, 2018, now U.S. Pat. No. 11,863,798 issued on Jan. 2, 2024, which is a U.S. National Stage Application of International Application No. PCT/KR2017/007363, filed on Jul. 10, 2017, which claims the benefit under 35 USC 119(a) and 365(b) of Korean Patent Application No. 10-2016-0088670, filed on Jul. 13, 2016, in the Korean Intellectual Property Office.

TECHNICAL FIELD

The present invention relates to a method and apparatus for encoding and decoding an image. More particularly, the present invention relates to a method and apparatus for encoding and decoding an image using scanning.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

DISCLOSURE

Technical Problem

An object of the present invention is to provide a method and apparatus for encoding and decoding an image efficiently.

Technical Solution

An image encoding method according to the present invention may comprise: generating a transform block by performing at least one of transform and quantization; grouping at least one coefficient included in the transform block into at least one coefficient group (CG); scanning at least one coefficient included in the coefficient group; and encoding the at least one coefficient.

In the image encoding method of the present invention, the scanning may be at least one of diagonal directional scanning based on a transform block, zigzag directional scanning based on a transform block, and boundary scanning.

In the image encoding method of the present invention, when the scanning is the diagonal directional scanning based on the transform block, the scanning may be performed with an order from a position of a right lower AC coefficient to a position of a DC coefficient of the transform block, or with an order from the position of the DC coefficient to the position of the right lower AC coefficient of the transform block, the diagonal direction may be a down-left diagonal direction or an up-right diagonal direction, and each of the at least one CG may include a predetermined number of coefficients consecutive in a scanning order.

In the image encoding method of the present invention, when the scanning is the zigzag directional scanning based on the transform block, the scanning may be performed in a zigzag direction with an order from a position of a right lower AC coefficient to a position of a DC coefficient of the transform block, or with an order from the position of the DC coefficient to the position of the right lower AC coefficient of the transform block, and each of the at least one CG may include a predetermined number of coefficients consecutive in a scanning order.

In the image encoding method of the present invention, when the scanning is the boundary scanning, first scanning may be applied to a first CG including a DC coefficient among the at least one CG, second scanning may be applied to a remaining CG, and each of the at least one CG may have a size or a shape different from other CG.

In the image encoding method of the present invention, the first scanning may be zigzag scanning, and the second scanning may be at least one of horizontal scanning and vertical scanning.

In the image encoding method of the present invention, the method may further comprise: specifying a predetermined area of the transform block, wherein at least one of the scanning, the grouping and the encoding may not be performed for coefficients included in the predetermined area.

In the image encoding method of the present invention, the predetermined area may be specified based on a coordinate of a coefficient within the transform block.

In the image encoding method of the present invention, when the transform block is a rectangle, the scanning may be zigzag scanning, and the zigzag scanning may be zigzag scanning inclined to a side that is longer among a width and a length of the transform block.

An image decoding method according to the present invention may comprise: identifying scanning information about scanning at least one coefficient included in a transform block, or grouping information about grouping, based on the scanning, the at least one coefficient into at least one coefficient group (CG); decoding, from a bitstream, at least one coefficient included in the transform block; and reconstructing the transform block based on the at least one coefficient, wherein the decoding of the at least one coefficient may be performed based on at least one of the scanning information and the grouping information.

In the image decoding method of the present invention, the scanning may be at least one of diagonal directional scanning based on a transform block, zigzag directional scanning based on a transform block, and boundary scanning.

In the image decoding method of the present invention, when the scanning is the diagonal directional scanning based on the transform block, the scanning may be performed with an order from a position of a right lower AC coefficient to a position of a DC coefficient of the transform block, or with an order from the position of the DC coefficient to the position of the right lower AC coefficient of the transform block, the diagonal direction may be a down-left diagonal direction or an up-right diagonal direction, and each of the at least one CG may include a predetermined number of coefficients consecutive in the scanning order.

In the image decoding method of the present invention, when the scanning is the zigzag direction scanning based on the transform block, the scanning may be performed in a zigzag direction with an order from a position of a right lower AC coefficient to a position of a DC coefficient of the transform block, or with an order from the position of the DC coefficient to the position of the right lower AC coefficient of the transform block, and each of the at least one CG may include a predetermined number of coefficients consecutive in the scanning order.

In the image decoding method of the present invention, when the scanning is the boundary scanning, first scanning may be applied to a first CG including a DC coefficient among the at least one CG, second scanning may be applied to a remaining CG, and each of the at least one CG may have a size or a shape different from other CG.

In the image decoding method of the present invention, the first scanning may be zigzag scanning, and the second scanning may be at least one of horizontal scanning and vertical scanning.

In the image decoding method of the present invention, the method may further comprise: specifying a predetermined area of the transform block, wherein coefficients included in the predetermined area may be set to 0.

In the image decoding method of the present invention, the predetermined area may be specified based on a coordinate of a coefficient within the transform block.

In the image decoding method of the present invention, when the transform block is a rectangle, the scanning may be zigzag scanning, and the zigzag scanning may be zigzag scanning inclined to a side that is longer among a width and a length of the transform block.

An image encoding apparatus according to the present invention may comprise an encoding unit, wherein the encoding unit may generate a transform block by performing at least one of transform and quantization, group at least one coefficient included in the transform block into at least one coefficient group (CG), scan at least one coefficient included in the coefficient group, and encode the at least one coefficient.

A recoding medium according to the present invention may store a bitstream generated by an image encoding method, wherein the image encoding method may comprise: generating a transform block by performing at least one of transform and quantization; grouping at least one coefficient included in the transform block into at least one coefficient group (CG); scanning at least one coefficient included in the coefficient group; and encoding the at least one coefficient.

Advantageous Effects

According to the present invention, encoding/decoding efficiency of an image can be enhanced.

According to the present invention, an amount of bit required for encoding coefficients in a TU can be reduced.

DESCRIPTION OF DRAWINGS

FIG. 7 is a view for explaining an embodiment of a process of inter prediction.

FIG. 8 is a view for explaining transform sets according to intra-prediction modes.

FIG. 14 is a view showing distribution of average residual values according to the position in a 2N×2N prediction unit (PU) of a 8×8 coding unit (CU) that is predicted in an inter mode of the Cactus sequence according to the present invention.

FIG. 18 is a view showing an example of rearrangement of 4×4 residual data of sub-blocks according to the present invention.

FIG. 20 is a view showing results of performing DCT-2 and SDST based on a residual signal distribution of a 2N×2N prediction unit (PU) according to the present invention.

FIG. 23A, FIG. 23B, and FIG. 23C are views showing scanning order and rearranging order for a residual signal of a transform unit (TU) having the depth of zero in the prediction unit (PU) according to the present invention.

MODE FOR INVENTION

Figure 1:
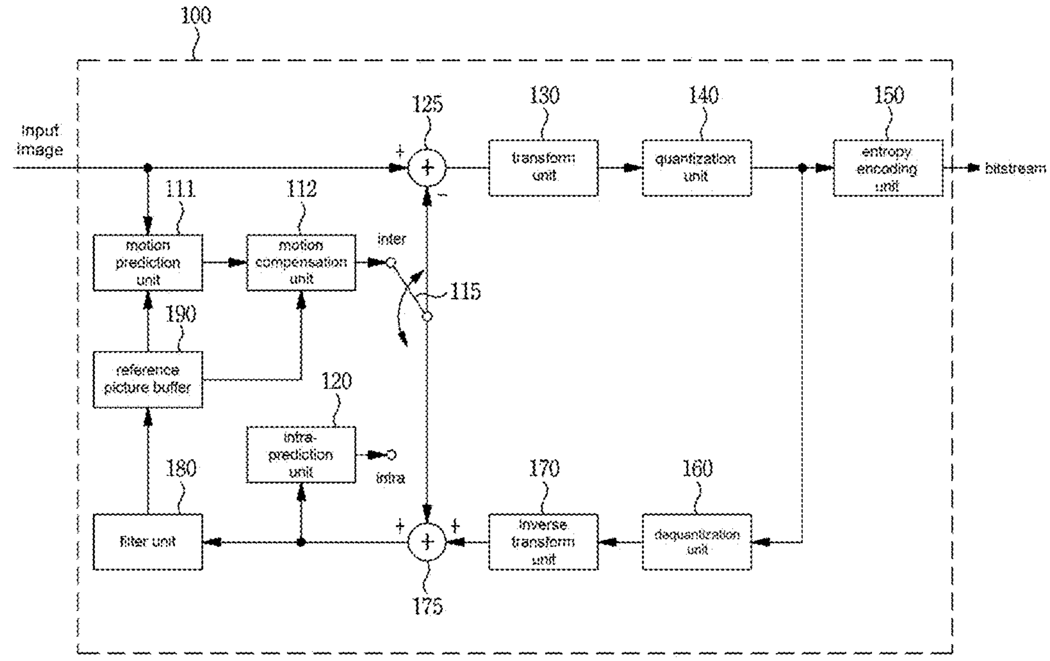
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a picture configuring a video, or may mean the video itself. For example, "encoding or decoding or both of an image" may mean "encoding or decoding or both of a video", and may mean "encoding or decoding or both of one image among images of a video." Here, a picture and the image may have the same meaning.

Term Description

Encoder: may mean an apparatus performing encoding.

Decoder: may mean an apparatus performing decoding.

Parsing: may mean determination of a value of a syntax element by performing entropy decoding, or may mean the entropy decoding itself.

Block: may mean a sample of an MxN matrix. Here, M and N are positive integers, and the block may mean a sample matrix in a two-dimensional form.

Sample: is a basic unit of a block, and may indicate a value ranging 0 to 2 Bd−1 depending on the bit depth (Bd). The sample may mean a pixel in the present invention.

Unit: may mean a unit of encoding and decoding of an image. In encoding and decoding an image, the unit may be an area generated by partitioning one image. In addition, the unit may mean a subdivided unit when one image is partitioned into subdivided units during encoding or decoding. In encoding and decoding an image, a predetermined process for each unit may be performed. One unit may be partitioned into sub units that have sizes smaller than the size of the unit. Depending on functions, the unit may mean a block, a macroblock, a coding tree unit, a coding tree block, a coding unit, a coding block, a prediction unit, a prediction block, a transform unit, a transform block, etc. In addition, in order to distinguish a unit from a block, the unit may include a luma component block, a chroma component block of the luma component block, and a syntax element of each color component block. The unit may have various sizes and shapes, and particularly, the shape of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Reconstructed Neighbor Unit: may mean a reconstructed unit that is previously spatially/temporally encoded or decoded, and the reconstructed unit is adjacent to an encoding/decoding target unit. Here, a reconstructed neighbor unit may mean a reconstructed neighbor block.

Neighbor Block: may mean a block adjacent to an encoding/decoding target block. The block adjacent to the encoding/decoding target block may mean a block having a boundary being in contact with the encoding/decoding target block. The neighbor block may mean a block located at an adjacent vertex of the encoding/decoding target block. The neighbor block may mean a reconstructed neighbor block.

Unit Depth: may mean a partitioned degree of a unit. In a tree structure, a root node may be the highest node, and a leaf node may be the lowest node.

Symbol: may mean a syntax element of the encoding/decoding target unit, a coding parameter, a value of a transform coefficient, etc.

Parameter Set: may mean header information in a structure of the bitstream. The parameter set may include at least one of a video parameter set, a sequence parameter set, a picture parameter set, or an adaptation parameter set. In addition, the parameter set may mean slice header information and tile header information, etc.

Bitstream: may mean a bit string including encoded image information.

Prediction Unit: may mean a basic unit when performing inter prediction or intra prediction, and compensation for the prediction. One prediction unit may be partitioned into a plurality of partitions. In this case, each of the plurality of partitions may be a basic unit while performing the predictions and the compensation, and each partition partitioned from the prediction unit may be a prediction unit. In addition, one prediction unit may be partitioned into a plurality of small prediction units. A prediction unit may have various sizes and shapes, and particularly, the shape of the prediction unit may be a two-dimensional geometrical figure such as a rectangular shape, a square shape, a trapezoid shape, a triangular shape, a pentagonal shape, etc.

Prediction Unit Partition: may mean the shape of a partitioned prediction unit.

Reference Picture List: may mean a list including at least one reference picture that is used for inter prediction or motion compensation. Types of the reference picture list may be List Combined (LC), List 0 (L0), List 1 (L1), List 2 (L2), List 3 (L3), etc. At least one reference picture list may be used for inter prediction.

Inter-Prediction Indicator: may mean one of the inter-prediction direction (one-way directional prediction, bidirectional prediction, etc.) of an encoding/decoding target block in a case of inter prediction, the number of reference pictures used for generating a prediction block by the encoding/decoding target block, and the number of reference blocks used for performing inter prediction or motion compensation by the encoding/decoding target block.

Reference Picture Index: may mean an index of a specific reference picture in the reference picture list.

Reference Picture: may mean a picture to which a specific unit refers for inter prediction or motion compensation. A reference image may be referred to as the reference picture.

Motion Vector: is a two-dimensional vector used for inter prediction or motion compensation, and may mean an offset between an encoding/decoding target picture and the reference picture. For example, (mvX, mvY) may indicate the motion vector, mvX may indicate a horizontal component, and mvY may indicate a vertical component.

Motion Vector Candidate: may mean a unit that becomes a prediction candidate when predicting the motion vector, or may mean a motion vector of the unit.

Motion Vector Candidate List: may mean a list configured by using the motion vector candidate.

Motion Vector Candidate Index: may mean an indicator that indicates the motion vector candidate in the motion vector candidate list. The motion vector candidate index may be referred to as an index of a motion vector predictor.

Motion Information: may mean the motion vector, the reference picture index, and inter-prediction indicator as well as information including at least one of reference picture list information, the reference picture, the motion vector candidate, the motion vector candidate index, etc.

Merge Candidate List: may mean a list configured by using the merge candidate.

Merge Candidate: may include a spatial merge candidate, a temporal merge candidate, a combined merge candidate, a combined bi-prediction merge candidate, a zero merge candidate, etc. The merge candidate may include motion information such as prediction type information, a reference picture index for each list, a motion vector, etc.

Merge Index: may mean information indicating the merge candidate in the merge candidate list. In addition, the merge index may indicate a block, which derives the merge candidate, among reconstructed blocks spatially/temporally adjacent to the current block. In addition, the merge index may indicate at least one of pieces of motion information of the merge candidate.

Transform Unit: may mean a basic unit when performing encoding/decoding of a residual signal, similar to transform, inverse transform, quantization, dequantization, and transform coefficient encoding/decoding. One transform unit may be partitioned into a plurality of small transform units. The transform unit may have various sizes and shapes. Particularly, the shape of the transform unit may be a two-dimensional geometrical figure such as a rectangular shape, a square shape, a trapezoid shape, a triangular shape, a pentagonal shape, etc.

Scaling: may mean a process of multiplying a factor to a transform coefficient level, and as a result, a transform coefficient may be generated. The scaling may be also referred to as dequantization.

Quantization Parameter: may mean a value used in scaling the transform coefficient level during quantization and dequantization. Here, the quantization parameter may be a value mapped to a step size of the quantization.

Delta Quantization Parameter: may mean a difference value between a predicted quantization parameter and a quantization parameter of the encoding/decoding target unit.

Scan: may mean a method of sorting coefficient orders within a block or a matrix. For example, sorting a two-dimensional matrix into a one-dimensional matrix may be referred to as scanning, and sorting a one-dimensional matrix into a two-dimensional matrix may be referred to as scanning or inverse scanning.

Transform Coefficient: may mean a coefficient value generated after performing a transform. In the present invention, a quantized transform coefficient level that is a transform coefficient to which the quantization is applied may be referred to as the transform coefficient.

Non-zero Transform Coefficient: may mean a transform coefficient in which a value thereof is not 0, or may mean a transform coefficient level in which a value thereof is not 0.

Quantization Matrix: may mean a matrix used in quantization and dequantization in order to enhance subject quality or object quality of an image. The quantization matrix may be referred to as a scaling list.

Quantization Matrix Coefficient: may mean each element of a quantization matrix. The quantization matrix coefficient may be referred to as a matrix coefficient.

Default Matrix: may mean a predetermined quantization matrix that is defined in the encoder and the decoder in advance.

Non-default Matrix: may mean a quantization matrix that is transmitted/received by a user without being previously defined in the encoder and the decoder.

Coding Tree Unit: may be composed of one luma component (Y) coding tree unit and related two chroma components (Cb, Cr) coding tree units. Each coding tree unit may be partitioned by using at least one partition method such as a quad tree, a binary tree, etc. to configure sub units such as coding units, prediction units, transform units, etc. The coding tree unit may be used as a term for indicating a pixel block that is a processing unit in decoding/encoding process of an image, like partition of an input image.

Coding Tree Block: may be used as a term for indicating one of the Y coding tree unit, the Cb coding tree unit, and the Cr coding tree unit.

FIG. 1 is a block diagram showing configurations of an encoding apparatus according to an embodiment of the present invention.

The encoding apparatus 100 may be a video encoding apparatus or an image encoding apparatus. A video may include one or more images. The encoding apparatus 100 may encode the one or more images of the video in order of time.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

The encoding apparatus 100 may encode an input picture in an intra mode or an inter mode or both. In addition, the encoding apparatus 100 may generate a bitstream by encoding the input picture, and may output the generated bitstream. When the intra mode is used as a prediction mode, the switch 115 may be switched to intra. When the inter mode is used as a prediction mode, the switch 115 may be switched to inter. Here, the intra mode may be referred to as an intra-prediction mode, and the inter mode may be referred to as an inter-prediction mode. The encoding apparatus 100 may generate a prediction block of an input block of the input picture. In addition, after generating the prediction block, the encoding apparatus 100 may encode residuals between the input block and the prediction block. The input picture may be referred to as a current image that is a target of current encoding. The input block may be referred to as a current block or as an encoding target block that is a target of the current encoding.

When the prediction mode is the intra mode, the intra-prediction unit 120 may use a pixel value of a previously encoded block, which is adjacent to the current block, as a reference pixel. The intra-prediction unit 120 may perform spatial prediction by using the reference pixel, and may generate prediction samples of the input block by using the spatial prediction. Here, intra prediction may mean intra-frame prediction.

When the prediction mode is the inter mode, the motion prediction unit 111 may search for a region that is optimally matched with the input block from a reference picture in a motion predicting process, and may derive a motion vector by using the searched region. The reference picture may be stored in the reference picture buffer 190.

The motion compensation unit 112 may generate the prediction block by performing motion compensation using the motion vector. Here, the motion vector may be a two-dimensional vector that is used for inter prediction. In addition, the motion vector may indicate offset between the current picture and the reference picture. Here, inter prediction may be mean inter-frame prediction.

When a value of the motion vector is not an integer, the motion prediction unit 111 and the motion compensation unit 112 may generate the prediction block by applying an interpolation filter to a partial region in the reference picture. In order to perform inter prediction or motion compensation, on the basis of the coding unit, it is possible to determine which methods the motion prediction and compensation methods of a prediction unit in the coding unit uses among the skip mode, the merge mode, the AMVP mode, and a current picture reference mode. Inter prediction or motion compensation may be performed according to each mode. Here, the current picture reference mode may mean a prediction mode using a pre-reconstructed region of a current picture having an encoding target block. In order to specify the pre-reconstructed region, a motion vector for the current picture reference mode may be defined. Whether the encoding target block is encoded in the current picture reference mode may be encoded by using a reference picture index of the encoding target block.

The subtractor 125 may generate a residual block by using the residuals between the input block and the prediction block. The residual block may be referred to as a residual signal.

The transform unit 130 may generate a transform coefficient by transforming the residual block, and may output the transform coefficient. Here, the transform coefficient may be a coefficient value generated by transforming the residual block. In a transform skip mode, the transform unit 130 may skip the transforming of the residual block.

A quantized transform coefficient level may be generated by applying quantization to the transform coefficient. Hereinafter, the quantized transform coefficient level may be referred to as the transform coefficient in the embodiment of the present invention.

The quantization unit 140 may generate the quantized transform coefficient level by quantizing the transform coefficient depending on the quantization parameter, and may output the quantized transform coefficient level. Here, the quantization unit 140 may quantize the transform coefficient by using a quantization matrix.

The entropy encoding unit 150 may generate the bitstream by performing entropy encoding according to the probability distribution, on values calculated by the quantization unit 140 or on coding parameter values calculated in an encoding process, etc., and may output the generated bitstream. The entropy encoding unit 150 may perform the entropy encoding on information for decoding an image, and on information of a pixel of an image. For example, the information for decoding an image may include a syntax element, etc.

When the entropy encoding is applied, symbols are represented by allocating a small number of bits to the symbols having high occurrence probability and allocating a large number of bits to the symbols having low occurrence probability, thereby reducing the size of the bitstream of encoding target symbols. Therefore, compression performance of the image encoding may be increased through the entropy encoding. For the entropy encoding, the entropy encoding unit 150 may use an encoding method such as exponential golomb, context-adaptive variable length coding (CAVLC), and context-adaptive binary arithmetic coding (CABAC). For example, the entropy encoding unit 150 may perform the entropy encoding by using a variable length coding/code (VLC) table. In addition, the entropy encoding unit 150 may derive a binarization method of the target symbol and a probability model of the target symbol/bin, and may perform arithmetic coding by using the derived binarization method or the derived probability model thereafter.

In order to encode the transform coefficient level, the entropy encoding unit 150 may change a two-dimensional block form coefficient into a one-dimensional vector form by using a transform coefficient scanning method. For example, the two-dimensional form coefficient may be changed into the one-dimensional vector form by scanning the coefficient of the block with up-right scanning. According to the size of the transform unit and the intra-prediction mode, instead of the up-right scanning, it is possible to use vertical direction scanning for scanning the two-dimensional block form coefficient in a column direction, and horizontal direction scanning for scanning the two-dimensional block form coefficient in a row direction. That is, it is possible to determine which scanning method among up-right scanning, vertical direction scanning, and horizontal direction scanning is to be used depending on the size of the transform unit and the intra-prediction mode.

The coding parameter may include information, such as the syntax element, which is encoded by the encoder and is transmitted to the decoder, and may include information that may be derived in the encoding or decoding process. The coding parameter may mean information that is necessary to encode or decode an image. For example, the coding parameter may include at least one value or combined form of the block size, the block depth, the block partition information, the unit size, the unit depth, the unit partition information, the partition flag of a quad-tree form, the partition flag of a binary-tree form, the partition direction of a binary-tree form, the intra-prediction mode, the intra-prediction direction, the reference sample filtering method, the prediction block boundary filtering method, the filter tap, the filter coefficient, the inter-prediction mode, the motion information, the motion vector, the reference picture index, the inter-prediction direction, the inter-prediction indicator, the reference picture list, the motion vector predictor, the motion vector candidate list, the information about whether or not the motion merge mode is used, the motion merge candidate, motion merge candidate list, the information about whether or not the skip mode is used, interpolation filter type, the motion vector size, accuracy of motion vector representation, the transform type, the transform size, the information about whether additional (secondary) transform is used, the information about whether or not a residual signal is present, the coded block pattern, the coded block flag, the quantization parameter, the quantization matrix, the filter information within a loop, the information about whether or not a filter is applied within a loop, the filter coefficient within a loop, binarization/inverse binarization method, the context model, the context bin, the bypass bin, the transform coefficient, transform coefficient level, transform coefficient level scanning method, the image display/output order, slice identification information, slice type, slice partition information, tile identification information, tile type, tile partition information, the picture type, bit depth, and the information of a luma signal or a chroma signal.

The residual signal may mean the difference between the original signal and the prediction signal. Alternatively, the residual signal may be a signal generated by transforming the difference between the original signal and the prediction signal. Alternatively, the residual signal may be a signal generated by transforming and quantizing the difference between the original signal and the prediction signal. The residual block may be the residual signal of a block unit.

When the encoding apparatus 100 performs encoding by using inter prediction, the encoded current picture may be used as a reference picture for another image(s) that will be processed thereafter. Accordingly, the encoding apparatus 100 may decode the encoded current picture, and may store the decoded image as the reference picture. In order to perform the decoding, dequantization and inverse transform may be performed on the encoded current picture.

A quantized coefficient may be dequantized by the dequantization unit 160, and may be inversely transformed by the inverse transform unit 170. The dequantized and inversely transformed coefficient may be added to the prediction block by the adder 175, whereby a reconstructed block may be generated.

The reconstructed block may pass the filter unit 180. The filter unit 180 may apply at least one of a deblocking filter, a sample adaptive offset (SAO), and an adaptive loop filter (ALF) to the reconstructed block or a reconstructed picture. The filter unit 180 may be referred to as an in-loop filter.

The deblocking filter may remove block distortion that occurs at boundaries between the blocks. In order to determine whether or not the deblocking filter is operated, it is possible to determine whether or not the deblocking filter is applied to the current block on the basis of the pixels included in several rows or columns in the block. When the deblocking filter is applied to the block, a strong filter or a weak filter may be applied depending on required deblocking filtering strength. In addition, in applying the deblocking filter, horizontal direction filtering and vertical direction filtering may be processed in parallel.

The sample adaptive offset may add an optimum offset value to the pixel value in order to compensate for an encoding error. The sample adaptive offset may correct an offset between the deblocking filtered image and the original picture for each pixel. In order to perform the offset correction on a specific picture, it is possible to use a method of applying an offset in consideration of edge information of each pixel or a method of partitioning pixels of an image into the predetermined number of regions, determining a region to be subjected to perform an offset correction, and applying the offset correction to the determined region.

The adaptive loop filter may perform filtering on the basis of a value obtained by comparing the reconstructed picture and the original picture. Pixels of an image may be partitioned into predetermined groups, one filter being applied to each of the groups is determined, and different filtering may be performed at each of the groups. Information about whether or not the adaptive loop filter is applied to the luma signal may be transmitted for each coding unit (CU). A shape and a filter coefficient of an adaptive loop filter being applied to each block may vary. In addition, an adaptive loop filter having the same form (fixed form) may be applied regardless of characteristics of a target block.

The reconstructed block that passed the filter unit 180 may be stored in the reference picture buffer 190.

Figure 2:
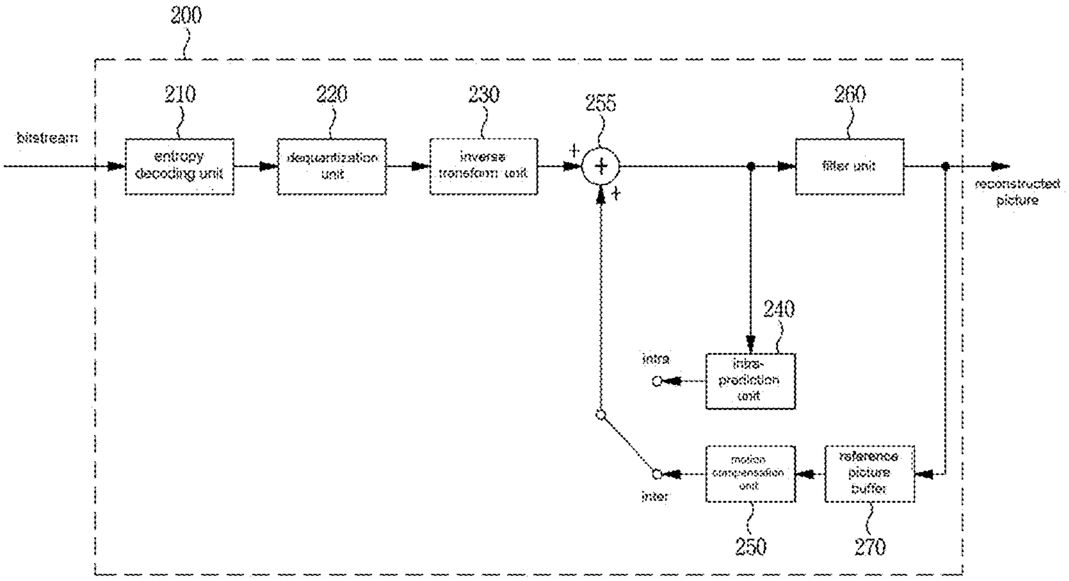
FIG. 2 is a block diagram showing configurations of a decoding apparatus according to an embodiment of the present invention.

FIG. 2 is a block diagram showing configurations of a decoding apparatus according to an embodiment of the present invention.

The decoding apparatus 200 may be a video decoding apparatus or an image decoding apparatus.

Referring to FIG. 2, the decoding apparatus 200 may include an entropy decoding unit 210, a dequantization unit 220, an inverse transform unit 230, an intra-prediction unit 240, a motion compensation unit 250, an adder 255, a filter unit 260, and a reference picture buffer 270.

The decoding apparatus 200 may receive the bitstream outputted from the encoding apparatus 100. The decoding apparatus 200 may decode the bitstream in the intra mode or the inter mode. In addition, the decoding apparatus 200 may generate a reconstructed picture by performing decoding, and may output the reconstructed picture.

When a prediction mode used in decoding is the intra mode, the switch may be switched to intra. When the prediction mode used in decoding is the inter mode, the switch may be switched to inter.

The decoding apparatus 200 may obtain the reconstructed residual block from the inputted bitstream, and may generate the prediction block. When the reconstructed residual block and the prediction block are obtained, the decoding apparatus 200 may generate the reconstructed block, which is a decoding target block, by adding the reconstructed residual block and the prediction block. The decoding target block may be referred to as a current block.

The entropy decoding unit 210 may generate symbols by performing entropy decoding on the bitstream according to the probability distribution. The generated symbols may include a symbol having a quantized transform coefficient level. Here, a method of entropy decoding may be similar to the above-described method of the entropy encoding. For example, the method of the entropy decoding may be an inverse process of the above-described method of the entropy encoding.

In order to decode the transform coefficient level, the entropy decoding unit 210 may perform transform coefficient scanning, whereby the one-dimensional vector form coefficient can be changed into the two-dimensional block form. For example, the one-dimensional vector form coefficient may be changed into a two-dimensional block form by scanning the coefficient of the block with up-right scanning. According to the size of the transform unit and the intra-prediction mode, instead of up-right scanning, it is possible to use vertical direction scanning and horizontal direction scanning. That is, it is possible to determine which scanning method among up-right scanning, vertical direction scanning, and horizontal direction scanning is used depending on the size of the transform unit and the intra-prediction mode.

The quantized transform coefficient level may be dequantized by the dequantization unit 220, and may be inversely transformed by the inverse transform unit 230. The quantized transform coefficient level is dequantized and is inversely transformed so as to generate a reconstructed residual block. Here, the dequantization unit 220 may apply the quantization matrix to the quantized transform coefficient level.

When the intra mode is used, the intra-prediction unit 240 may generate a prediction block by performing the spatial prediction that uses the pixel value of the previously decoded block that is adjacent to the decoding target block.

When the inter mode is used, the motion compensation unit 250 may generate the prediction block by performing motion compensation that uses both the motion vector and the reference picture stored in the reference picture buffer 270. When the value of the motion vector is not an integer, the motion compensation unit 250 may generate the prediction block by applying the interpolation filter to the partial region in the reference picture. In order to perform motion compensation, on the basis of the coding unit, it is possible to determine which method the motion compensation method of a prediction unit in the coding unit uses among the skip mode, the merge mode, the AMVP mode, and a current picture reference mode. In addition, it is possible to perform motion compensation depending on the modes. Here, the current picture reference mode may mean a prediction mode using a previously reconstructed region within the current picture having the decoding target block. The previously reconstructed region may not be adjacent to the decoding target block. In order to specify the previously reconstructed region, a fixed vector may be used for the current picture reference mode. In addition, a flag or an index indicating whether or not the decoding target block is a block decoded in the current picture reference mode may be signaled, and may be derived by using the reference picture index of the decoding target block. The current picture for the current picture reference mode may exist at a fixed position (for example, a position of a reference picture index is 0 or the last position) within the reference picture list for the decoding target block. In addition, it is possible for the current picture to be variably positioned within the reference picture list, and to this end, it is possible to signal the reference picture index indicating a position of the current picture. Here, signaling a flag or an index may mean that the encoder entropy encodes the corresponding flag or index and includes into a bitstream, and that the decoder entropy decodes the corresponding flag or index from the bitstream.

The reconstructed residual block may be added to the prediction block by the adder 255. A block generated by adding the reconstructed residual block and the prediction block may pass the filter unit 260. The filter unit 260 may apply at least one of the deblocking filter, the sample adaptive offset, and the adaptive loop filter to the reconstructed block or to the reconstructed picture. The filter unit 260 may output the reconstructed picture. The reconstructed picture may be stored in the reference picture buffer 270, and may be used for inter prediction.

Figure 3:
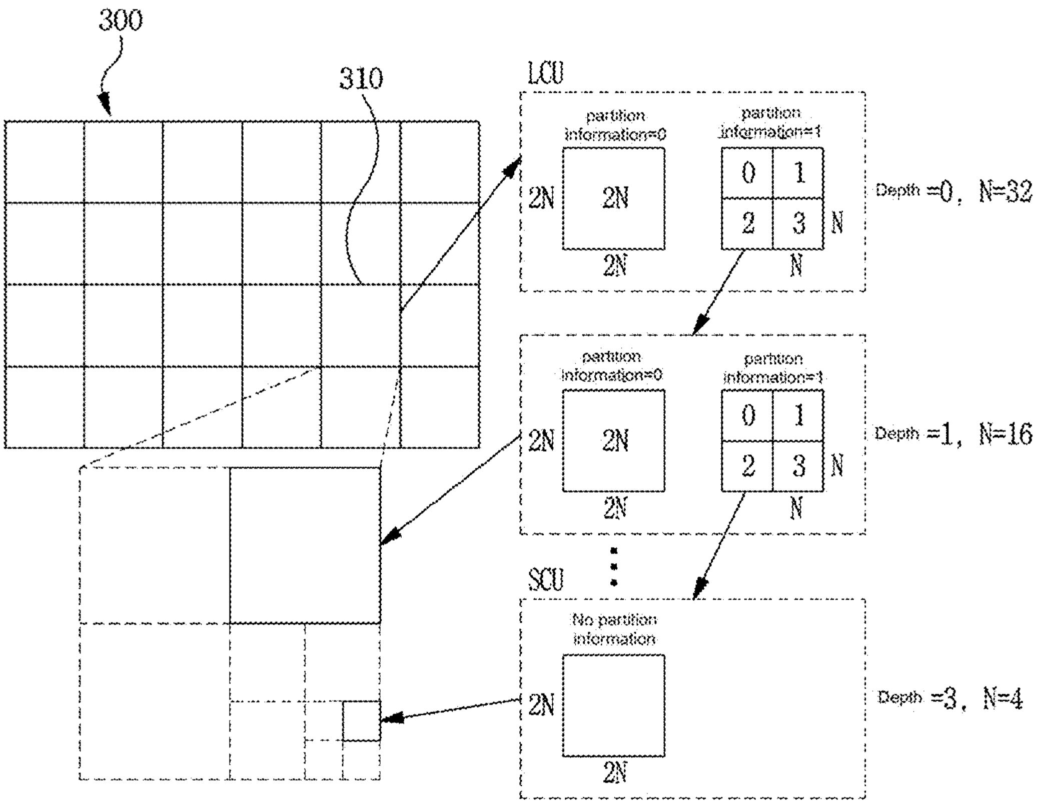
FIG. 3 is a view schematically showing a partition structure of an image when encoding and decoding the image.

FIG. 3 is a view schematically showing a partition structure of an image when encoding and decoding the image. FIG. 3 schematically shows an embodiment of partitioning one unit into a plurality of sub-units.

In order to efficiently partition an image, a coding unit (CU) may be used in encoding and decoding. Here, the coding unit may mean an encoding unit. The unit may be a combination of 1) a syntax element and 2) a block including image samples. For example, "partition of a unit" may mean "partition of a block relative to a unit". The block partition information may include information about the unit depth. Depth information may indicate the number of times a unit is partitioned or a partitioned degree of a unit or both.

Referring to FIG. 3, an image 300 is sequentially partitioned for each largest coding unit (LCU), and a partition structure is determined for each LCU. Here, the LCU and a coding tree unit (CTU) have the same meaning. One unit may have depth information based on a tree structure, and may be hierarchically partitioned. Each of the partitioned sub-units may have depth information. The depth information indicates the number of times a unit is partitioned or a partitioned degree of a unit or both, and thus, the depth information may include information about the size of the sub-unit.

The partition structure may mean distribution of a coding unit (CU) in the LCU 310. The CU may be a unit for efficiently encoding/decoding an image. The distribution may be determined on the basis of whether or not one CU will be partitioned in plural (a positive integer equal to or more than 2 including 2, 4, 8, 16, etc.). The width size and the height size of the partitioned CU may respectively be a half width size and a half height size of the original CU. Alternatively, according to the number of partitionings, the width size and the height size of the partitioned CU may respectively be smaller than the width size and the height size of the original CU. The partitioned CU may be recursively partitioned into a plurality of further partitioned CUs, wherein the further partitioned CU has a width size and a height size smaller than those of the partitioned CU in the same partition method.

Here, the partition of a CU may be recursively performed up to a predetermined depth. Depth information may be information indicating a size of the CU, and may be stored in each CU. For example, the depth of the LCU may be 0, and the depth of a smallest coding unit (SCU) may be a predetermined maximum depth. Here, the LCU may be a coding unit having a maximum size as described above, and the SCU may be a coding unit having a minimum size.

Whenever the LCU 310 begins to be partitioned, and the width size and the height size of the CU are decreased by the partitioning, the depth of a CU is increased by 1. In a case of a CU which cannot be partitioned, the CU may have a 2N×2N size for each depth. In a case of a CU that can be partitioned, the CU having a 2N×2N size may be partitioned into a plurality of N×N-size CUs. The size of N is reduced by half whenever the depth is increased by 1.

For example, when one coding unit is partitioned into four sub-coding units, a width size and a height size of one of the four sub-coding units may respectively be a half width size and a half height size of the original coding unit. For example, when a 32×32-size coding unit is partitioned into four sub-coding units, each of the four sub-coding units may have a 16×16 size. When one coding unit is partitioned into four sub-coding units, the coding unit may be partitioned in a quad-tree form.

For example, when one coding unit is partitioned into two sub-coding units, a width size or a height size of one of the two sub-coding units may respectively be a half width size or a half height size of the original coding unit. For example, when a 32×32-size coding unit is vertically partitioned into two sub-coding units, each of the two sub-coding units may have a 16×32 size. For example, when a 32×32-size coding unit is horizontally partitioned into two sub-coding units, each of the two sub-coding units may have a 32×16 size. When one coding unit is partitioned into two sub-coding units, the coding unit may be partitioned in a binary-tree form.

Referring to FIG. 3, the size of the LCU having a minimum depth of 0 may be 64×64 pixels, and the size of the SCU having a maximum depth of 3 may be 8×8 pixels. Here, a CU having 64×64 pixels, which is the LCU, may be denoted by a depth of 0, a CU having 32×32 pixels may be denoted by a depth of 1, a CU having 16×16 pixels may be denoted by a depth of 2, and a CU having 8×8 pixels, which is the SCU, may be denoted by a depth of 3.

In addition, information about whether or not a CU will be partitioned may be represented through partition information of a CU. The partition information may be 1 bit information. The partition information may be included in all CUs other than the SCU. For example, when a value of the partition information is 0, a CU may not be partitioned, and when a value of the partition information is 1, a CU may be partitioned.

Figure 4:
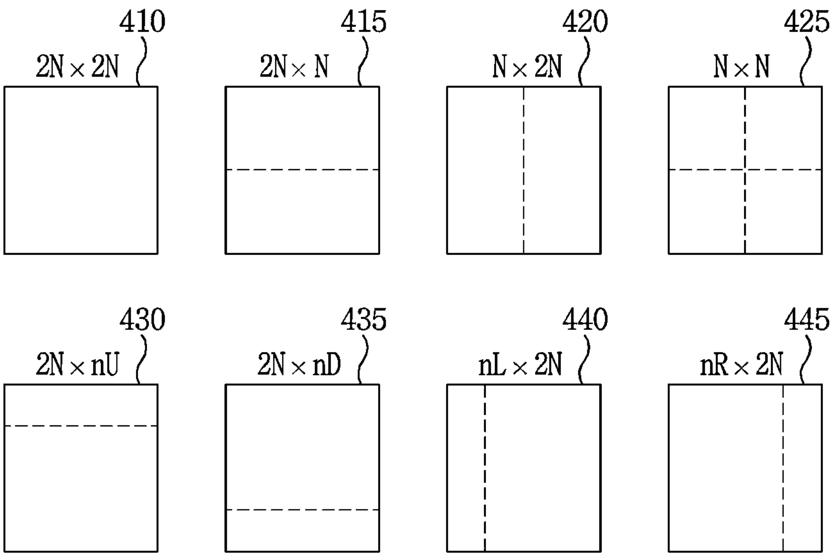
FIG. 4 is a view showing forms of a prediction unit (PU) that may be included in a coding unit (CU).

FIG. 4 is a view showing forms of a prediction unit (PU) that may be included in a coding unit (CU).

A CU that is no longer partitioned, from among CUs partitioned from the LCU, may be partitioned into at least one prediction unit (PU). This process may be also referred to as a partition.

The PU may be a basic unit for prediction. The PU may be encoded and decoded in any one of a skip mode, an inter mode, and an intra mode. The PU may be partitioned in various forms depending on the modes.

In addition, the coding unit may not be partitioned into a plurality of prediction units, and the coding unit and the prediction unit have the same size.

As shown in FIG. 4, in the skip mode, the CU may not be partitioned. In the skip mode, a 2N×2N mode 410 having the same size as a CU without partition may be supported.

In the inter mode, 8 partitioned forms may be supported within a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported. In the intra mode, the 2N×2N mode 410 and the N×N mode 425 may be supported.

One coding unit may be partitioned into one or more prediction units. One prediction unit may be partitioned into one or more sub-prediction units.

For example, when one prediction unit is partitioned into four sub-prediction units, a width size and a height size of one of the four sub-prediction units may be a half width size and a half height size of the original prediction unit. For example, when a 32×32-size prediction unit is partitioned into four sub-prediction units, each of the four sub-prediction units may have a 16×16 size. When one prediction unit is partitioned into four sub-prediction units, the prediction unit may be partitioned in the quad-tree form.

For example, when one prediction unit is partitioned into two sub-prediction units, a width size or a height size of one of the two sub-prediction units may be a half width size or a half height size of the original prediction unit. For example, when a 32×32-size prediction unit is vertically partitioned into two sub-prediction units, each of the two sub-prediction units may have a 16×32 size. For example, when a 32×32-size prediction unit is horizontally partitioned into two sub-prediction units, each of the two sub-prediction units may have a 32×16 size. When one prediction unit is partitioned into two sub-prediction units, the prediction unit may be partitioned in the binary-tree form.

Figure 5:
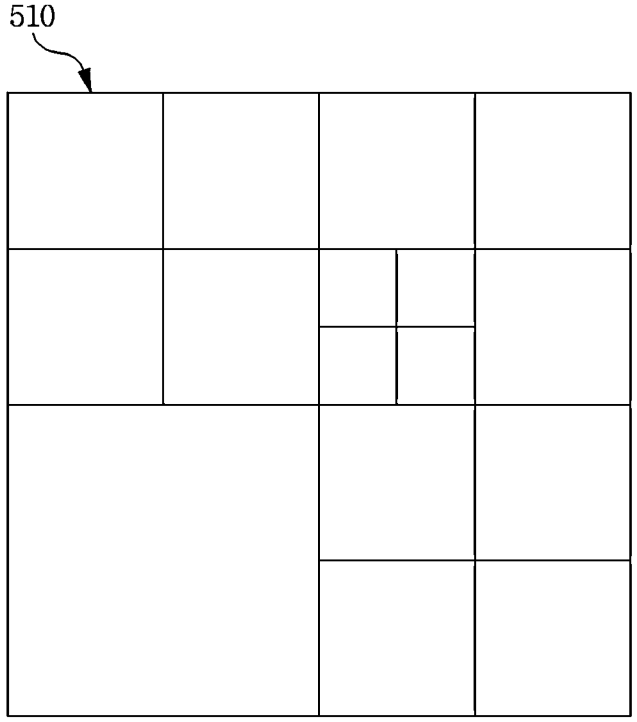
FIG. 5 is a view showing forms of a transform unit (TU) that may be included in a coding unit (CU).

FIG. 5 is a view showing forms of a transform unit (TU) that may be included in a coding unit (CU).

A transform unit (TU) may be a basic unit used for a transform, quantization, a reverse transform, and dequantization within a CU. The TU may have a square shape or a rectangular shape, etc. The TU may be dependently determined by a size of a CU or a form of a CU or both.

A CU that is no longer partitioned among CUs partitioned from the LCU may be partitioned into at least one TU. Here, the partition structure of the TU may be a quad-tree structure. For example, as shown in FIG. 5, one CU 510 may be partitioned once or more depending on the quad-tree structure. The case where one CU is partitioned at least once may be referred to as recursive partition. Through the partitioning, one CU 510 may be formed of TUs having various sizes. Alternatively, a CU may be partitioned into at least one TU depending on the number of vertical lines partitioning the CU or the number of horizontal lines partitioning the CU or both. The CU may be partitioned into TUs that are symmetrical to each other, or may be partitioned into TUs that are asymmetrical to each other. In order to partition the CU into TUs that are symmetrical to each other, information of a size/shape of the TU may be signaled, and may be derived from information of a size/shape of the CU.

In addition, the coding unit may not be partitioned into transform units, and the coding unit and the transform unit may have the same size.

One coding unit may be partitioned into at least one transform unit, and one transform unit may be partitioned into at least one sub-transform unit.

For example, when one transform unit is partitioned into four sub-transform units, a width size and a height size of one of the four sub-transform units may respectively be a half width size and a half height size of the original transform unit. For example, when a 32×32-size transform unit is partitioned into four sub-transform units, each of the four sub-transform units may have a 16×16 size. When one transform unit is partitioned into four sub-transform units, the transform unit may be partitioned in the quad-tree form.

For example, when one transform unit is partitioned into two sub-transform units, a width size or a height size of one of the two sub-transform units may respectively be a half width size or a half height size of the original transform unit. For example, when a 32×32-size transform unit is vertically partitioned into two sub-transform units, each of the two sub-transform units may have a 16×32 size. For example, when a 32×32-size transform unit is horizontally partitioned into two sub-transform units, each of the two sub-transform units may have a 32×16 size. When one transform unit is partitioned into two sub-transform units, the transform unit may be partitioned in the binary-tree form.

When performing transform, the residual block may be transformed by using at least one of predetermined transform methods. For example, the predetermined transform methods may include discrete cosine transform (DCT), discrete sine transform (DST), KLT, etc. Which transform method is applied to transform the residual block may be determined by using at least one of inter-prediction mode information of the prediction unit, intra-prediction mode information of the prediction unit, and size/shape of the transform block. Information indicating the transform method may be signaled.

Figure 6:
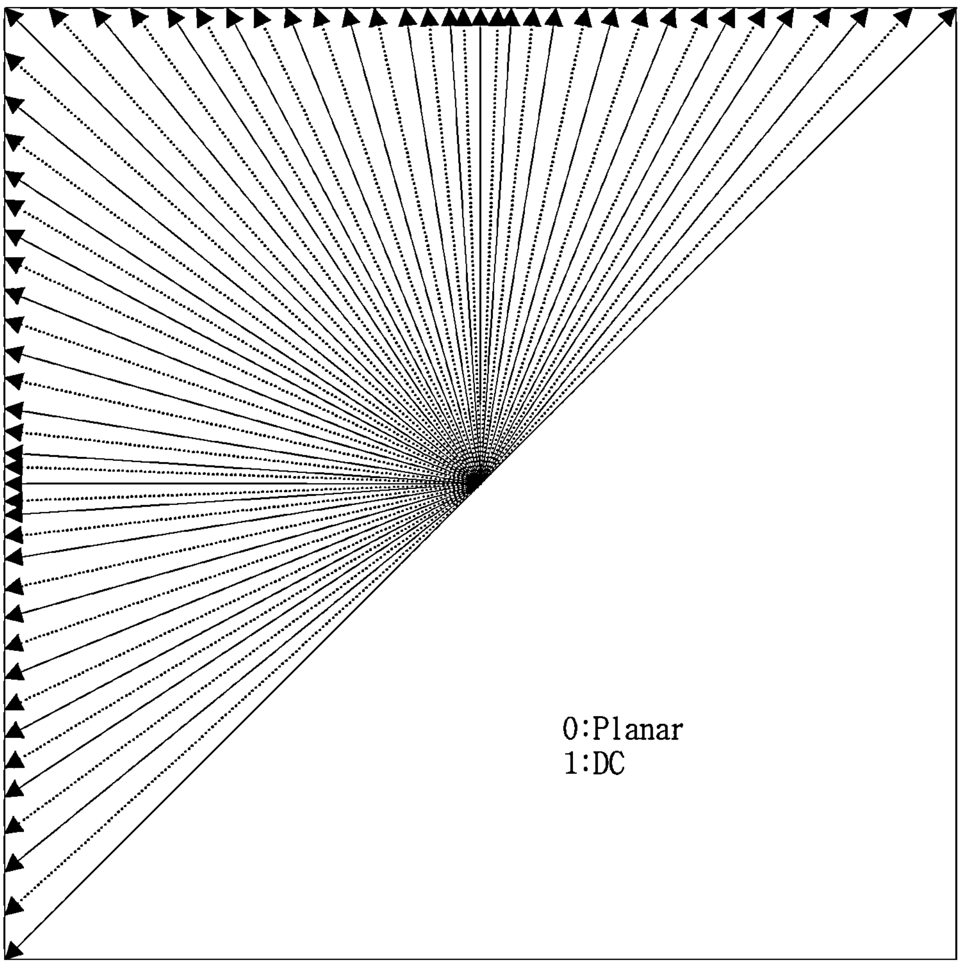
FIG. 6 is a view for explaining an embodiment of a process of intra prediction.

FIG. 6 is a view for explaining an embodiment of a process of intra prediction.

The intra-prediction mode may be a non-directional mode or a directional mode. The non-directional mode may be a DC mode or a planar mode. The directional mode may be a prediction mode having a particular direction or angle, and the number of directional modes may be M which is equal to or greater than one. The directional mode may be indicated as at least one of a mode number, a mode value, and a mode angle.

The number of intra-prediction modes may be N which is equal to or greater than one, including the non-directional and directional modes.

The number of intra-prediction modes may vary depending on the size of a block. For example, when the size is 4×4 or 8×8, the number may be 67, and when the size is 16×16, the number may be 35, and when the size is 32×32, the number may be 19, and when the size is 64×64, the number may be 7.

The number of intra-prediction modes may be fixed to N regardless of the size of a block. For example, the number may be fixed to at least one of 35 or 67 regardless of the size of a block.

The number of intra-prediction modes may vary depending on a type of a color component. For example, the number of prediction modes may vary depending on whether a color component is a luma signal or a chroma signal.

Intra encoding and/or decoding may be performed by using a sample value or an encoding parameter included in a reconstructed neighboring block.

For encoding/decoding a current block in intra prediction, whether or not samples included in a reconstructed neighboring block are available as reference samples of an encoding/decoding target block may be identified. When there are samples that cannot be used as reference samples of the encoding/decoding target block, sample values are copied and/or interpolated into the samples that cannot be used as the reference samples by using at least one of samples included in the reconstructed neighboring block, whereby the samples that cannot be used as reference samples can be used as the reference samples of the encoding/decoding target block.

In intra prediction, based on at least one of an intra-prediction mode and the size of the encoding/decoding target block, a filter may be applied to at least one of a reference sample or a prediction sample. Here, the encoding/decoding target block may mean a current block, and may mean at least one of a coding block, a prediction block, and a transform block. A type of a filter being applied to a reference sample or a prediction sample may vary depending on at least one of the intra-prediction mode or size/shape of the current block. The type of the filter may vary depending on at least one of the number of filter taps, a filter coefficient value, or filter strength.

In a non-directional planar mode among intra-prediction modes, when generating a prediction block of the encoding/decoding target block, a sample value in the prediction block may be generated by using a weighted sum of an upper reference sample of the current sample, a left reference sample of the current sample, an upper right reference sample of the current block, and a lower left reference sample of the current block according to the sample location.

In a non-directional DC mode among intra-prediction modes, when generating a prediction block of the encoding/decoding target block, it may be generated by an average value of upper reference samples of the current block and left reference samples of the current block. In addition, filtering may be performed on one or more upper rows and one or more left columns adjacent to the reference sample in the encoding/decoding block by using reference sample values.

In a case of multiple directional modes (angular mode) among intra-prediction modes, a prediction block may be generated by using the upper right and/or lower left reference sample, and the directional modes may have different direction. In order to generate a prediction sample value, interpolation of a real number unit may be performed.

In order to perform an intra-prediction method, an intra-prediction mode of a current prediction block may be predicted from an intra-prediction mode of a neighboring prediction block that is adjacent to the current prediction block. In a case of prediction the intra-prediction mode of the current prediction block by using mode information predicted from the neighboring intra-prediction mode, when the current prediction block and the neighboring prediction block have the same intra-prediction mode, information that the current prediction block and the neighboring prediction block have the same intra-prediction mode may be transmitted by using predetermined flag information. When the intra-prediction mode of the current prediction block is different from the intra-prediction mode of the neighboring prediction block, intra-prediction mode information of the encoding/decoding target block may be encoded by performing entropy encoding.

FIG. 7 is a view for explaining an embodiment of a process of inter prediction.

The quadrangular shapes shown in FIG. 7 may indicate images (or, pictures). Also, the arrows of FIG. 7 may indicate prediction directions. That is, images may be encoded or decoded or both according to prediction directions. Each image may be classified into an I-picture (intra picture), a P-picture (uni-predictive picture), a B-picture (bi-predictive picture), etc. according to encoding types. Each picture may be encoded and decoded depending on an encoding type of each picture.

When an image, which is an encoding target, is an I-picture, the image itself may be intra encoded without inter prediction. When an image, which is an encoding target, is a P-picture, the image may be encoded by inter prediction or motion compensation using a reference picture only in a forward direction. When an image, which is an encoding target, is a B-picture, the image may be encoded by inter prediction or motion compensation using reference pictures in both a forward direction and a reverse direction. Alternatively, the image may be encoded by inter prediction or motion compensation using a reference picture in one of a forward direction and a reverse direction. Here, when an inter-prediction mode is used, the encoder may perform inter prediction or motion compensation, and the decoder may perform motion compensation in response to the encoder. Images of the P-picture and the B-picture that are encoded or decoded or both by using a reference picture may be regarded as an image for inter prediction.

Hereinafter, inter prediction according to an embodiment will be described in detail.

Inter prediction or motion compensation may be performed by using both a reference picture and motion information. In addition, inter prediction may use the above described skip mode.

The reference picture may be at least one of a previous picture and a subsequent picture of a current picture. Here, inter prediction may predict a block of the current picture depending on the reference picture. Here, the reference picture may mean an image used in predicting a block. Here, an area within the reference picture may be specified by using a reference picture index (refIdx) indicating a reference picture, a motion vector, etc.

Inter prediction may select a reference picture and a reference block relative to a current block within the reference picture. A prediction block of the current block may be generated by using the selected reference block. The current block may be a block that is a current encoding or decoding target among blocks of the current picture.

Motion information may be derived from a process of inter prediction by the encoding apparatus 100 and the decoding apparatus 200. In addition, the derived motion information may be used in performing inter prediction. Here, the encoding apparatus 100 and the decoding apparatus 200 may enhance encoding efficiency or decoding efficiency or both by using motion information of a reconstructed neighboring block or motion information of a collocated block (col block) or both. The col block may be a block relative to a spatial position of the encoding/decoding target block within a collocated picture (col picture) that is previously reconstructed. The reconstructed neighboring block may be a block within a current picture, and a block that is previously reconstructed through encoding or decoding or both. In addition, the reconstructed block may be a block adjacent to the encoding/decoding target block or a block positioned at an outer corner of the encoding/decoding target block or both. Here, the block positioned at the outer corner of the encoding/decoding target block may be a block that is vertically adjacent to a neighboring block horizontally adjacent to the encoding/decoding target block. Alternatively, the block positioned at the outer corner of the encoding/decoding target block may be a block that is horizontally adjacent to a neighboring block vertically adjacent to the encoding/decoding target block.

The encoding apparatus 100 and the decoding apparatus 200 may respectively determine a block that exists at a position spatially relative to the encoding/decoding target block within the col picture, and may determine a predefined relative position on the basis of the determined block. The predefined relative position may be an inner position or an outer position or both of a block that exists at a position spatially relative to the encoding/decoding target block. In addition, the encoding apparatus 100 and the decoding apparatus 200 may respectively derive the col block on the basis of the determined predefined relative position. Here, the col picture may be one picture of at least one reference picture included in the reference picture list.

A method of deriving the motion information may vary according to a prediction mode of the encoding/decoding target block. For example, a prediction mode being applied for inter prediction may include an advanced motion vector prediction (AMVP), a merge mode, etc. Here, the merge mode may be referred to as a motion merge mode.

For example, when AMVP is applied as the prediction mode, the encoding apparatus 100 and the decoding apparatus 200 may respectively generate a motion vector candidate list by using a motion vector of the reconstructed neighboring block or a motion vector of the col block or both. The motion vector of the reconstructed neighboring block or the motion vector of the col block or both may be used as motion vector candidates. Here, the motion vector of the col block may be referred to as a temporal motion vector candidate, and the motion vector of the reconstructed neighboring block may be referred to as a spatial motion vector candidate.

The encoding apparatus 100 may generate a bitstream, and the bitstream may include a motion vector candidate index. That is, the encoding apparatus 100 may generate a bitstream by entropy encoding the motion vector candidate index. The motion vector candidate index may indicate an optimum motion vector candidate that is selected from motion vector candidates included in the motion vector candidate list. The motion vector candidate index may be transmitted from the encoding apparatus 100 to the decoding apparatus 200 through the bitstream.

The decoding apparatus 200 may entropy decode the motion vector candidate index from the bitstream, and may select a motion vector candidate of a decoding target block among the motion vector candidates included in the motion vector candidate list by using the entropy decoded motion vector candidate index.

The encoding apparatus 100 may calculate a motion vector difference (MVD) between the motion vector and the motion vector candidate of the decoding target block, and may entropy encode the MVD. The bitstream may include the entropy encoded MVD. The MVD may be transmitted from the encoding apparatus 100 to the decoding apparatus 200 through the bitstream. Here, the decoding apparatus 200 may entropy decode the received MVD from the bitstream. The decoding apparatus 200 may derive a motion vector of the decoding target block through a sum of the decoded MVD and the motion vector candidate.

The bitstream may include a reference picture index indicating a reference picture, etc., and a reference picture index may be entropy encoded and transmitted from the encoding apparatus 100 to the decoding apparatus 200 through the bitstream. The decoding apparatus 200 may predict a motion vector of the decoding target block by using motion information of neighboring blocks, and may derive the motion vector of the decoding target block by using the predicted motion vector and the motion vector difference. The decoding apparatus 200 may generate the prediction block of the decoding target block on the basis of the derived motion vector and reference picture index information.

As another method of deriving the motion information, a merge mode is used. The merge mode may mean a merger of motions of a plurality of blocks. The merge mode may mean application of motion information of one block to another block. When the merge mode is applied, the encoding apparatus 100 and the decoding apparatus 200 may respectively generate a merge candidate list by using motion information of the reconstructed neighboring block or motion information of the col block or both. The motion information may include at least one of 1) the motion vector, 2) the reference picture index, and 3) the inter-prediction indicator. A prediction indicator may indicate a uni-direction (L0 prediction, L1 prediction) or a bi-direction.

Here, the merge mode may be applied to each CU or each PU. When the merge mode is performed at each CU or each PU, the encoding apparatus 100 may generate a bitstream by entropy decoding predefined information, and may transmit the bitstream to the decoding apparatus 200. The bitstream may include the predefined information. The predefined information may include: 1) a merge flag that is information indicating whether or not the merge mode is performed for each block partition; and 2) a merge index that is information to which a block among the neighboring blocks adjacent to the encoding target block is merged. For example, neighboring blocks adjacent to the encoding target block may include a left neighboring block of the encoding target block, an upper neighboring block of the encoding target block, a temporally neighboring block of the encoding target block, etc.

The merge candidate list may indicate a list storing motion information. In addition, the merge candidate list may be generated in advance of performing the merge mode. The motion information stored in the merge candidate list may be at least one of motion information of the neighboring block adjacent to the encoding/decoding target block, motion information of the collocated block relative to the encoding/decoding target block in the reference picture, motion information newly generated by a combination of motion information that exists in the merge motion candidate list in advance, and a zero merge candidate. Here, motion information of the neighboring block adjacent to the encoding/decoding target block may be referred to as a spatial merge candidate. Motion information of the collocated block relative to the encoding/decoding target block in the reference picture may be referred to as a temporal merge candidate.

A skip mode may be a mode applying the mode information of the neighboring block itself to the encoding/decoding target block. The skip mode may be one of modes used for inter prediction. When the skip mode is used, the encoding apparatus 100 may entropy encode information about motion information of which block is used as motion information of the encoding target block, and may transmit the information to the decoding apparatus 200 through a bitstream. The encoding apparatus 100 may not transmit other information, for example, syntax element information, to the decoding apparatus 200. The syntax element information may include at least one of motion vector difference information, a coded block flag, and a transform coefficient level.

A residual signal generated after intra or inter prediction may be transformed into a frequency domain through a transform process as a part of a quantization process. Here, a primary transform may use DCT type 2 (DCT-II) as well as various DCT, DST kernels. On a residual signal, these transform kernels may perform a separable transform performing a 1D transform in a horizontal and/or vertical direction, or may perform a 2D non-separable transform.

For example, DCT and DST types used in transform may use DCT-II, DCT-V, DCT-VIII, DST-I, and DST-VII as shown in following tables in a case of the 1D transform. For example, as shown in the table 1 and table 2, a DCT or DST type used in transform by composing a transform set may be derived.

TABLE 1

| Transform set | Transform |
|---|---|
| 0 | DST_VII, DCT-VIII |
| 1 | DST-VII, DST-I |
| 2 | DST-VII, DCT-V |

TABLE 2

| Transform set | Transform |
|---|---|
| 0 | DST_VII, DCT-VIII, DST-I |
| 1 | DST-VII, DST-I, DCT-VIII |
| 2 | DST-VII, DCT-V, DST-I |

For example, as shown in FIG. 8, according to an intra-prediction mode, different transform sets are defined for horizontal and vertical directions. Next, the encoder/decoder may perform transform and/or inverse transform by using an intra-prediction mode of a current encoding/decoding target block and transform of a relevant transform set. In this case, entropy encoding/decoding is not performed on the transform set, and the encoder/decoder may define the transform set according to the same rule. In this case, entropy encoding/decoding indicating which transform is used among transforms of the transform set may be performed. For example, when the size of a block is equal to or less than 64×64, three transform sets are composed as shown in table 2 according to an intra-prediction mode, and three transforms are used for each horizontal direction transform and vertical direction transform to combine and perform total nine multi-transform methods. Next, a residual signal is encoded/decoded by using the optimum transform method, whereby encoding efficiency can be enhanced. Here, in order to perform entropy encoding/decoding on information about which transform method is used among three transforms of one transform set, truncated unary binarization may be used. Here, for at least one of vertical transform and horizontal transform, entropy encoding/decoding may be performed on the information indicating which transform is used among transforms of a transform set.

Figure 9:
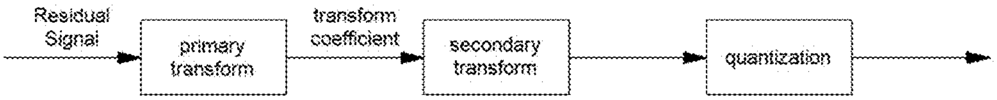
FIG. 9 is a view for explaining a process of transform.

After completing the above-described primary transform, the encoder may perform a secondary transform to increase energy concentration for transformed coefficients as shown in FIG. 9. The secondary transform may perform a separable transform performing a 1D transform in a horizontal and/or vertical direction, or may perform a 2D non-separable transform. Used transform information may be transmitted or may be derived by the encoder/decoder according to current and neighboring encoding information. For example, like the 1D transform, a transform set for the secondary transform may be defined. Entropy encoding/decoding is not performed on the transform set, and the encoder/decoder may define the transform set according to the same rule. In this case, information indicating which transform is used among transforms of the transform set may be transmitted, and the information may be applied to at least one residual signal through intra or inter prediction.

At least one of the number or types of transform candidates is different for each transform set. At least one of the number or types of transform candidates may be variably determined based on at least one of the location, the size, the partition form, and the prediction mode (intra/inter mode) or direction/non-direction of the intra-prediction mode of a block (CU, PU, TU, etc.).

The decoder may perform a secondary inverse transform depending on whether or not the secondary inverse transform is performed, and may perform a primary inverse transform depending on whether or not the primary inverse transform is performed from the result of the secondary inverse transform.

The above-described primary transform and secondary transform may be applied to at least one signal component of luma/chroma components or may be applied according to the size/shape of an arbitrary coding block. Entropy encoding/decoding may be performed on an index indicating both whether or not the primary transform/secondary transform is used and the used primary transform/secondary transform in an arbitrary coding block. Alternatively, the index may be tacitly derived by the encoder/decoder according to at least one piece of current/neighboring encoding information.

The residual signal generated after intra or inter prediction goes through a quantization process after the primary and/or secondary transform, and quantized transform coefficients go through an entropy encoding process. Here, the quantized transform coefficients may be scanned in diagonal, vertical, and horizontal directions based on at least one of the intra-prediction mode or the size/shape of a minimum block as shown in FIG. 10.

In addition, the quantized transform coefficients on which entropy decoding is performed may be arranged in block forms by being inverse scanned, and at least one of dequantization or inverse transform may be performed on the relevant block. Here, as a method of inverse scanning, at least one of diagonal direction scanning, horizontal direction scanning, and vertical direction scanning may be performed.

Figure 10:
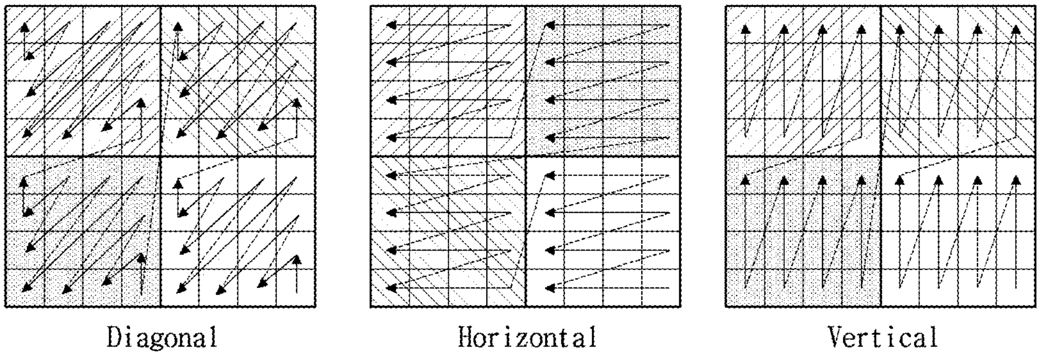
FIG. 10 is a view for explaining scanning of quantized transform coefficients.

For example, when the size of a current coding block is 8×8, primary transform, secondary transform, and quantization may be performed on a residual signal for the 8×8 block, and next, scanning and entropy encoding may be performed on quantized transform coefficients for each of four 4×4 sub-blocks according to at least one of three scanning order methods shown in FIG. 10. In addition, inverse scanning may be performed on the quantized transform coefficients by performing entropy decoding. The quantized transform coefficients on which inverse scanning is performed become transform coefficients after dequantization, and at least one of secondary inverse transform or primary inverse transform is performed, whereby a reconstructed residual signal can be generated.

Figure 11:
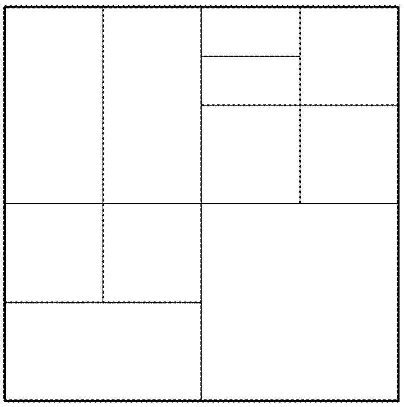
FIG. 11 is a view for explaining block partition.

In a video encoding process, one block may be partitioned as shown in FIG. 11, and an indicator corresponding to partition information may be signaled. Here, the partition information may be at least one of a partition flag (split_flag), a quad/binary tree flag (QB_flag), a quad tree partition flag (quadtree_flag), a binary tree partition flag (binarytree_flag), and a binary tree partition type flag (Btype_flag). Here, split_flag is a flag indicating whether or not a block is partitioned, QB_flag is a flag indicating whether a block is partitioned in a quad tree form or in a binary tree form, quadtree_flag is a flag indicating whether or not a block is partitioned in a quad tree form, binarytree_flag is a flag indicating whether or not a block is partitioned in a binary tree form, Btype_flag is a flag indicating whether a block is vertically or horizontally partitioned in a case of partition of a binary tree form.

When the partition flag is 1, it may indicate partitioning is performed, and when the partition flag is 0, it may indicate partitioning is not performed. In a case of the quad/binary tree flag, 0 may indicate a quad tree partition, and 1 may indicate a binary tree partition. Alternatively, 0 may indicate a binary tree partition, and 1 may indicate a quad tree partition. In a case of the binary tree partition type flag, 0 may indicate a horizontal direction partition, and 1 may indicate a vertical direction partition. Alternatively, 0 may indicate a vertical direction partition, and 1 may indicate a horizontal direction partition.

For example, partition information for FIG. 11 may be derived by signaling at least one of quadtree_flag, binarytree_flag, and Btype_flag as shown in table 3.

TABLE 3

| | | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| quadtree_flag | 1 | 0 | | | | | 1 | 0 | | | | | 0 | | 0 | | 0 | | 0 | | | | | | | | 0 | |
| binarytree_flag | | | 1 | | 0 | 0 | | | 1 | | 0 | 0 | | 0 | | 0 | | 0 | | 1 | | 1 | | 0 | 0 | 0 | | 0 |
| Btype_flag | | | | 1 | | | | | | 0 | | | | | | | | | | | 0 | | 1 | | | | | |

For example, partition information for FIG. 11 may be derived by signaling at least one of split_flag, QB_flag, and Btype_flag as shown in table 2.

TABLE 4

| | | | | | | | | | | | | | | | | | | | | | | | | | | |
|---|---|---|---|---|---|---|---|---|---|---|---|---|---|---|---|---|---|---|---|---|---|---|---|---|---|---|
| split_flag | 1 | | 1 | | | 0 | 0 | 1 | | 1 | | | 0 | 0 | 0 | 0 | 0 | 1 | | | 1 | | 0 | 0 | 0 | 0 |
| QB_flag | | 0 | | 1 | | | | | 0 | | 1 | | | | | | | | 1 | | | | | | | |
| Btype_flag | | | | | 1 | | | | | | | 0 | | | | | | | | 0 | | 1 | | | | |

The partition method may be performed only in a quad tree form or only in a binary tree form according to the size/shape of a block. In this case, the split_flag may mean a flag indicating whether partitioning is performed in a quad tree for or in a binary tree form. The size/shape of a block may be derived according to depth information of a block, and the depth information may be signaled.

When the size of a block is in a predetermined range, partitioning may be performed only in a quad tree form. Here, the predetermined range may be defined as at least one of the size of a maximum block or the size of a minimum block that can be partitioned only in a quad tree form. Information indicating the size of a maximum/minimum block where a partition in the quad tree form is allowed may be signaled through a bitstream, and the information may be signaled by a unit of at least one of a sequence, a picture parameter, or a slice (segment). Alternatively, the size of a maximum/minimum block may be a fixed size that is preset in the encoder/decoder. For example, when the size of a block ranges 256×256 to 64×64, partitioning may be performed only in a quad tree form. In this case, the split_flag may be a flag indicating whether partitioning is performed in a quad tree form.

When the size of a block is in a predetermined range, partitioning may be performed only in a binary tree form. Here, the predetermined range may be defined as at least one of the size of a maximum block or the size of a minimum block that can be partitioned only in a binary tree form. Information indicating the size of a maximum/minimum block where a partition in the binary tree form is allowed may be signaled through a bitstream, and the information may be signaled by a unit of at least one of a sequence, a picture parameter, or a slice (segment). Alternatively, the size of a maximum/minimum block may be a fixed size that is preset in the encoder/decoder. For example, when the size of a block ranges 16×16 to 8×8, partitioning may be performed only in a binary tree form. In this case, the split_flag may be a flag indicating whether partitioning is performed in a binary tree form.

After partitioning one block in a binary tree form, when the partitioned block is further partitioned, partitioning may be performed only in a binary tree form.

When the width or length size of the partitioned block cannot be further partitioned, at least one indicator may not be signaled.

Besides the quad tree based binary tree partitioning, the quad tree based partitioning may be performed after the binary tree partitioning.

Hereinafter, a method for enhancing video compression efficiency by a transform method that is a part of a video coding process will be described. More specifically, encoding of conventional video coding includes: an intra/inter prediction step of predicting an original block that is a part of a current original image; transform and quantization steps of a residual block that is a difference between a predicted prediction block and the original block; entropy coding that is a probability-based lossless compression method for a coefficient of the transformed and quantized block and compression information obtained from the previous stage. Through the encoding, a bitstream that is a compressed form of the original image is formed, and the bitstream is transmitted to a decoder or is stored in a recording medium. Shuffling and Discrete Sine Transform (hereinafter, SDST), described herein, is used to enhance efficiency of the transform method, whereby compression efficiency can be enhanced.

A SDST method according to the present invention uses Discrete Sine Transform type-7 or DST-VII (hereinafter, DST-7) without Discrete Cosine Transform type-2 or DCT-II (hereinafter, DCT-2) that is a transform kernel widely used in video coding, whereby common frequency characteristic of images can be applied better.

Through the transform method according to the present invention, objectively high-definition video may be obtained at a bitrate that is relatively lower than that of a conventional video coding method.

DST-7 may be applied to data of a residual block. The applying of DST-7 to the residual block may be performed based on a prediction mode corresponding to the residual block. For example, it may be applied to a residual block encoded in an inter mode. According to an embodiment of the present invention, DST-7 may be applied to data of the residual block after rearrangement or shuffling. Here, shuffling means rearrangement of image data, and may be called residual signal rearrangement. Here, the residual block may have the same meaning as the residual, a residual signal, and residual data. Also, the residual block may have the same meaning as a reconstructed residual, a reconstructed residual block, a reconstructed residual signal, and reconstructed residual data that are reconstructed forms of the residual block by the encoder and the decoder.

According to an embodiment of the present invention, SDST may use DST-7 as a transform kernel. Here, the transform kernel of SDST is not limited to DST-7, and may be at least one of various types of DST such as Discrete Sine Transform type-1 (DST-1), Discrete Sine Transform type-2 (DST-2), Discrete Sine Transform type-3 (DST-3), . . . , Discrete Sine Transform type-n (DST-n), etc. (here, n is a positive integer equal to or greater than one).

A method of performing one-dimensional DCT-2 according to an embodiment of the present invention may be indicated as formula 1 as follows. Here, the block size is designated as N, the frequency component location is designated as k, the value of an n-th coefficient in a spatial domain is designated as $x_n$.

$$X_k = \sum_{n=0}^{N-1} x_n * \cos\left[\frac{\pi}{N}\left(n + \frac{1}{2}\right)k\right] k = 0, \ldots, N-1 \quad \text{[Formula 1]}$$

DCT-2 of a two-dimensional domain may be possible by performing horizontal transform and vertical transform on the residual block through formula 1.

DCT-2 transform kernel may be defined as formula 2 as follows. Here, a basis vector according to a position in a frequency domain may be designated as Xk, the size of the frequency domain may be designated as N.

$$X_k = \cos\left(\frac{\pi}{N}\left(i + \frac{1}{2}\right)k\right) \quad i, k = 0, 1, \ldots, N-1 \quad \text{[Formula 2]}$$

Figure 12:
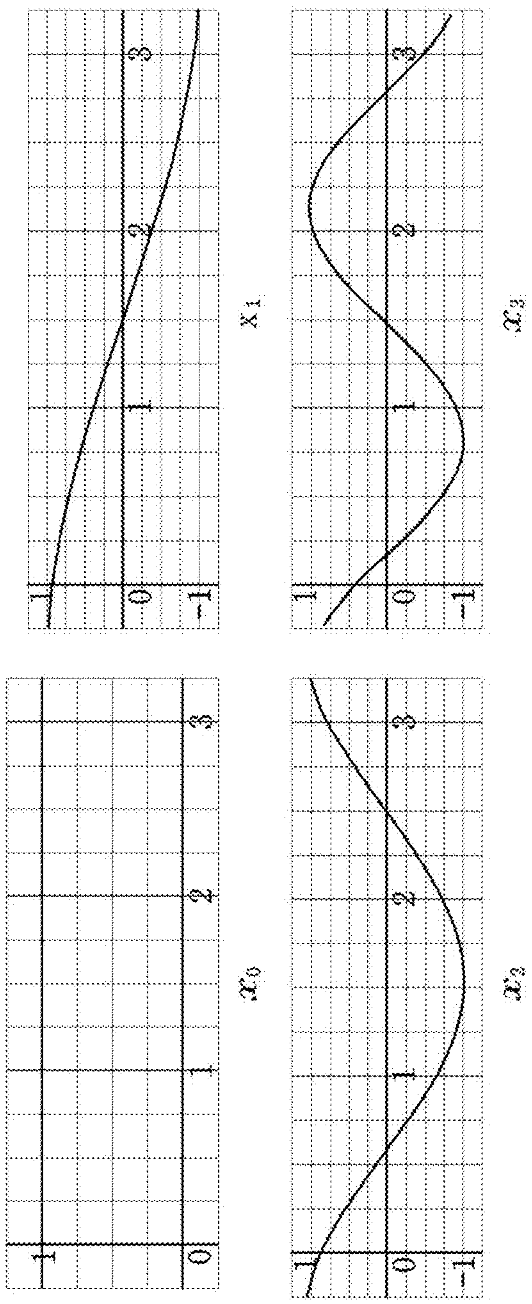
FIG. 12 is a view showing basis vectors in a DCT-2 frequency domain according to the present invention.

In the meantime, FIG. 12 is a view showing basis vectors in a DCT-2 frequency domain according to the present invention. FIG. 12 shows frequency characteristic of DCT-2 in a frequency domain. Here, a value calculated through $X_0$ basis vector of DCT-2 may mean a DC component.

DCT-2 may be used in a transform process for a residual block in a size of 4×4, 8×8, 16×16, 32×32, etc.

In the meantime, DCT-2 may be selectively used based on least one of the residual block size, color components of the residual block (for example, a luma component and a chroma component), or a prediction mode corresponding to the residual block. For example, when a component of a 4×4-size residual block encoded in the intra mode is a luma component, DCT-2 may not be used. Here, the prediction mode may mean inter prediction or intra prediction. Also, in a case of intra prediction, the prediction mode may mean the intra-prediction mode or the intra-prediction direction.

Transform through DCT-2 transform kernel may have high compression efficiency in a block having a characteristic where change between neighbor pixels is small, such as the background in an image. However, it may not be appropriate as a transform kernel for a region having a complex pattern such as texture in an image. When a block having a low correlation between neighbor pixels is transformed through DCT-2, substantial transform coefficients may occur in a high-frequency component of the frequency domain. In video compression, frequent occurrence of transform coefficients in a high-frequency region may reduce compression efficiency. In order to enhance compression efficiency, a coefficient is desired to be a large value near a low-frequency component, and a coefficient is desired to be close to zero in the high-frequency component.

A method of performing one-dimensional DST-7 according to an embodiment of the present invention may be indicated as formula 3 as follows. Here, the block size is designated as N, the frequency component location is designated as k, the value of an n-th coefficient in a spatial domain is designated as $x_n$.

$$X_k = \sum_{n=0}^{N-1} x_n * \sin\left[\frac{\pi(2n+1)}{2N+1}(k+1)\right] \quad k = 0, \ldots, N-1 \quad \text{[Formula 3]}$$

DST-7 in a two-dimensional domain may be possible by performing horizontal transform and vertical transform on the residual block through formula 3.

DST-7 transform kernel may be defined as formula 4 as follows. Here, a K-th basis vector of DST-7 is designated as $X_k$, the position in the frequency domain is designated as i, the size of the frequency domain is designated as N.

$$X_k = \sin\left(\frac{(2i+1)(k+1)\pi}{2N+1}\right) \quad i, k = 0, 1, \ldots, N-1 \quad \text{[Formula 4]}$$

DST-7 may be used in a transform process for a residual block in a size of at least one of 2×2, 4×4, 8×8, 16×16, 32×32, 64×64, 128×128, etc.

In the meantime, DST-7 may be applied to a rectangular block rather than a square block. For example, DST-7 may be applied to at least one of vertical transform and horizontal transform of a rectangular block having differing width sizes and height sizes, for example, 8×4, 16×8, 32×4, 64×16, etc.

Also, DST-7 may be selectively used based on least one of the residual block size, color components of the residual block (for example, a luma component and a chroma component) or the prediction mode corresponding to the residual block. For example, when a component of a 4×4-size residual block encoded in the intra mode is a luma component, DST-7 may be used. Here, the prediction mode may mean inter prediction or intra prediction. Also, in a case of intra prediction, the prediction mode may mean the intra-prediction mode or the intra-prediction direction.

Figure 13:
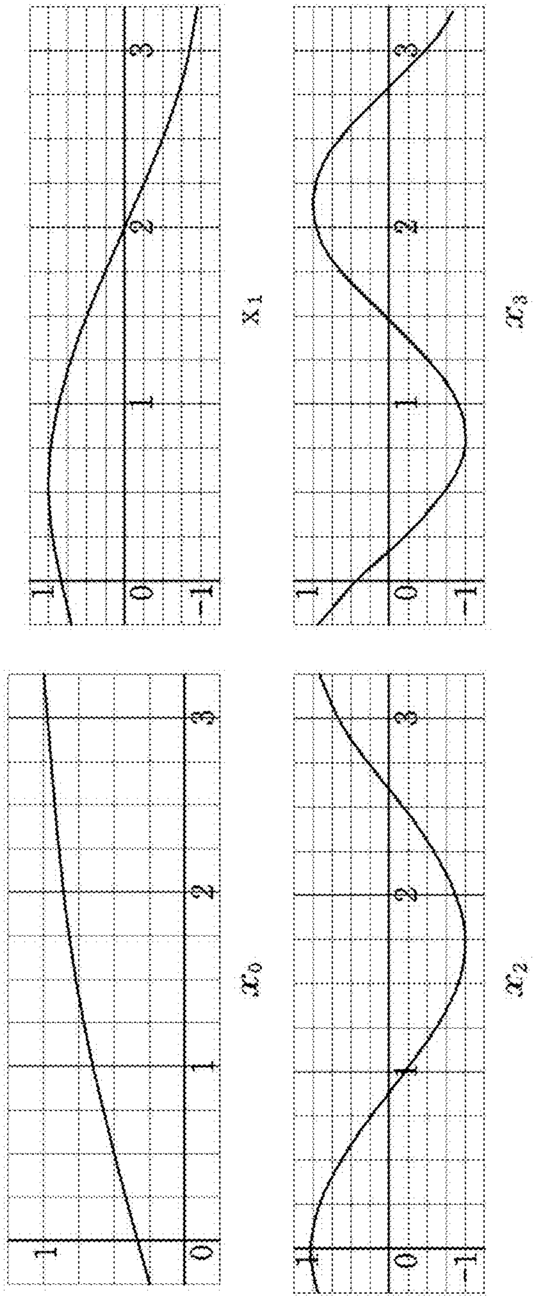
FIG. 13 is a view showing basis vectors in a DST-7 frequency domain according to the present invention.

In the meantime, FIG. 13 is a view showing basis vectors in a DST-7 frequency domain according to the present invention. Referring to FIG. 13, the first basis vector ($x_0$) of DST-7 has a shape of a curved line. Accordingly, compared to DCT-2, DST-7 may provide higher transform performance for a block having large spatial change in an image.

When performing transform on a 4×4 transform unit (TU) in an intra-predicted coding unit (CU), DST-7 may be used. Due to intra prediction characteristics, the error rate increases as being away from a reference sample, and this is applied to DST-7, whereby DST-7 can provide higher transform efficiency. That is, in the spatial domain, when a block has residual signals increasing as being away from the (0, 0) position in the block, the block may be effectively compressed by using DST-7.

As described above, in order to enhance transform efficiency, it is important to use a transform kernel appropriate to a frequency characteristic of an image. Particularly, transform is performed on the residual block for the original block, and thus transform efficiency of DST-7 and DCT-2 may be identified by identifying a distribution characteristic of residual signals in the CU or the PU or the TU.

FIG. 14 is a view showing distribution of average residual values according to the position in a 2N×2N prediction unit (PU) of a 8×8 coding unit (CU) that is predicted in an inter mode obtained by experimenting the "Cactus" sequence in a Low Delay-P profile environment.

Referring to FIG. 14, the left of FIG. 14 shows values of the top 30% that are relatively large among average residual signal values in the block, and the right shows values of the top 70% that are relatively large among average residual signal values in the same block as the left.

In FIG. 14, the residual signal distribution in the 2N×2N PU of the 8×8 CU predicted in the inter mode shows a characteristic where small residual signal values are mainly concentrated near the center of the block and the residual signal value is larger as being away from the center of the block. That is, the residual signal value is larger at the block boundary. Such a distribution characteristic of the residual signal is common feature of the residual signal in the PU regardless of the CU size and PU partitioning modes (2N×2N, 2N×N, N×2N, N×N, nR×2N, nL×2N, 2N×nU, 2N×nD) enabling the CU to be predicted in the inter mode.

Figure 15:
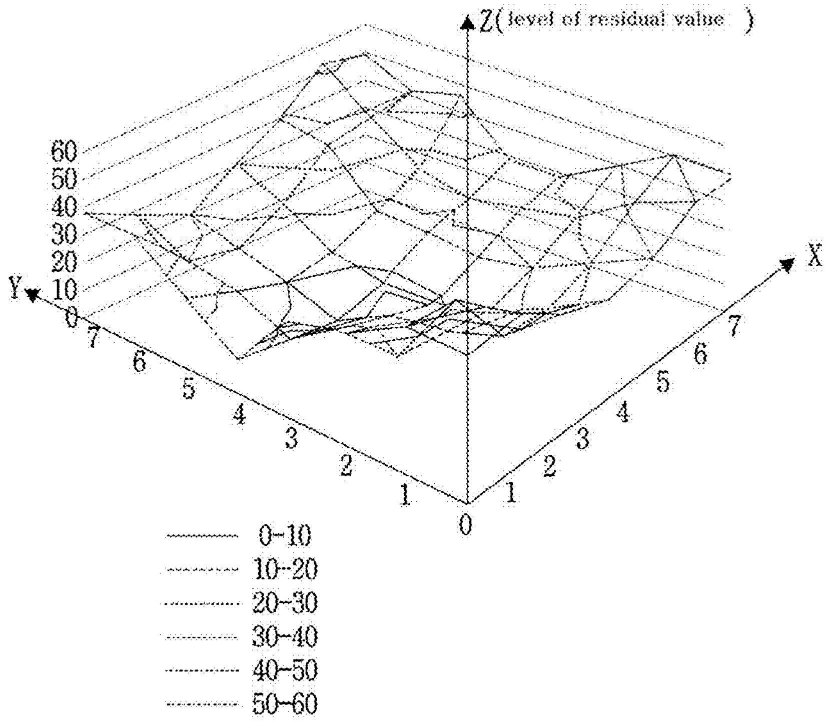
FIG. 15 is a three-dimensional graph showing a distribution characteristics of residual values in a 2N×2N prediction unit (PU) of a 8×8 coding unit (CU) that is predicted in an inter-prediction mode (inter mode) according to the present invention.

FIG. 15 is a three-dimensional graph showing a distribution characteristics of residual signals in a 2N×2N prediction unit (PU) of a 8×8 coding unit (CU) that is predicted in an inter-prediction mode (inter mode) according to the present invention.

Referring to FIG. 15, small residual signal values are concentrated near the center of the block, and the residual signal value is relatively larger as being close to the block boundary.

Based on the distribution characteristic of the residual signals in FIGS. 14 and 15, the transforming of the residual signals in the PU of the CU predicted in the inter mode may be more effective by using DST-7 rather than DCT-2.

Hereinafter, SDST that is one of transform methods using DST-7 as a transform kernel will be described.

SDST according to the present invention may be performed in two steps. The first step is shuffling the residual signals in the PU of the CU predicted in the inter mode or the intra mode. The second step is applying DST-7 to the shuffled residual signals in the block.

Residual signals arranged in the current block (for example, CU, PU, or TU) may be scanned in a first direction, and may be rearranged in a second direction. That is, the residual signals arranged in the current block may be scanned in the first direction, and may be rearranged in the second direction, whereby shuffling can be performed. Here, the residual signal may mean a signal indicating a residual signal between the original signal and a prediction signal. That is, the residual signal may mean a signal before performing at least one of transform and quantization. Alternatively, the residual signal may mean a signal on which at least one of transform and quantization is performed.

Also, the residual signal may mean a reconstructed residual signal. That is, the residual signal may mean a signal on which at least one of inverse-transform and dequantization is performed. Also, the residual signal may mean a signal before performing at least one of inverse-transform and dequantization.

In the meantime, the first direction (or scanning direction) may be one of a raster scan order, an up-right diagonal scan order, a horizontal scan order, and a vertical scan order. Also, the first direction may be defined as follows.

(1) scanning from the top row to the bottom row, but scanning from the left to the right in one row
(2) scanning from the top row to the bottom row, but scanning from the right to the left in one row
(3) scanning from the bottom row to the top row, but scanning from the left to the right in one row
(4) scanning from the bottom row to the top row, but scanning from the right to the left in one row
(5) scanning from the left column to the right column, but scanning from the top to the bottom in one column
(6) scanning from the left column to the right column, but scanning from the bottom to the top in one column
(7) scanning from a right column to a left column, but scanning from the top to the bottom in one column
(8) scanning from a right column to a left column, but scanning from the bottom to the top in one column
(9) scanning in a spiral shape: scanning from the inside (or outside) of the block to the outside (or inside) of the block, and in a clockwise/counter clockwise direction
(10) diagonal scanning: diagonally scanning from one corner in a block to the top left, the top right, the bottom left, or the bottom right In the meantime, one of the above-described scanning directions may be selectively used as the second direction (or rearrangement direction). The first direction and the second direction may be the same, or may be different from each other.

Scan and rearrangement processes for the residual signals may be performed on each current block.

Here, the rearrangement may mean arranging the residual signals, which are scanned in the block in the first direction, in the same-size block in the second direction. Also, the size of the block scanned in the first direction may differ from the size of the block rearranged in the second direction.

Also, here, scan and rearrangement are individually performed according to the first direction and the second direction, respectively, but scan and rearrangement may be performed as one process with respect to the first direction. For example, the residual signals in the block are scanned from the top row to the bottom row, but in one row, and the residual signals are scanned from the right to the left, and may be stored (rearranged) in the block.

In the meantime, scan and rearrangement processes for the residual signals may be performed on each predetermined sub-block in the current block. Here, the sub-block may be a block equal to or smaller than the current block in size.

The sub-block may have fixed size/shape (for example, 4×4, 4×8, 8×8, . . . , N×M, here, N and M are positive integers). Also, the size and/or the shape of the sub-block may be variously derived. For example, the size and/or the shape of the sub-block may be determined depending on the size, the shape, and/or prediction modes (inter, intra) of the current block.

Scanning direction and/or rearrangement direction may be adaptively determined depending on the position of the sub-block. In this case, each sub-block may use a different scanning direction and/or different rearrangement direction. Alternatively, all or a part of sub-blocks in the current block may use the same scanning direction and/or the same rearrangement direction.

Figure 16:
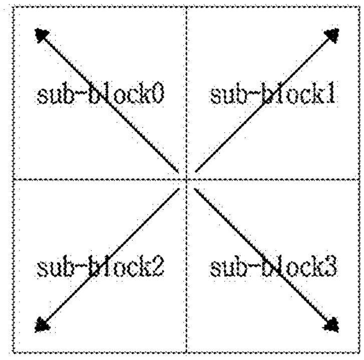
FIG. 16 is a view showing a distribution characteristic of residual signals in a 2N×2N prediction unit (PU) mode of a coding unit (CU) according to the present invention.

FIG. 16 is a view showing a distribution characteristic of residual signals in a 2N×2N prediction unit (PU) mode of a coding unit (CU) according to the present invention.

Referring to FIG. 16, the PU is partitioned into four sub-blocks in a quad-tree structure, and an arrow direction of each sub-block indicates the distribution characteristic of residual signals. Specifically, the arrow direction of each sub-block indicates a direction in which the residual signals increase. Regardless of a PU partitioning mode, residual signals in the PU have common distribution characteristics. Accordingly, in order to have a distribution characteristic appropriate for DST-7 transform, it is possible to perform shuffling for rearranging a residual signal of each sub-block.

Figure 17:
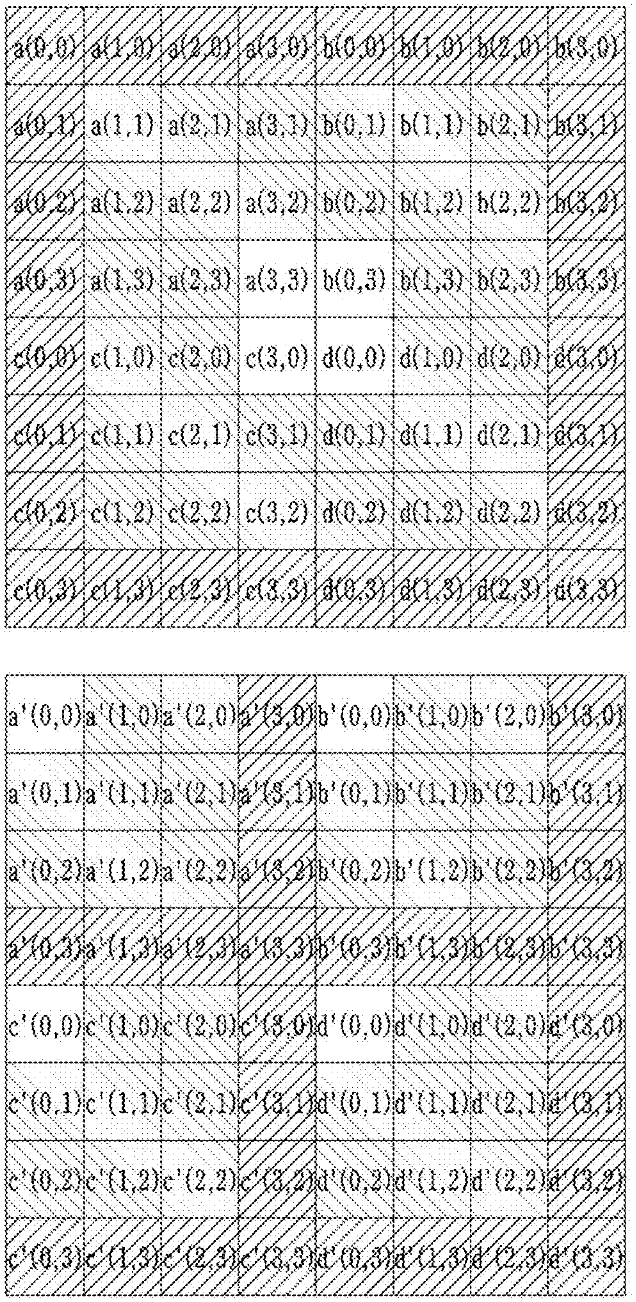
FIG. 17 is a view showing distribution characteristics of residual signals before and after shuffling of a 2N×2N prediction unit (PU) according to the present invention.

FIG. 17 is a view showing distribution characteristics of residual signals before and after shuffling of a 2N×2N prediction unit (PU) according to the present invention.

Referring to FIG. 17, the left block shows distribution before shuffling of residual signals in a 2N×2N PU of an 8×8 CU predicted in the inter mode. The following formula 5 indicates values according to the position of each residual signal in the left bock of FIG. 17.

[Formula 5]

$$a(x, y), b(x, y), c(x, y), d(x, y),$$
$$0 \le x \le \frac{PU\text{ width}}{2}, 0 \le y \le \frac{PU\text{ height}}{2}$$

Due to distribution characteristic of residual signals in the PU of the CU predicted in the inter mode, residual signals having relatively small values are substantially distributed in the central region in the left block of the FIG. 17. Residual signals having large values are substantially distributed at the boundaries of the left block.

In FIG. 17, the right block shows distribution of residual signals in a 2N×2N PU after shuffling. This shows that the residual signal distribution for each sub-block of the PU on which shuffling is performed is the residual signal distribution appropriate to the first basis vector of DST-7. That is, the residual signal in each sub-block has a large value when positioned away from the (0, 0) position. Thus, when performing transform, transform coefficient values that are frequency-transformed through DST-7 may concentrically occur in a low frequency region.

The following formula 6 indicates a shuffling method according to a position of each sub-block in the PU that is partitioned into four sub-blocks in a quad-tree structure.

[Formula 6]

$$S0$$
$$a'(x, y) = a(W_{blk0} - 1 - x, H_{blk0} - 1 - y)$$
$$S1$$
$$b'(x, y) = b(x, H_{blk1} - 1 - y)$$
$$S2$$
$$c'(x, y) = c(W_{blk2} - 1 - x, y)$$
$$S3$$
$$d'(x, y) = d(x, y)$$
$$0 \le x \le W_k, 0 \le y \le H_k, k \in \{blk0, blk1, blk2, blk3\}$$

Here, the width and the height of the k-th sub-block ($k^{\in}$ {blk0, blk1, blk2, blk3}) in the PU are designated as Wk and Hk, and sub-blocks partitioned from the PU in a quad-tree structure are designated as blk0 to blk3. Also, horizontal and vertical positions in each sub-block are designated as x and y. The positions of residual signals before shuffling are designated as a(x,y), b(x,y), c(x,y), and d(x,y) as shown in the left block of FIG. 17. The changed positions of residual signals through shuffling are designated as a'(x,y), b'(x,y), c'(x,y), and d'(x,y) as shown in the right block of FIG. 17.

FIG. 18 is a view showing an example of rearrangement of 4×4 residual data of sub-blocks according to the present invention.

Referring to FIG. 18, the sub-block may mean one of several sub-blocks in an 8×8 prediction block. FIG. 18(*a*) shows the position of original residual data before rearrangement, and FIG. 18(*b*) shows the rearranged position of residual data.

Referring to FIG. 18(*c*), the value of residual data gradually increases from (0,0) position to (3,3) position. Here, horizontal and/or vertical one-dimensional residual data in each sub-block may have data distribution in a type of a basis vector shown in FIG. 13.

That is, shuffling according to the present invention may rearrange residual data of each sub-block such that residual data distribution is appropriate to a type of DST-7 basis vector.

After shuffling for each sub-block, DST-7 transform may be applied to data rearranged for each sub-block.

In the meantime, based on the depth of a TU, the sub-block may be partitioned in a quad-tree structure, or a rearrangement process may be selectively performed. For example, when the depth of the TU is two, an N×N sub-block in a 2N×2N PU may be partitioned into N/2×N/2 blocks, and a rearrangement process may be applied to each of the N/2×N/2 block. Here, quad-tree based TU partition may be continually performed until being the minimum TU size.

Also, when the depth of the TU is zero, DCT-2 transform may be applied to the 2N×2N block. Here, rearranging of the residual data may not be performed.

In the meantime, the SDST method according to the present invention uses the distribution characteristic of the residual signals in the PU block, such that a partition structure of the TU performing SDST may be defined as partitioning in a quad-tree structure based on a PU.

Figure 19A:
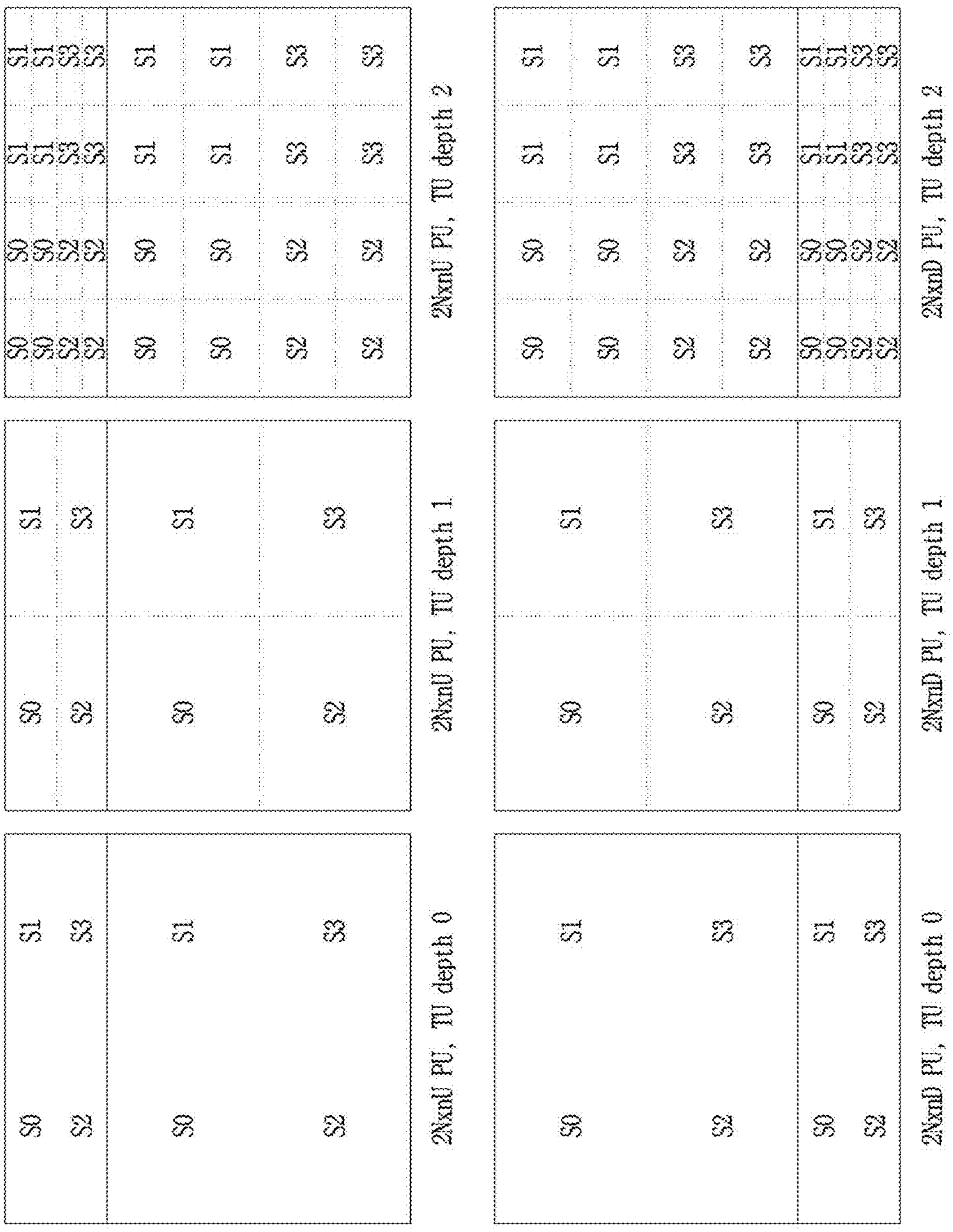
FIG. 19A and FIG. 19B are views showing a partition structure of a transform unit (TU) according to a prediction unit (PU) mode of a coding unit (CU) and a shuffling method of a transform unit (TU) according to the present invention.
Figure 19B:
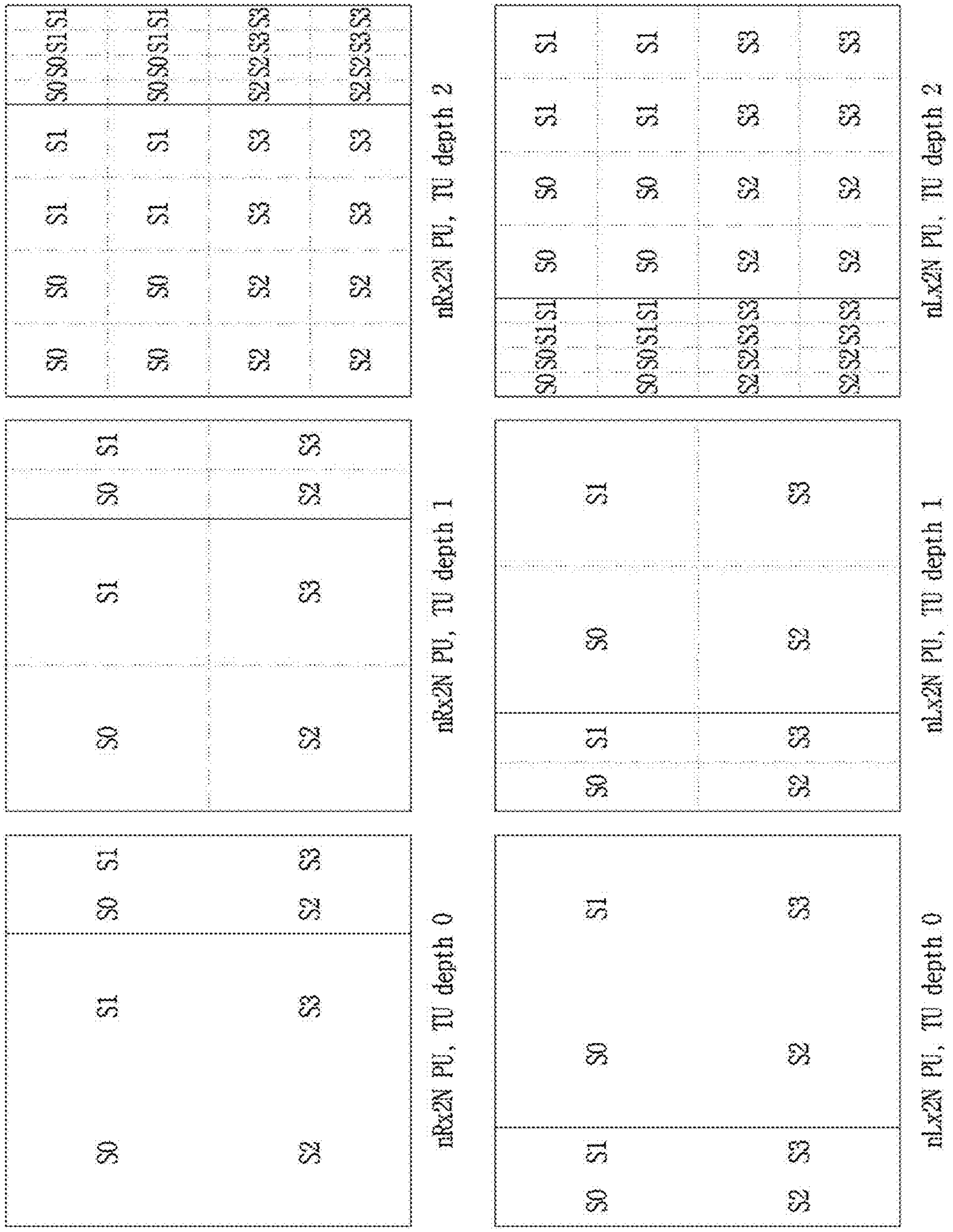

FIGS. 19(*a*) and 19(*b*) are views showing a partition structure of a transform unit (TU) according to a prediction unit (PU) mode of a coding unit (CU) and a shuffling method of a transform unit (TU) according to the present invention. FIGS. 19(*a*) and 19(*b*) show quad-tree partition structures of the TU according to the depth of the TU for each of asymmetry partition modes (2N×nU, 2N×nD, nR×2N, nL×2N) of an inter-predicted PU.

Referring to FIGS. 19(*a*) and 19(*b*), the thick lines of each block indicate a PU in a CU, and the thin lines indicate a TU. Also, S0, S1, S2, and S3 in TUs indicate the shuffling method of the residual signal in the TU defined in formula.

In the meantime, in FIGS. 19(*a*) and 19(*b*), the TU having the depth of zero in each PU has the same block size as the PU (for example, in the 2N×2N PU, the size of the TU having the depth of zero is the same as the size of the PU). Here, shuffling for the residual signal in the TU having the depth of zero will be disclosed with reference to FIG. 23.

Also, when at least one of the CU, the PU, and the TU has a rectangular shape (for example, 2N×nU, 2N×nD, nR×2N, and nL×2N), at least one of the CU, the PU, and the TU is partitioned into N sub-blocks such as 2, 4, 6, 8, 16 sub-blocks, etc. before rearrangement of the residual signals, and the rearrangement of the residual signals may be applied to the partitioned sub-blocks.

Also, when at least one of the CU, the PU, and the TU has a square shape (for example, 2N×2N and N×N), at least one of the CU, the PU, and the TU is partitioned into N sub-blocks such as 4, 8, 16 sub-blocks, etc. before rearrangement of the residual signals, and the rearrangement of the residual signals may be applied to the partitioned sub-blocks.

Also, when the TU is partitioned from the CU or the PU and the TU has the topmost depth (unable to be partitioned), the TU may be partitioned into N sub-blocks such as 2, 4, 6, 8, 16 sub-blocks, etc. and the rearrangement of the residual signals may be applied to the partitioned sub-blocks.

The above example shows performing rearrangement of the residual signals, when the CU, the PU, and the TU have different shapes or sizes. However, the rearrangement of the residual signals may be applied even when at least two of the CU, the PU, and the TU have the same shape or size.

In the meantime, FIG. 19 shows asymmetry partition modes of the inter-predicted PU, but the asymmetry partition modes are not limited thereto. Partitioning and shuffling of the TU may be applied to the symmetry partition modes (2N×N and N×2N) of the PU.

DST-7 transform may be performed on each TU in the PU where shuffling is performed. Here, when the CU, the PU, and the TU have the same size and shape, DST-7 transform may be performed on one block.

In considering the distribution characteristic of the residual signals of the inter-predicted PU block, performing DST-7 transform after shuffling is a more effective transform method, rather than performing DCT-2 transform regardless of the size of the CU and the PU partitioning mode.

After transform, the fact that transform coefficients are substantially distributed near a low-frequency component (particularly, DC component) means 1) minimizing energy loss after quantization, and 2) having higher compression efficiency in an entropy coding process in term of bit usage reduction, compared to the opposite case in distribution of the residual signals.

FIG. 20 is a view showing results of performing DCT-2 transform and SDST transform based on the residual signal distribution of a 2N×2N prediction unit (PU) according to the present invention.

The left of FIG. 20 shows the distribution where the residual signal increases from the center to the boundary when the PU partitioning mode of the CU is 2N×2N. Also, the middle of FIG. 20 shows the distribution of the residual signals that performed DCT-2 transform on the TU having the depth of one in the PU. The right of FIG. 20 shows the distribution of the residual signals that performed DST-7 transform (SDST) on the TU having the depth of one in the PU after shuffling.

Referring to FIG. 20, when performing SDST on the TU of PU having a distribution characteristic of the residual signals, more substantial coefficients are concentrated near the low-frequency component, compared to performing DCT-2. Smaller coefficient values occur on the high-frequency component side. When transforming the residual signals of the inter-predicted PU based on such a transform characteristic, higher compression efficiency can be obtained by performing SDST instead of DCT-2.

SDST is performed on a block, which is a TU defined in the PU, on which DST-7 transform is performed. The partition structure of the TU is a quad-tree structure or a binary-tree structure from the PU size up to the maximum depth as shown in FIG. 19. This means that DST-7 transform can be performed on a square block as well as a rectangular block after shuffling.

Figure 21:
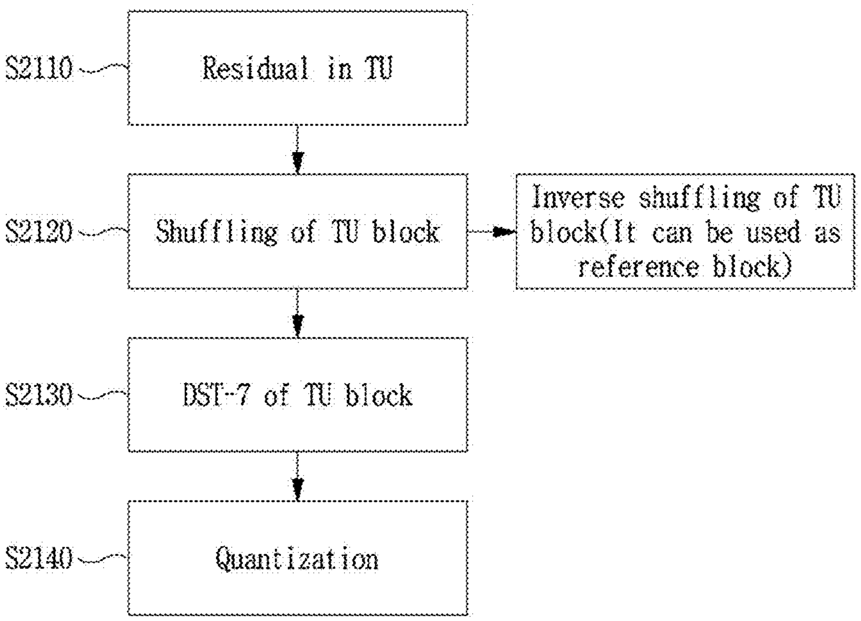
FIG. 21 is a view showing a SDST process according to the present invention.

FIG. 21 is a view showing a SDST process according to the present invention. In transforming the residual signal in the TU at step S2110, first, shuffling may be performed on the partitioned TU in the PU of which the prediction mode is the inter mode at step S2120. Next, DST-7 transform is performed on the shuffled TU at step S2130, and quantization may be performed at step S2140 and a series of subsequent steps may be performed.

In the meantime, shuffling and DST-7 transform may be performed on a block of which the prediction mode is in the intra mode.

Hereinafter, as embodiments for realizing SDST in the encoder, i) a method of performing SDST on all TUs in the inter-predicted PU, and ii) a method of selectively performing SDST or DCT-2 through rate-distortion optimization will be disclosed. The following methods are described for the inter-predicted block, but without being limited thereto, the following methods may be applied to the intra-predicted block.

Figure 22:
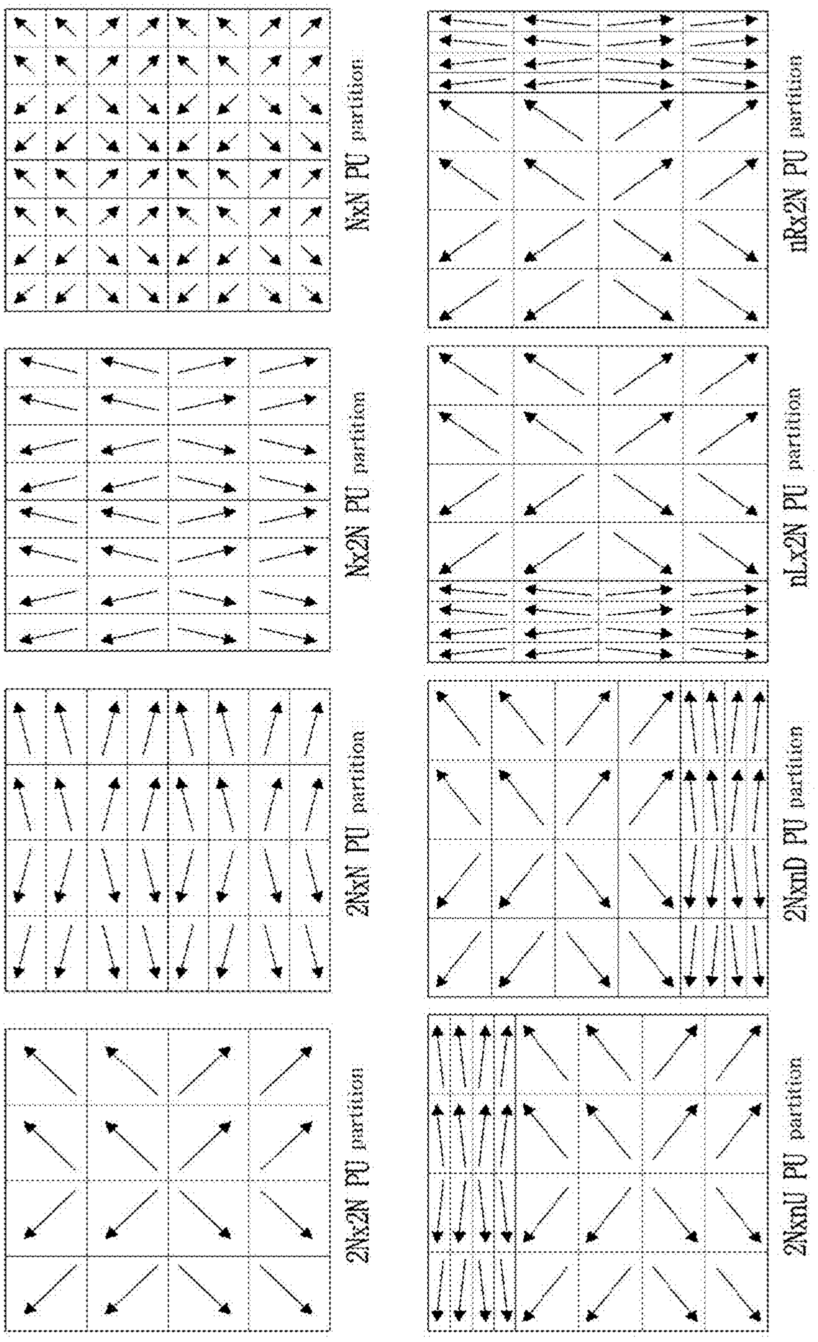
FIG. 22 is a view showing distribution characteristics of transform unit (TU) partition and residual absolute values based on a prediction unit (PU) partitioning mode of an inter-predicted coding unit (CU) according to the present invention.

FIG. 22 is a view showing distribution characteristics of transform unit (TU) partition and residual absolute values based on a prediction unit (PU) partitioning mode of an inter-predicted coding unit (CU) according to the present invention.

Referring to FIG. 22, in the inter-prediction mode, the CU may be partitioned into TUs to the maximum depth in a quad-tree structure or a binary-tree structure, and the number of partition modes of the PU may be K. Here, K is a positive integer, and K in FIG. 22 is eight.

SDST according to the present invention uses a distribution characteristic of the residual signals of the PU in the inter-predicted CU as described in FIG. 15. Also, the PU may be partitioned in to TUs in a quad-tree structure or a binary-tree structure. The TU having the depth of zero may correspond to the PU, and the TU having the depth of one may correspond to each sub-block partitioned from the PU in a quad-tree structure or a binary-tree structure.

Each block of FIG. 22 is partitioned into TUs having the depth of two according to each PU partitioning mode of the inter-predicted CU. Here, the thick lines indicate the PU, and the thin lines indicate the TU. The arrow direction of each TU indicates a direction in which the value of the residual signal in the TU increases. Shuffling may be performed on each TU according to the position thereof in the PU.

Particularly, when the TU has the depth of zero, shuffling may be performed in various methods besides the above-described methods for shuffling.

One of the methods is that scanning from the residual signal at the center of the PU, scanning neighbor residual signals in a spiral direction, and rearranging the scanned residual signals from (0,0) position of the PU in a zigzag scanning order.

FIG. 23 is a view showing scanning order and rearranging order for the residual signal of the transform unit (TU) having the depth of zero in the prediction unit (PU).

FIGS. 23(*a*) and 23(*b*) shows the scanning order for shuffling, and FIG. 23(*c*) shows the rearranging order for SDST.

DST-7 transform is performed on the shuffled residual signal in each TU, and quantization and entropy encoding, etc. may be performed thereon. Such a shuffling method uses a distribution characteristic of the residual signals in the TU according to the PU partitioning mode. The shuffling method may optimize distribution of the residual signals so as to enhance efficiency of DST-7 transform which is the subsequent step.

In the encoder, SDST on all TUs in the inter-predicted PU may be performed according to the SDST process in FIG. 21. According to the PU partitioning mode of the inter-predicted CU, as described in FIG. 22, the PU may be partitioned into TUs up to the maximum depth of two. Shuffling may be performed on the residual signal in each TU by using a distribution characteristic of the residual signal in the TU in FIG. 22. Next, quantization and entropy encoding, etc. may be performed after transform using DST-7 transform kernel.

In the decoder, when reconstructing the residual signal of the TU in the inter-predicted PU, DST-7 inverse-transform is performed on each TU of the inter-predicted PU. A reconstructed residual signal may be obtained by inverse-shuffling a reconstructed residual signal. According to this SDST method, SDST is applied to a transform method of all TUs in the inter-predicted PU, such that there is no a flag or information to be transmitted to the decoder. That is, the SDST method may be performed without signaling for the SDST method.

In the meantime, even when performing SDST on all TUs in the inter-predicted PU, the encoder determines a part of the above-described rearrangement method of the residual signal with respect to shuffling, as the optimum rearrangement method. Information on the determined rearrangement method may be transmitted to the decoder.

As another embodiment for realizing SDST, a transform method of the PU being applied by using one of DCT-2 and SDST through RDO will be disclosed. Compared to the previous embodiment of performing SDST on all TUs in the inter-predicted PU, computation of the encoder may increase according to this method. However, a more effective transform method is selected from DCT-2 and SDST, such that higher compression efficiency may be obtained than the previous embodiment.

Figure 24:
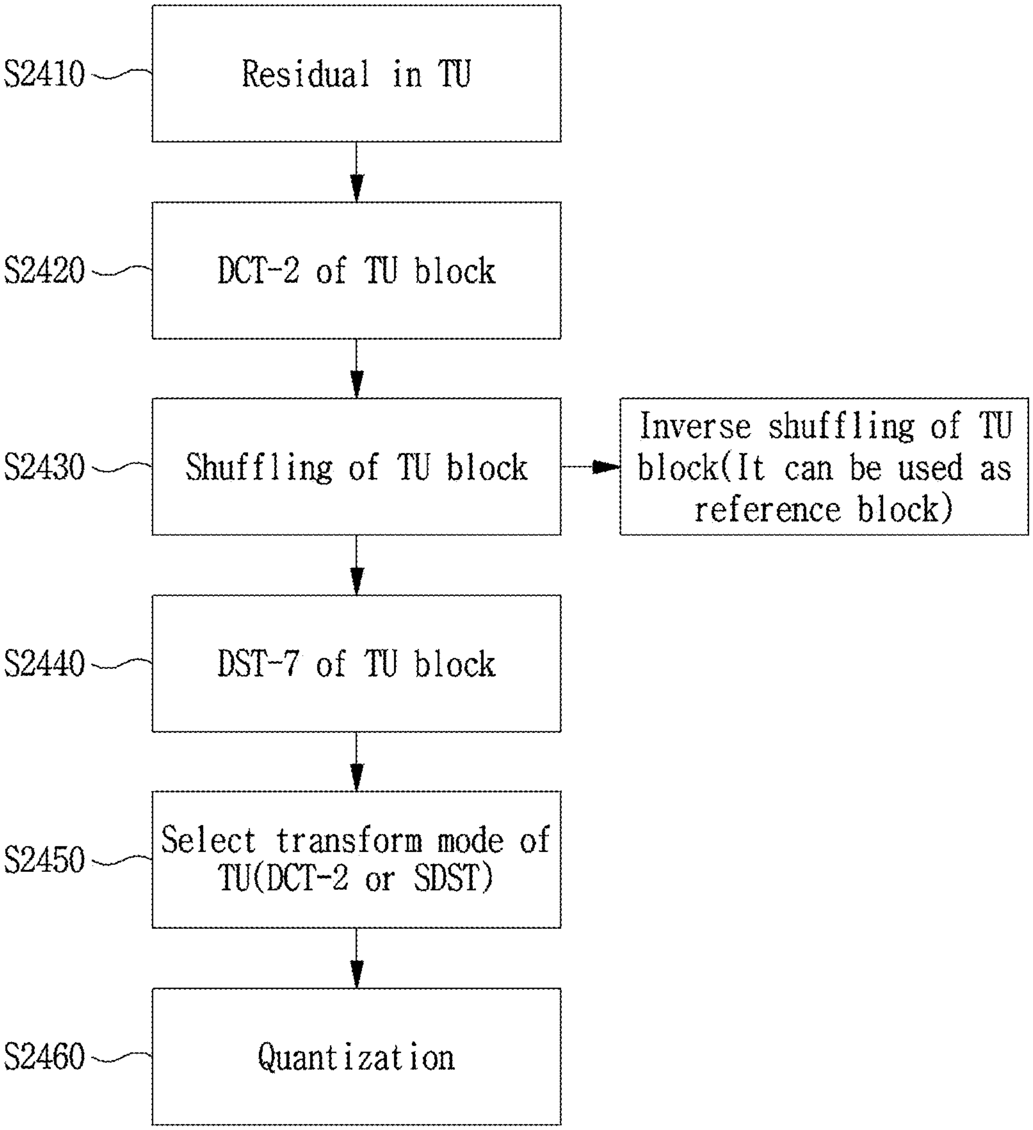
FIG. 24 is a flowchart showing an encoding process selecting DCT-2 or SDST through rate-distortion optimization (RDO) according to the present invention.

FIG. 24 is a flowchart showing an encoding process selecting DCT-2 or SDST through rate-distortion optimization (RDO) according to the present invention.

Referring to FIG. 24, in transform of the residual signal of the TU at step S2410, the cost of the TU obtained by performing DCT-2 on each TU in the PU performing prediction in the inter mode at step S2420 is compared with the cost of the TU obtained by performing SDST at steps S2430 and S2440, and the optimum transform mode (DCT-7 or SDST) of the TU may be determined in terms of rate-distortion at step S2450. Next, quantization at step S2460 and entropy encoding, etc. may be performed on the transformed TU according to the determined transform mode.

In the meantime, only when the TU applying SDST or DCT-2 satisfies one of the following conditions, the optimum transform mode may be selected through RDO.

i) The TU performing DCT-2 and SDST is partitioned in a quad-tree structure or a binary-tree structure or the CU size based on the CU regardless of the PU partitioning mode.

ii) The TU performing DCT-2 and SDST is partitioned from the PU in a quad-tree structure or a binary-tree structure or the PU size according to the PU partitioning mode.

iii) The TU performing DCT-2 and SDST is not partitioned based on the CU regardless of the PU partitioning mode.

The condition i) is a method of selecting DCT-2 or SDST as a transform mode for the TU partitioned in a quad-tree structure or a binary-tree structure or the CU size from the CU in terms of rate-distortion optimization regardless of the PU partitioning mode.

The condition ii) is that DCT-2 and SDST are performed on the TU partitioned in a quad-tree structure or in a binary-tree structure or in the PU size according to the PU partitioning mode that is described in the embodiment for performing SDST on all TUs in the inter-predicted PU, and the transform mode of the TU is determined by using the cost.

The condition iii) is that regardless of the PU partitioning mode, without partitioning the CU or the TU having the same size as the CU, DCT-2 and SDST are performed and the transform mode of the TU is determined.

When comparing RD costs for the TU having the depth of zero in the particular PU partitioning mode, the cost for the result of performing SDST on the TU having the depth of zero is compared with the cost for the result of performing DCT-2 on the TU having the depth of zero, whereby the transform mode of the TU having the depth of zero may be selected.

Figure 25:
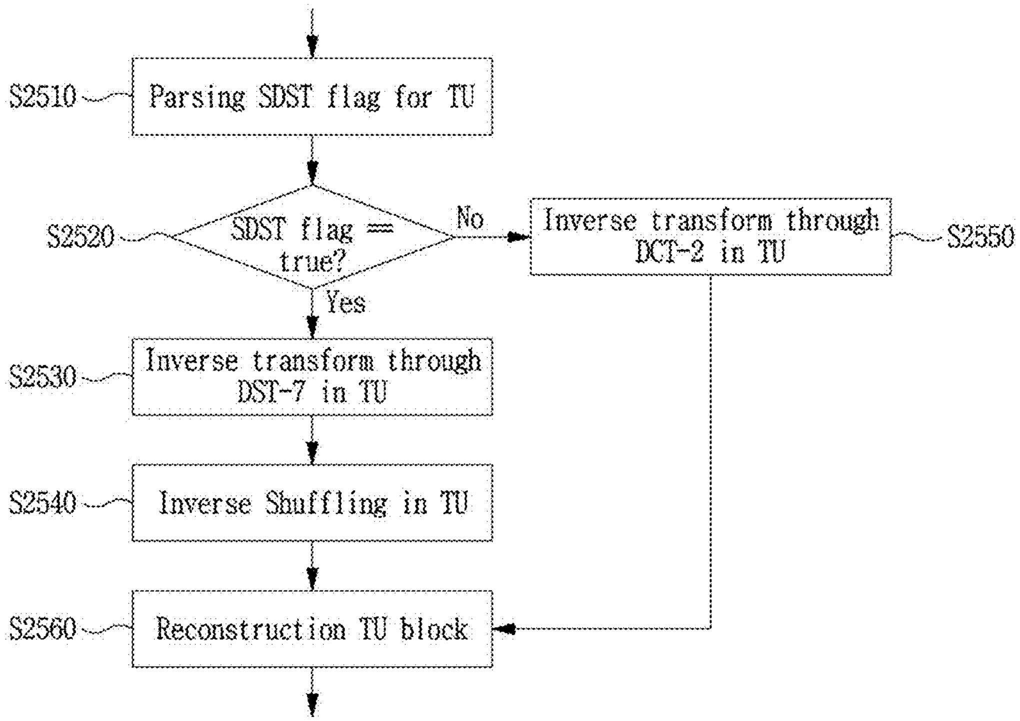
FIG. 25 is a flowchart showing a decoding process selecting DCT-2 or SDST according to the present invention.

FIG. 25 is a flowchart showing a decoding process selecting DCT-2 or SDST according to the present invention.

Referring to FIG. 25, the transmitted SDST flag may be referenced for each TU at step S2510. Here, the SDST flag may be a flag indicating whether or not SDST is used as the transform mode.

When the SDST flag is true at step S2520—Yes, a SDST mode is determined as the transform mode of the TU and DST-7 inverse-transform is performed on the residual signal in the TU at step S2530. Inverse-shuffling using the above-described formula 6 according to the position of the TU in the PU is performed on the residual signal in the TU on which DST-7 inverse-transform is performed at step S2540, and consequently, a reconstructed residual signal may be obtained at step S2560.

In the meantime, when the SDST flag is not true at step S2520—No, a DCT-2 mode is determined as the transform mode of the TU and DCT-2 inverse-transform is performed on the residual signal in the TU at step S2550, and consequently, a reconstructed residual signal may be obtained at step S2560.

When the SDST method is used, residual data may be rearranged. Here, the residual data may mean residual data corresponding to the inter-predicted PU. Integer transform induced from DST-7 by using separable property may be used as the SDST method.

In the meantime, sdst_flag may be signaled for the selective use of DCT-2 or DST-7. The sdst_flag may be signaled for each TU. The sdst_flag is used to identify whether or not SDST is performed.

Figure 26:
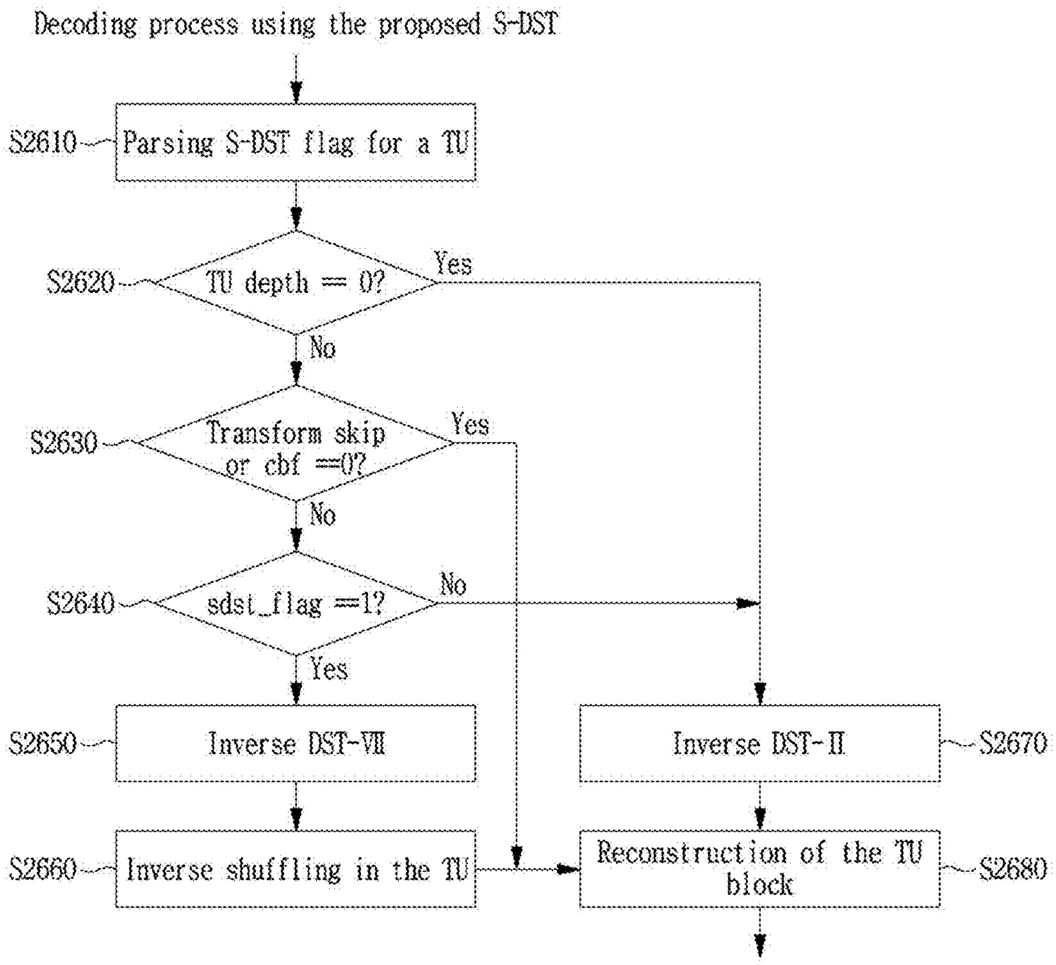
FIG. 26 is a flowchart showing a decoding process using SDST according to the present invention.

FIG. 26 is a flowchart showing a decoding process using SDST according to the present invention.

Referring to FIG. 26, the sdst_flag may be signaled and may be entropy decoded for each TU at step S2610.

First, when the depth of the TU is zero at step S2620—Yes, the TU may be reconstructed by using DCT-2 rather than using SDST at steps S2670 and S2680. SDST may be performed on the TU having the depth from one up to the maximum.

Also, even through the depth of the TU is not zero at step S2620—No, when the transform mode of the TU is a transform skip mode and/or when the value of a coded block flag (cbf) of the TU is zero at step S2630—Yes, the TU may be reconstructed without performing inverse-transform at step S2680.

In the meantime, when the depth of the TU is not zero at step S2620—No and the transform mode of the TU is not the transform skip mode and the value of cbf of the TU is not zero at step S2630—No, the value of the sdst_flag may be identified at step S2640.

Here, when the value of the sdst_flag is one at step S2640—Yes, DST-7 based inverse-transform may be performed at step S2650, and inverse-shuffling is performed on the residual data of the TU at step S2660 and the TU may be reconstructed at step S2680. In contrast, when the value of the sdst_flag is not zero at step S2640—No, DCT-2 based inverse-transform may be performed at step S2670 and the TU may be reconstructed at step S2680.

Here, a target signal of shuffling or rearrangement may be at least one of: a residual signal before inverse-transform, a residual signal before dequantization, a residual signal after inverse-transform, a residual signal after dequantization, a reconstructed residual signal, and a reconstructed block signal.

In the meantime, the sdst_flag is signaled for each TU in FIG. 26, but the sdst_flag may be selectively signaled based on at least one of the transform mode of the TU or the value of cbf of the TU. For example, when the transform mode of the TU is the transform skip mode and/or when the value of cbf of the TU is zero, the sdst_flag may not be signaled. Also, when the depth of the TU is zero, the sdst_flag may not be signaled.

In the meantime, the sdst_flag is signaled for each TU, but also may be signaled for a predetermined unit. For example, the sdst_flag may be signaled for at least one of a video, a sequence, a picture, a slice, a tile, a coding tree unit, a coding unit, a prediction unit, and a transform unit.

As in the embodiments of the SDST flag of FIG. 25 and the sdst_flag of FIG. 26, the selected transform mode information may be entropy encoded/decoded for each TU through a n-bit flag (n is a positive integer equal to or greater than one). The transform mode information may indicate at least one of: whether transformed is performed on the TU through DCT-2, through SDST, or through DST-7, etc.

Only in a case of the TU in the inter-predicted PU, the transform mode information may be entropy encoded/decoded in a bypass mode. Also, when the transform mode is at least one of the transform skip mode, a RDPCM (Residual Differential PCM) mode, or a lossless mode, the transform mode information may not be entropy encoded/decoded and may not be signaled.

Also, when the value of the coded block flag of the block is zero, the transform mode information may not be entropy encoded/decoded and may not be signaled. When the value of the coded block flag is zero, the inverse-transform process is omitted in the decoder. Thus, even through the transform mode information does not exist in the decoder, the block may be reconstructed.

However, the transform mode information is not limited to indicating the transform mode as a flag, and may be realized as a predefined table and index. Here, transform modes available for each index may be defined as the predefined table.

Also, DCT or SDST may be performed in a horizontal direction and a vertical direction separately. The same transform mode may be used in the horizontal direction and the vertical direction, or different transform modes may be used.

Also, transform mode information on whether DCT-2, SDST, and DST-7 are used in the horizontal direction and the vertical direction may be respectively entropy encoded/decoded.

Also, the transform mode information may be entropy encoded/decoded in at least one of the CU, the PU, and the TU.

Also, the transform mode information may be transmitted according to a luma component or a chroma component. That is, the transform mode information may be transmitted according to Y component or Cb component or Cr component. For example, when signaling the transform mode information on whether DCT-2 or SDST is performed on Y component, transform mode information signaled in the Y component without signaling transform mode information in at least one of the Cb component and the Cr component may be used as the transform mode of the block.

Here, the transform mode information may be entropy encoded/decoded by an arithmetic coding method using a context model. When the transform mode information is realized as a predefined table and index, all or a part of several bins may be entropy encoded/decoded by the arithmetic coding method using the context model.

Also, the transform mode information may be selectively entropy encoded/decoded according to the block size. For example, when the size of the current block is equal to or greater than 64×64, the transform mode information may not be entropy encoded/decoded. When the size of the current block is equal to or less than 32×32, the transform mode information may be entropy encoded/decoded.

Also, when one transform coefficient or one quantization level that is not zero exists in the current block, the transform mode information may not be entropy encoded/decoded, and at least one method of DCT-2 or DST-7 or SDST may be performed thereon. Here, regardless of the position in the block for the transform coefficient or the quantization level that is not zero, the transform mode information may not be entropy encoded/decoded. Also, only when the transform coefficient or the quantization level that is not zero exists at the top left in the block, the transform mode information may not be entropy encoded/decoded.

Also, when J or more transform coefficients or quantization levels that are not zero exist in the current block, the transform mode information may be entropy encoded/decoded. Here, J is a positive integer.

Also, the transform mode information may vary due to limited use of some transform modes according to the transform mode of a collocated block, or due to a binarization method of the transform information for indicating the transform mode of the collocated block as fewer bits.

The SDST may be limitedly used based on at least one of the prediction mode of the current block, the depth, the size, the shape of the TU.

For example, SDST may be used when the current block is encoded in the inter mode.

The minimum/maximum depth for permitting SDST may be defined. In this case, when the depth of the current block is equal to or greater than the minimum depth, SDST may be used. Alternatively, when the depth of the current block is equal to or greater than the maximum depth, SDST may be used. Here, the minimum/maximum depth may be fixed value, or may be variously determined based on the information indicating the minimum/maximum depth. The information indicating the minimum/maximum depth may be signaled from the encoder, and may be derived by the decoder based on property of the current/neighbor block (for example, the size, the depth, and/or the shape).

The minimum/maximum size for permitting SDST may be defined. Similarly, when the size of the current block is equal to or greater than the minimum size, SDST may be used. Alternatively, when the size of the current block is equal to or greater than the maximum size, SDST may be used. Here, the minimum/maximum size may be fixed value, or may be variously determined based on the information indicating the minimum/maximum size. The information indicating the minimum/maximum size may be signaled from the encoder, and may be derived by the decoder based on property of the current/neighbor block (for example, the size, the depth, and/or the shape). For example, when the size of the current block is 4×4, DCT-2 may be used as the transform method, and transform mode information on whether DCT-2 or SDST is used may not be entropy encoded/decoded.

The shape of the block for permitting SDST may be defined. In this case, when the shape of the current block is the defined shape of the block, SDST may be used. Alternatively, the shape of the block for not permitting SDST may be defined. In this case, when the shape of the current block is the defined shape of the block, SDST may not be used. The shape of the block for permitting or not permitting SDST may be fixed, and information thereof may be signaled from the encoder. Alternatively, information thereof may be derived by the decoder based on property of the current/neighbor block (for example, the size, the depth, and/or the shape). The shape of the block for permitting or not permitting SDST may mean, for example, M, N and/or the ratio of M to N in MxN block.

Also, when the depth of the TU is zero, DCT-2 or DST-7 may be used as the transform method, and transform mode information on which transform method is used may be entropy encoded/decoded. When using DST-7 as the transform method, rearrangement of the residual signals may be performed. Also, when the depth of the TU is equal to or greater than one, DCT-2 or SDST may be used as the transform method, and transform mode information on which transform method is used may be entropy encoded/decoded.

Also, the transform method may be selectively used according to the partition shape of the CU and the PU or the shape of the current block.

According to an embodiment, when the partition shape of the CU and the PU or the shape of the current block is 2N×2N, DCT-2 may be used and DCT-2 or SDST may be selectively used for the remaining partition and block shapes.

Also, when the partition shape of the CU and the PU or the shape of the current block is 2N×N or N×2N, DCT-2 may be used and DCT-2 or SDST may be selectively used for the remaining partition and block shapes.

Also, when the partition shape of the CU and the PU or the shape of the current block is nR×2N or nL×2N or 2N×nU or 2N×nD, DCT-2 may be used and DCT-2 or SDST may be selectively used for the remaining partition and block shapes.

In the meantime, SDST or DST-7 is performed on each block partitioned from the current block, scanning and inverse-scanning for a transform coefficient (quantization level) may be performed on each partitioned block. Also, SDST or DST-7 is performed on each block partitioned from the current block, scanning and inverse-scanning for a transform coefficient (quantization level) may be performed on each un-partitioned current block.

Also, transform/inverse-transform using SDST or DST-7 may be performed according to at least one of an intra-prediction mode (direction) of the current block, the size of the current block, and a component (a luma component or a chroma component) of the current block.

Also, when performing transform/inverse-transform using SDST or DST-7, DST-1 may be used instead of DST-7. also, when performing transform/inverse-transform using SDST or DST-7, DCT-4 may be used instead of DST-7.

Also, when performing transform/inverse-transform using DCT-2, an arrangement method used in arrangement of the residual signals of SDST or DST-7 may be applied. That is, even when using DCT-2, rearrangement of the residual signals or rotation of the residual signals using a predetermined angle may be performed.

Hereinafter, various modifications and embodiments for a shuffling method and a signaling method will be disclosed.

SDST of the present invention is used to enhance image compression efficiency through change in the transform method. A distribution characteristic of the residual signals in the PU is effectively applied in performing DST-7 through shuffling of the residual signals, and thus high compression efficiency can be obtained.

In the above description of shuffling, the rearrangement method of the residual signals has been disclosed. Hereinafter, besides shuffling, other implementations for the rearrangement method of the residual signals will be disclosed.

In order to minimize hardware complexity for rearrangement of the residual signal, the rearrangement method of the residual signals may be realized by horizontal flipping and vertical flipping methods. The rearrangement methods (1) to (4) of the residual signals may be realized through flipping as follows.

(1): $r'(x,y)=r(x,y)$; flipping unperformed (no flipping)

(2): $r'(x,y)=r(w-1-x,y)$; horizontal direction flipping (3): $r'(x,y)=r(x,h-1-y)$; vertical direction flipping (4): $r'(x,y)=r(w-1-x,h-1-y)$; horizontal direction and vertical direction flipping $r'(x,y)$ is a residual signal after rearrangement, and $r(x,y)$ is a residual signal before rearrangement. The width and the height of the block are respectively designated as w and h. The position of the residual signal in the block is designated as x,y. An inverse-rearrangement method of the rearrangement method using flipping may be performed in the same process of the rearrangement method. That is, the rearranged residual signal by using horizontal direction flipping is further horizontal direction flipped, and thus the original arrangement of the residual signal may be reconstructed. The rearrangement method performed in the encoder and the inverse-rearrangement method performed in the decoder may use the same flipping method.

The residual signal shuffling/rearrangement method using flipping may use the current block without partitioning. That is, in the SDST method, the current block (TU, etc.) is partitioned into sub-blocks and DST-7 is used for each sub-block. However, in the residual signal shuffling/rearrangement method using flipping, without partitioning the current block into sub-blocks, flipping may be performed on all or a part of the current block and then, DST-7 may be used.

Information on whether or not the residual signal shuffling/rearrangement method using flipping is used may be entropy encoded/decoded by using the transform mode information. For example, when a flag bit indicating the transform mode information has a first value, the residual signal shuffling/rearrangement method using flipping and DST-7 may be used as the transform/inverse-transform method. When the flag bit has a second value, another transform/inverse-transform method may be used rather than the residual signal shuffling/rearrangement method using flipping. Here, the transform mode information may be entropy encoded/decoded for each block.

Also, at least one of four flipping methods (no flipping, horizontal direction flipping, vertical direction flipping, horizontal direction, and vertical direction flipping) may be may be entropy encoded/decoded as a flag or an index by using flipping method information. That is, the flipping method performed in the encoder through signaling for the flipping method information may be performed in the decoder. The transform mode information may include the flipping method information.

Also, the rearrangement method of the residual signals is not limited to the previously described rearrangement of the residual signals, and may realize shuffling by rotating the residual signal in the block at a predetermined angle. Here, the predetermined angle may mean zero degrees, 90 degrees, 180 degrees, −90 degrees, −180 degrees, 270 degrees, −270 degrees, 45 degrees, −45 degrees, 135 degrees, −135 degrees, etc. Here, information on the angle may be entropy encoded/decoded as a flag or an index, and may be similarly performed as the signaling method for the transform mode information (transform mode).

Also, when entropy encoding/decoding, the angle information may be prediction encoded/decoded from angle information of a reconstructed block neighboring the current block. When performing rearrangement by using the angle information, SDST or DST-7 may be performed after partitioning the current block. Alternatively, SDST or DST-7 may be performed on each current block without partitioning the current block.

The predetermined angle may be differently determined according to the position of the sub-block. A rearrangement method of rotating only a sub-block of a particular position (for example, the first sub-block) among sub-blocks may be restrictively used. Also, rearrangement using the predetermined angle may be applied to the whole current block. Here, a target current block of rearrangement may be at least one of a residual block before inverse-transform, a residual block before dequantization, a residual block after inverse-transform, a residual block after dequantization, a reconstructed residual block, and a reconstructed block.

In the meantime, in order to obtain the same effect as the residual signal rearrangement or rotation, coefficients of a transform matrix for transform may be rearranged or rotated, and the coefficients are applied to prearranged residual signals, whereby transform is performed. That is, instead of rearrangement of the residual signals, transform is performed by using rearrangement of the transform matrix, whereby the same effect can be obtained as the method of performing residual signal rearrangement and transform. Here, rearrangement of the coefficients of the transform matrix may be performed in the same manner as the residual signal rearrangement methods. A signaling method of information therefor may be performed in the same manner as a signaling method of information for the residual signal rearrangement method.

In the meantime, the encoder may determine a part of the residual signal rearrangement method described in the above description of shuffling as the optimum rearrangement method, and may transmit information on the determined rearrangement method to the decoder. For example, when using four rearrangement methods, the encoder may transmit information on the residual signal rearrangement method by 2 bits to the decoder.

Also, when the rearrangement methods have different occurrence probabilities, the rearrangement method having high occurrence probability may be encoded by using few bits and the rearrangement method having low occurrence probability may be encoded by using relatively substantial bits. For example, the four rearrangement methods may be encoded as truncated unary codes (0, 10, 110, 111) in the order of higher occurrence probability.

Also, according to a coding parameter such as the prediction mode of the current CU, the intra-prediction mode (direction) of the PU, the motion vector of the neighbor block, etc., occurrence probability of the rearrangement method may change. Thus, an encoding method of information on the rearrangement method may be differently used according to the coding parameter. For example, the occurrence probability of the rearrangement method may vary according to the prediction mode of intra prediction. Thus, for each intra mode, few bits are assigned to the rearrangement method having high occurrence probability and substantial bits are assigned to the rearrangement method having low occurrence probability. In some cases, the rearrangement method having extremely low occurrence probability may not used, and bits may not assigned thereto.

The following table 5 shows an example of encoding the residual signal rearrangement method according to the prediction mode of the CU and the intra-prediction mode (direction) of the PU.

TABLE 5

| Prediction | | Residual signal rearrangement method | | | |
|---|---|---|---|---|---|
| mode | Intra-prediction direction | (1) | (2) | (3) | (4) |
| Intra | Planar/DC | 0 | 110 | 10 | 111 |
| Intra | Horizontal direction or near-horizontal direction mode | 0 | — | 1 | — |
| Intra | Vertical direction or near-vertical direction mode | 0 | 1 | — | — |
| Intra | Even number | 0 | 10 | 11 | — |
| Intra | Odd number | 0 | — | 10 | 11 |
| Intra | Otherwise | 0 | 10 | 11 | — |
| Inter | — | 00 | 01 | 10 | 11 |

The residual signal rearrangement methods (1) to (4) in table 5 may specify residual signal rearrangement methods such as an index for scanning/rearrangement order to rearrangement the residual signals, an index for a predetermined angle value, an index for a predetermined flipping method, etc.

As shown in table 5, when the current block is relevant to at least one of the prediction mode and the intra-prediction mode (direction), at least one rearrangement method may be used in the encoder and the decoder.

For example, when the current block is in the intra mode and the intra-prediction direction is the even number, at least one of no flipping, horizontal direction flipping, and vertical direction flipping methods may be used as the residual signal rearrangement method. Also, when the current block is in the intra mode and the intra-prediction direction is the odd number, at least one of no flipping, vertical direction flipping, and horizontal direction and vertical direction flipping methods may be used as the residual signal rearrangement method.

In a case of the Planar/DC prediction of intra prediction, information on the four rearrangement methods may be entropy encoded/decoded as truncated unary codes based on the occurrence frequency of the four rearrangement methods.

When the intra-prediction direction is horizontal direction or near-horizontal direction mode, probability of the rearrangement methods (1) and (3) may be high. In this case, 1 bit is used for each of the two rearrangement methods and information on the rearrangement methods may be entropy encoded/decoded.

When the intra-prediction direction is vertical direction or near-vertical direction mode, probability of the rearrangement methods (1) and (2) may be high. In this case, 1 bit is used for each of the two rearrangement methods and information on the rearrangement methods may be entropy encoded/decoded.

When the intra-prediction direction is the even number, the information on the rearrangement methods (1), (2), and (3) may be entropy encoded/decoded as truncated unary codes.

When the intra-prediction direction is the odd number, the information on the rearrangement methods (1), (3), and (4) may be entropy encoded/decoded as truncated unary codes.

In the other intra-prediction directions, the occurrence probability of the rearrangement method (4) may be low. Thus, information on the rearrangement methods (1), (2), and (3) may be entropy encoded/decoded as truncated unary codes.

In a case of the inter prediction, rearrangement methods (1) to (4) have the same occurrence probability, and the information on the rearrangement methods may be entropy encoded/decoded as a 2-bit fixed length code.

Here, each of encoding bin values may use arithmetic encoding/decoding. Also, each of encoding bin values may be entropy encoded/decoded in a bypass without using arithmetic encoding.

Figure 27:
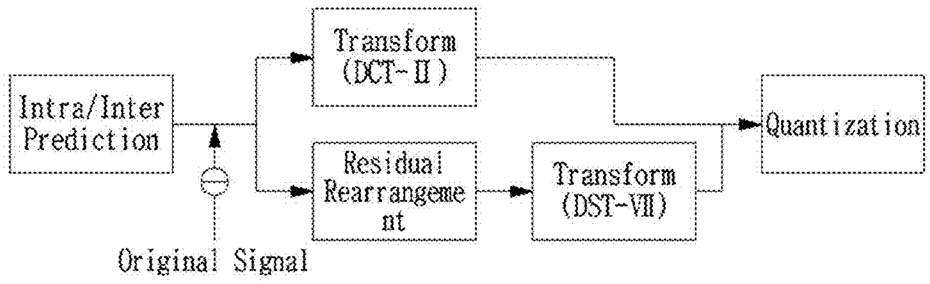
FIGS. 27 and 28 are views showing positions where residual signal rearrangement (residual rearrangement) is performed in an encoder and a decoder according to the present invention.
Figure 28:
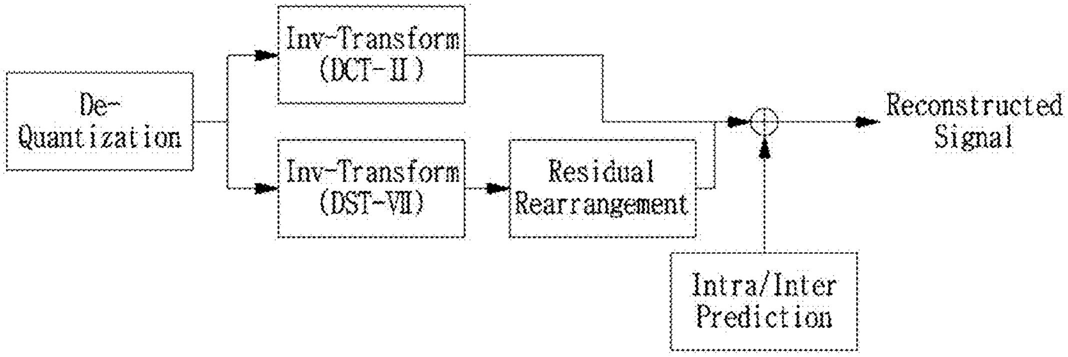

FIGS. 27 and 28 are views showing positions where residual signal rearrangement (residual rearrangement) is performed in an encoder and a decoder according to the present invention.

Referring to FIG. 27, in the encoder, the residual signal rearrangement may be performed before DST-7 transform. Not shown in FIG. 27, in the encoder, the residual signal rearrangement may be performed between transform and quantization, and the residual signal rearrangement may be performed after quantization.

Referring to FIG. 28, in the decoder, the residual signal rearrangement may be performed after DST-7 inverse-transform. Not shown in FIG. 28, in the decoder, the residual signal rearrangement may be performed between dequantization and inverse-transform, and the residual signal rearrangement may be performed before dequantization.

The SDST method according to the present invention has been described above with reference to FIGS. 12 to 28. Hereinafter, a decoding method, an encoding method, a decoder, an encoder, and a bitstream to which the SDST method is applied according to the present invention will be described in detail with reference to FIGS. 29 and 30.

Figure 29:
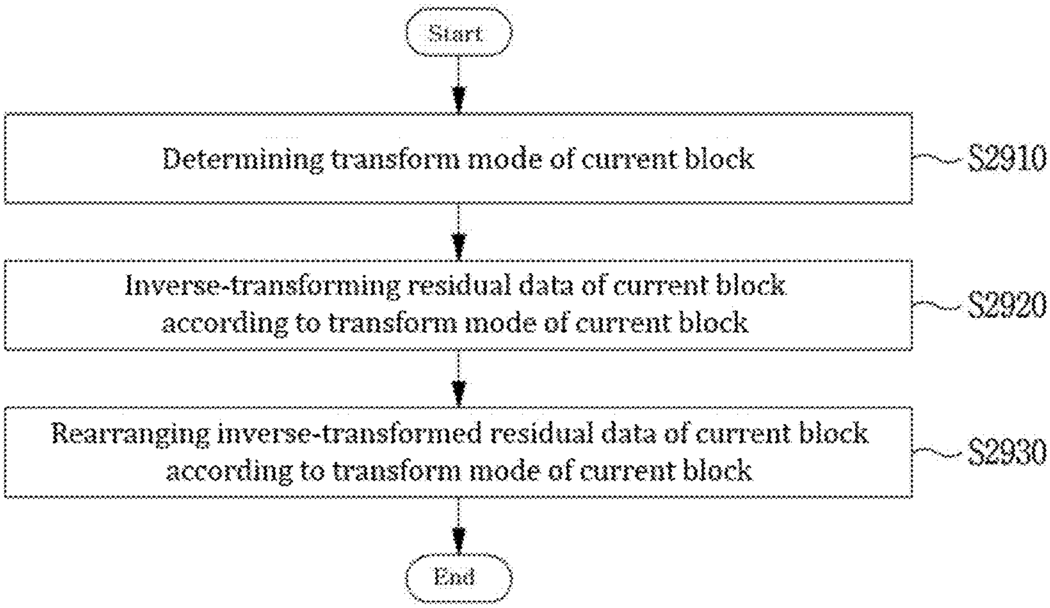
FIG. 29 is a flowchart showing a decoding method using a SDST method according to the present invention.

FIG. 29 is a view showing an encoding method using a SDST method according to the present invention.

Referring to FIG. 29, first, a transform mode of the current block may be determined at step S2910. Residual data of the current block may be inverse-transformed according to the transform mode of the current block at step S2920.

Also, the inverse-transformed residual data of the current block according to the transform mode of the current block may be rearranged at step S2930.

Here, the transform mode may include at least one of SDST (Shuffling Discrete Sine Transform), SDCT (Shuffling Discrete cosine Transform), DST (Discrete Sine Transform), or DCT (Discrete Cosine Transform).

In SDST mode, inverse-transforming may be performed in DST-7 transform mode, and a mode for performing rearrangement on the inverse-transformed residual data may be commanded.

In SDCT mode, inverse-transforming may be performed in DCT-2 transform mode, and a mode for performing rearrangement on the inverse-transformed residual data may be commanded.

In DST mode, inverse-transform may be performed in DST-7 transform mode, and a mode for not performing rearrangement on the inverse-transformed residual data may be commanded.

In DCT mode, inverse-transform may be performed in DCT-2 transform mode, and a mode for not performing rearrangement on the inverse-transformed residual data may be commanded.

Accordingly, only when the transform mode of the current block is one of SDST and SDCT, the rearranging of the residual data may be performed.

For SDST and DST modes, inverse-transform may be performed in DST-7 transform mode, but the transform mode based on another DST such as DST-1, DST-2, etc. may be used.

In the meantime, the determining of the transform mode of the current block at step S2910 may include: obtaining transform mode information of the current block from a bitstream; and determining the transform mode of the current block based on the transform mode information.

Also, the determining of the transform mode of the current block at step S2910 may be performed based on at least one of the prediction mode of the current block, depth information of the current block, the size of the current block, and the shape of the current block.

Specifically, when the prediction mode of the current block is the inter-prediction mode, the transform mode of the current block may be determined as one of SDST and SDCT.

In the meantime, the rearranging of the inverse-transformed residual data of the current block at step S2930 may include: scanning the inverse-transformed residual data arranged in the current block in a first direction order; and rearranging the scanned residual data in the first direction, in the current block in a second direction order. Here, the first direction order may be one of a raster scan order, an up-right diagonal scan order, a horizontal scan order, and a vertical scan order. Also, the first direction order may be defined as follows.

(1) scanning from the top row to the bottom row, but scanning from the left to the right in one row
(2) scanning from the top row to the bottom row, but scanning from the right to the left in one row
(3) scanning from the bottom row to the top row, but scanning from the left to the right in one row
(4) scanning from the bottom row to the top row, but scanning from the right to the left in one row
(5) scanning from the left column to the right column, but scanning from the top to the bottom in one column
(6) scanning from the left column to the right column, but scanning from the bottom to the top in one column
(7) scanning from a right column to a left column, but scanning from the top to the bottom in one column
(8) scanning from a right column to a left column, but scanning from the bottom to the top in one column
(9) scanning in a spiral shape: scanning from the inside (or outside) of the block to the outside (or inside) of the block, and in a clockwise/counter clockwise direction In the meantime, one of the above-described directions may be selectively used as the second direction. The first direction and the second direction may be the same, or may be different from each other.

Also, the rearranging of the inverse-transformed residual data of the current block at step S2930 may be performed on each sub-block in the current block. In this case, the residual data may be rearranged based on the position of the sub-block in the current block. The rearranging of the residual data based on the position of the sub-block has been described in formula 6, thus a repeated description thereof will be omitted.

Also, the rearranging of the inverse-transformed residual data of the current block at step S2930 may be performed by rotating the inverse-transform residual data arranged in the current block at a predefined angle.

Also, the rearranging of the inverse-transformed residual data of the current block at step S2930 may be performed by flipping the inverse-transform residual data arranged in the current block according to a flipping method. In this case, the determining of the transform mode of the current block at step S2910 may include: obtaining flipping method information from a bitstream; and determining a flipping method of the current block based on the flipping method information.

Figure 30:
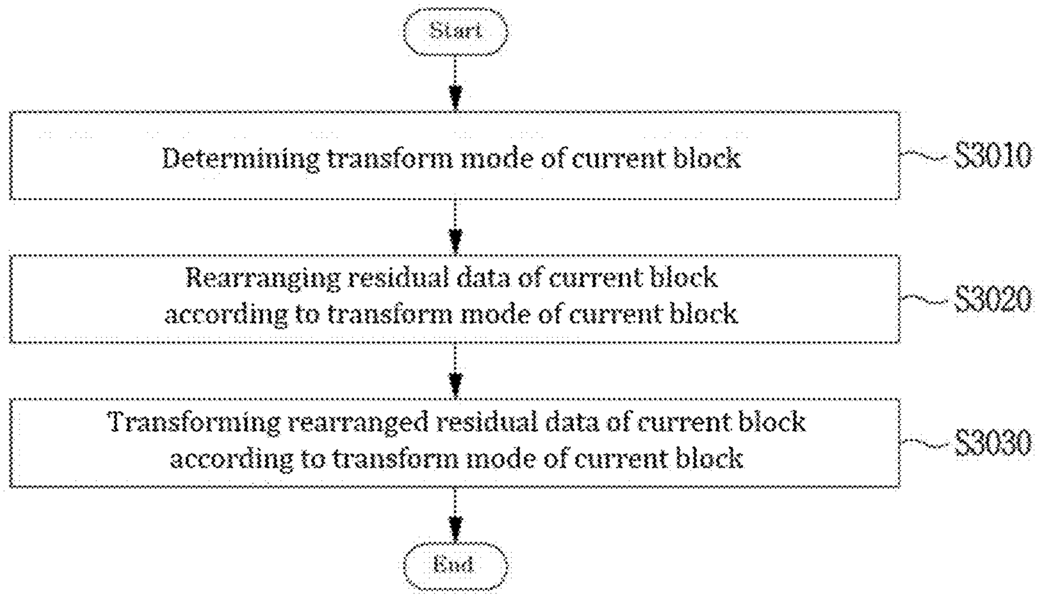
FIG. 30 is a flowchart showing an encoding method using a SDST method according to the present invention.

FIG. 30 is a view showing an encoding method using a SDST method according to the present invention.

Referring to FIG. 30, the transform mode of the current block may be determined at step S3010.

Also, the residual data of the current block may be rearranged according to the transform mode of the current block at step S3020.

Also, the rearranged residual data of the current block according to the transform mode of the current block may be transformed at step S3030.

Here, the transform mode may include at least one of SDST (Shuffling Discrete Sine Transform), SDCT (Shuffling Discrete cosine Transform), DST (Discrete Sine Transform), or DCT (Discrete Cosine Transform). SDST, SDCT, DST, and DCT mode have been described with reference to FIG. 29, thus repeated description thereof will be omitted.

In the meantime, only when the transform mode of the current block is one of SDST and SDCT, the rearranging of the residual data may be performed.

Also, the determining of the transform mode of the current block at step S3010 may be performed based on at least one of a prediction mode of the current block, depth information of the current block, the size of the current block, and the shape of the current block.

Here, when the prediction mode of the current block is the inter-prediction mode, the transform mode of the current block may be determined as one of SDST and SDCT.

In the meantime, the rearranging of the residual data of the current block at step S3020 may include: scanning the residual data arranged in the current block in a first direction order; and rearranging the scanned residual data in the first direction, in the current block in a second direction order.

Also, the rearranging of the residual data of the current block at step S3020 may be performed on each sub-block in the current block.

In this case, the rearranging of the residual data of the current block at step S3020 may be performed based on the position of the sub-block in the current block.

In the meantime, the rearranging of the residual data of the current block at step S3020 may be performed by rotating the residual data arranged in the current block at a predefined angle.

In the meantime, the rearranging of the residual data of the current block at step S3020 may be performed by flipping the residual data arranged in the current block according to a flipping method.

An apparatus for decoding a video by using the SDST method according to the present invention may include an inverse-transform unit that determines a transform mode of a current block, inverse-transforms residual data of the current block according to the transform mode of the current block, and rearranges the inverse-transformed residual data of the current block according to the transform mode of the current block. Here, the transform mode may include at least one of SDST (Shuffling Discrete Sine Transform), SDCT (Shuffling Discrete cosine Transform), DST (Discrete Sine Transform), or DCT (Discrete Cosine Transform).

An apparatus for decoding a video by using the SDST method according to the present invention may include an inverse-transform unit that determines a transform mode of a current block, rearranges residual data of the current block according to the transform mode of the current block, and inverse-transforms the rearranged residual data of the current block according to the transform mode of the current block. Here, the transform mode may include at least one of SDST (Shuffling Discrete Sine Transform), SDCT (Shuffling Discrete cosine Transform), DST (Discrete Sine Transform), or DCT (Discrete Cosine Transform).

An apparatus for encoding a video by using the SDST method according to the present invention may include a transform unit that determines a transform mode of a current block, rearranges residual data of the current block according to the transform mode of the current block, and transforms the rearranged residual data of the current block according to the transform mode of the current block. Here, the transform mode may include at least one of SDST (Shuffling Discrete Sine Transform), SDCT (Shuffling Discrete cosine Transform), DST (Discrete Sine Transform), or DCT (Discrete Cosine Transform).

An apparatus for encoding a video by using the SDST method according to the present invention may include a transform unit that determines a transform mode of a current block, transforms residual data of the current block according to the transform mode of the current block, and rearranges the transformed residual data of the current block according to the transform mode of the current block. Here, the transform mode may include at least one of SDST (Shuffling Discrete Sine Transform), SDCT (Shuffling Discrete cosine Transform), DST (Discrete Sine Transform), or DCT (Discrete Cosine Transform).

A bitstream is formed by a method for encoding a view by using the SDST method according to the present invention. The method may include: determining a transform mode of a current block; rearranging residual data of the current block according to the transform mode of the current block; and transforming the rearranged residual data of the current block according to the transform mode of the current block. Here, the transform mode may include at least one of SDST (Shuffling Discrete Sine Transform), SDCT (Shuffling Discrete cosine Transform), DST (Discrete Sine Transform), or DCT (Discrete Cosine Transform).

According to an embodiment of the present invention, encoding efficiency is improved by changing a scanning and/or a grouping method of a transformed and/or quantized coefficient.

In detail, a video encoding process may generate a bitstream that is a compressed form of an original image by predicting an original block through intra prediction or inter prediction, applying at least one of transform and quantization to residual pixels within a residual block that is a difference between a prediction block and the original block, and entropy encoding a coefficient within the block to which at least one of transform and quantization is applied, and encoding information, the entropy encoding being a lossless compression method based on probability. The generated bitstream may be transmitted to a decoder or stored in a recording medium.

According to an embodiment of the present invention, particularly, when a TU is predicted by using a predetermined prediction mode, in order to entropy encode/decode coefficients within the TU to which transform and/or quantization is applied, a scanning and/or grouping method according to the present invention may be applied. Encoding/decoding, which will be described later may refer to entropy encoding/decoding. In addition, a TU that will be described later, may refer to a sample array in which at least one sample is present such as CU, PU, block, sub-block, etc. In other words, the TU may refer to at least one of a CU, a PU, a block, and a sub-block. In addition, a coefficient that will be described later may refer to a transformed and/or quantized coefficient. Herein, transform may include at least one of first transform and second transform. Herein, the second transform may refer to a method of additionally transforming a part or the entire coefficients obtained by the first transform once again.

The predetermined prediction mode may be an inter prediction mode or an intra prediction mode. The intra prediction mode may be any one of a predefined directional mode or a predefined non-directional mode. By considering a distribution characteristic of transformed and/or quantized coefficients of a TU predicted by using the predetermined prediction mode, coefficients within the TU may be encoded/decoded by applying a scanning method according to the present invention. In addition, a TU may be divided into at least one sub-block by using a predetermined grouping method. Coefficients included in each sub-block may be encoded/decoded by applying the scanning method. The scanning and/or grouping method according to the present invention may consider a distribution characteristic of transformed and/or quantized coefficients within a TU. Accordingly, according to the present invention, there is a high chance that coefficients not being 0 or coefficients being 0 may be classified into the same group. According to the present invention, a number of bits required for encoding/decoding coefficients within the TU may be decreased, thus more bits may be decreased compared to the same image quality.

In order to encode/decode transformed and/or quantized coefficients within the TU, a coefficient group (CG) which groups N coefficients within the TU into a single group may be defined. Herein, N may be a positive integer greater than 0. For example, N may be 16. The grouping method may refer to a method in which coefficients to which transform and/or quantization is applied within the TU may be assigned to a unit of the coefficient group. A group that will be described later may refer to a coefficient group.

Figure 31:
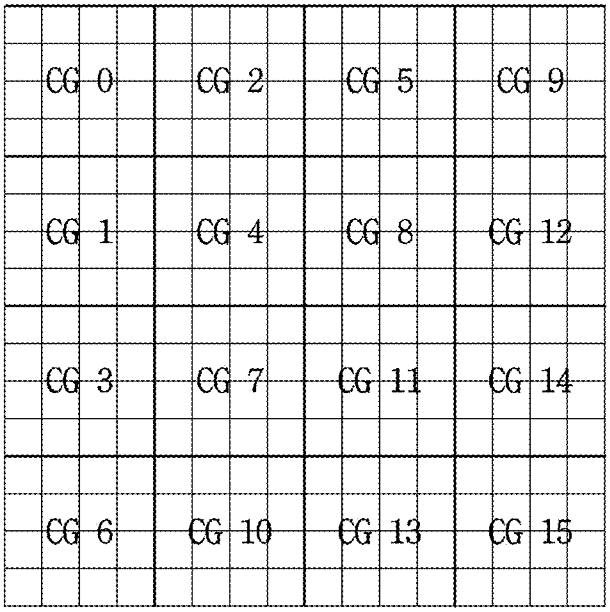
FIG. 31 is a view showing an example of grouping transformed and/or quantized coefficients within a TU having a 16×16 size by a CG unit.

FIG. 31 is a view showing an example of grouping transformed and/or quantized coefficients within a TU having a 16×16 size by a CG unit.

Coefficients included in a 4×4 square sub-block that is fixed within the TU may be grouped into a single CG. A flag and/or a syntax element may be determined for each CG to encode/decode transformed and/or quantized coefficients. For example, the flag and/or the syntax element may include at least one of coded_sub_block_flag (hereafter, CSBF), sig_coeff_flag, coeff_abs_level_greater2_flag, coeff_sign_flag, and coeff_abs_level_greater1_flag, coeff_abs_level_remaining_value. Herein, coded_sub_block_flag may be a syntax element indicating whether or not a transformed and/or quantized coefficient not being 0 is present in each CG. In addition, sig_coeff_flag may be a syntax element indicating whether or not a transformed and/or quantized coefficient is 0. In addition, coeff_abs_level_greater1_flag may be a syntax element indicating whether or not an absolute value of a transformed and/or quantized coefficient is greater than 1. In addition, coeff_abs_level greater2_flag may be a syntax element indicating whether or not an absolute value of a transformed and/or quantized coefficient is greater than 2. In addition, coeff_sign_flag may be a syntax element indicating a sign value of a transformed and/or quantized coefficient. In addition, coeff_abs_level_remaining_value may be a syntax element indicating a value obtained by subtracting 3 from an absolute value of a transformed and/or quantized coefficient when the absolute value of the transformed and/or quantized coefficient is greater than 3. In other words, at least one of syntax elements for the transformed and/or quantized coefficient may be encoded/decoded in the CG unit.

A specific scanning method may be selected based on a prediction mode indicating whether intra prediction is performed or inter prediction is performed and/or a prediction direction of intra prediction. At least one of the flag and the syntax elements may be determined by scanning transformed and/or quantized coefficients of each CG within the TU by using the selected scanning method. In addition, at least one of the flag and the syntax elements may be encoded/decoded by scanning transformed and/or quantized coefficients of each CG within the TU by using the selected scanning method.

Table 6 shows an example of scanning methods of coefficients of each CG within a TU. As shown in Table 6, a scanning method may be determined according to a prediction mode, an intra prediction direction, and/or a block size. However, the scanning method and a decision condition thereof are not limited to the example shown in Table 6. For example, a scanning method may be determined based on at least one of a prediction mode of a TU, an intra prediction direction, and a TU size. Alternatively, other scanning methods different from scanning methods shown in Table 6 may be performed. In addition, a transformed and/or quantized coefficient which becomes a scanning target may refer to at least one of a quantized transformed coefficient level, a transform coefficient, a quantized level, and a residual signal coefficient.

TABLE 6

| | Prediction mode | | | | | |
|---|---|---|---|---|---|---|
| | Intra | | | | | |
| TU size | 0~5 | 6~14 | 15~21 | 22~30 | 31~34 | Inter |
| 4 × 4<br>8 × 8 | diagonal | vertical | diagonal | horizontal | diagonal | diagonal |
| 16 × 16 | | | diagonal | | | |
| 32 × 32 | | | diagonal | | | |

Each of a scanning method shown in Table 6 (diagonal, horizontal, or vertical) may correspond to each scanning method shown in FIG. 10.

Figure 32:
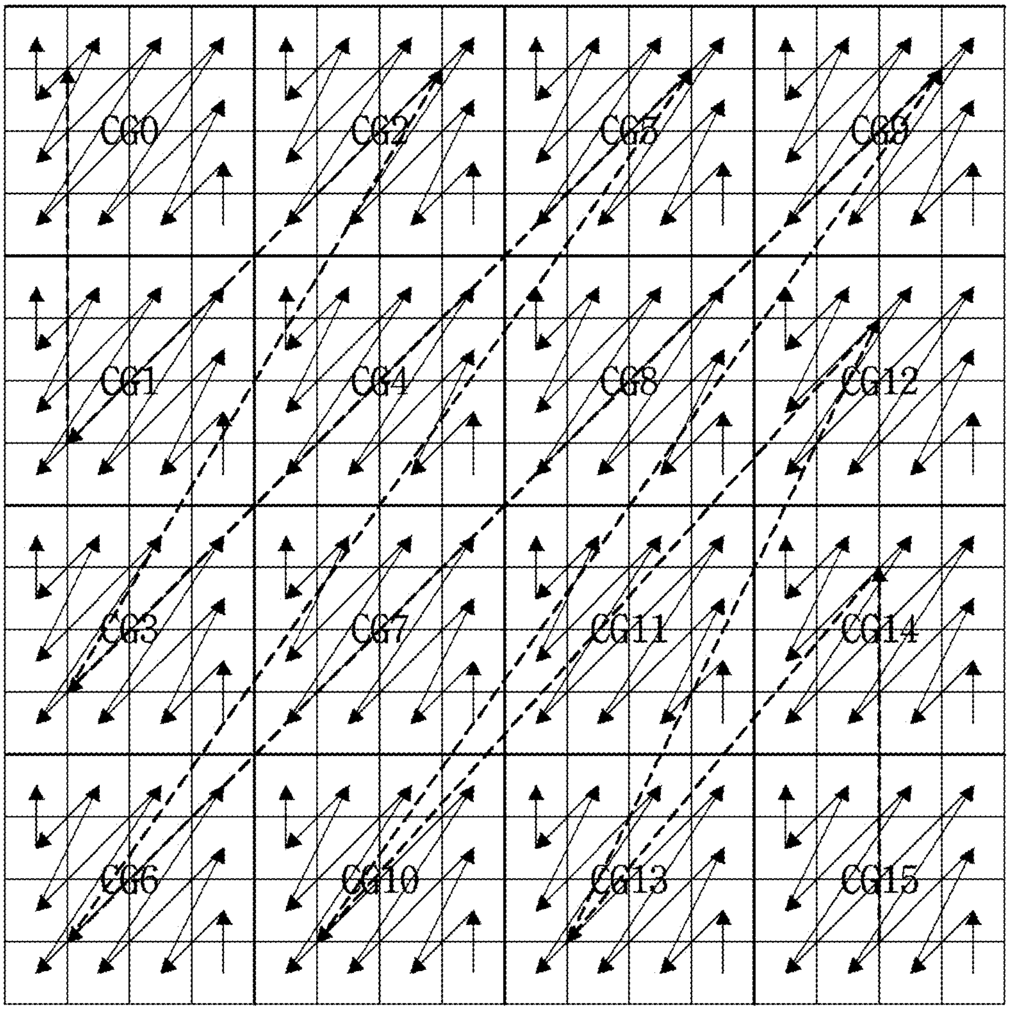
FIG. 32 is a view showing an example of a scanning order of all coefficients within a TU having a 16×16 size.

FIG. 32 is a view showing an example of a scanning order of all coefficients within a TU having a 16×16 size.

A coefficient of a TU may be obtained by performing at least one of transform and quantization for a residual block generated by a difference between a prediction block generated by inter prediction or intra prediction and an original block. In FIG. 32, bold lines represent a boundary of each CG, lines with arrows represent a scanning order of coefficients within each CG, and dotted lines with arrows represent a CG that will be scanned after scanning the last coefficient of each CG. In other words, the dotted lines show a scanning order between CGs.

In the entire TU of an intra predicted TU or in each CG, any one of a plurality of predefined scanning methods may be selectively used based on at least a prediction direction and a TU size. Coefficients within each CG of the inter predicted TU may use a scanning order of a down-left diagonal direction. Herein, coefficients positioned at positions through which arrows pass in FIG. 32 may be scanned. Alternatively, scanning in an up-right diagonal direction may be applied rather than scanning in the down-left diagonal direction.

It may be expected for the scanning method according to the present invention to have the same result even though any one of scanning in a down-left diagonal direction or scanning in an up-right diagonal direction is applied. Hereinafter, diagonal scanning may refer to down-left diagonal scanning or up-right diagonal scanning according to a scanning direction.

As described above, scanning in the down-left diagonal direction may be applied to coefficients of each CG within the TU that is predicted by the inter prediction mode. The CG may be a square having an N×N size within the TU, or may be a rectangle having an N×M size. The CG size may be a fixed size preset in an encoder/decoder, or may be variably determined according to a TU size/shape. Alternatively, information about the CG size may be signaled, and the CG size may be variably determined based on the corresponding information. The information about the CG size may be variably encoded/decoded to a flag indicating a height/width, a depth, whether or not to divide, and a number of CGs constituting the TU, etc.

Figure 33:
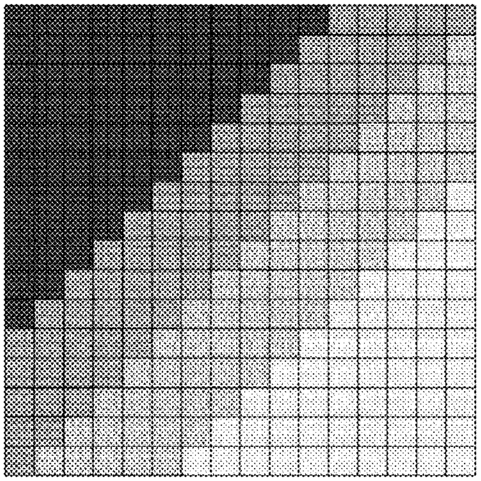
FIG. 33 is a view showing a distribution characteristic of coefficients within a TU, effective scanning, and the need of a CG configuration.

FIG. 33 is a view showing a distribution characteristic of coefficients within a TU, effective scanning, and a need of a CG configuration.

FIG. 33(*a*) is a view showing an example of occurrence frequencies of transformed and/or quantized coefficients within the TU having a 16×16 size. In addition, FIG. 33(*b*) is a view showing an example of occurrence frequencies of transformed and/or quantized coefficients within the TU having an 8×8 size.

In FIG. 33, darker colors represent where the coefficient has high occurrence frequencies. According to a distribution characteristic of coefficients within the TU shown in FIG. 33, the occurrence frequency of the coefficient becomes lower as the coefficient becomes far away from a position of a DC coefficient. The above feature may be a common characteristic shown in all TUs that are predicted by an inter prediction mode regardless of a TU size. This is because high compression performance can be obtained by generating transformed and/or quantized coefficients in a low frequency bandwidth when video compressing.

According to an embodiment of the present invention, an effective scanning and/or grouping method for encoding/decoding transformed and/or quantized coefficients may be provided by considering a distribution characteristic of the transformed and/or quantized coefficients within the TU.

Hereinafter, a scanning and/or grouping method in which a coefficient distribution characteristic within a TU is efficiently reflected will be described. A scanning object of according to the present invention is to optimize an arrangement of coefficients within the TU to improve entropy encoding efficiency.

Scanning may be performed to represent coefficients within a two-dimensional block to a one-dimensional array. Alternatively, scanning may be performed to represent coefficients within a one-dimensional array to a two-dimensional block. Entropy encoding efficiency may vary according to how scanned coefficients are distributed within an array. For example, it is preferable in terms of encoding efficiency that the coefficients within the array are concentrated in a low frequency area. Since scanning according to the present invention reflects a distribution characteristic of coefficients within a TU, coefficients may be arranged in a direction so that data of the coefficients gradually increases. Accordingly, entropy encoding efficiency is improved.

In addition, in order to increase a number of CGs in which all transformed and/or quantized coefficients are 0, grouping according to the present invention is performed so that transformed and/or quantized coefficients which have high chance to be 0 within the TU are grouped into a single CG.

The present invention may perform vertical transform and/or horizontal transform which has a separable characteristic to improve a compression rate of video encoding/decoding. For example, at least one of vertical transform and horizontal transform may use DST-7, or at least one of vertical transform and horizontal transform may use DCT-2. Alternatively, transform of a type different from vertical transform may be used for horizontal transform. Horizontal transform may use DST-7 (or DST-4), and vertical transform may use DCT-2. Alternatively, horizontal transform may use DCT-2, and vertical transform may use DST-7 (or DST-4). As described above, by using the same transform method for vertical transform and horizontal transform or by using transform methods different from each other for the same, a distribution of coefficients within a block may be more concentrated close to a low frequency component (close to a DC component).

The grouping method according to the present invention reflects the coefficient distribution characteristic described above, thus a number of groups in which all coefficients respectively included within the groups are 0 may be increased. When all coefficients included in a specific group are 0, a syntax element (for example, flags) required for encoding coefficients within the corresponding group may be saved. In the present invention, encoding may refer to entropy encoding. For example, an encoder may set CSBF to 0 when all coefficients within a 4×4 CG are 0. A decoder may not reference or decode an additional syntax element (for example, flag) for reconstructing coefficients within the corresponding CG when CSBF is 0. In the present invention, decoding may refer to entropy decoding.

When a coefficient not being 0 is present within the 4×4 CG, the encoder may encode coefficients within the corresponding CG by encoding at least one of an additional flag representing information about CSBF and coefficients, and a syntax element (sig_coeff_flag, coeff_abs_level_greater1_flag, coeff_abs_level_greater2_flag, coeff_sign_flag, coeff_abs_level_remaining_value). The decoder may decode values of coefficients within the corresponding CG by decoding at least one of the flag and the syntax element.

Accordingly, a syntax element and/or a flag that are required for encoding/decoding coefficients within a group may be saved by grouping coefficients that have high chance to be 0 positioned within a TU into a single group.

The scanning and/or grouping method according to the present invention may be applied to an M×N TU. M and N may respectively be a positive integer greater than 0. For example, M and N may respectively have a value such as 2, 4, 8, 16, 32, 48, 64, or more. M and N may be identical or different from each other.

When transform and/or quantization is performed, a coefficient occurring in a high frequency area of a TU may be decreased in a value size and/or an occurrence frequency thereof. In addition, considering a human visual system (HVS), an increase in compression efficiency obtained by discarding a coefficient of a high frequency area is larger than loss according subjective and objective image quality degradation. Accordingly, scanning and/or grouping according to the present invention may be applied to only a part of left side area within a TU. In addition, for areas except for the part of left upper area within the TU, group information and/or level information about a quantized coefficient according to the present invention may not be encoded/decoded. For example, in FIG. 35, for an area with a block color, encoding/decoding may not be performed.

Various embodiments of a scanning and/or grouping method according to the present invention will be described in detail later. In the following description, when a base of scanning and/or grouping is a TU, the TU may refer to a transform unit or a transform block.

Scanning and/or grouping according to an embodiment of the present invention may be diagonal scanning and/or grouping based on a TU. According to diagonal scanning and/or grouping based on a TU, N coefficients consecutive in a down-left diagonal direction from a coefficient of a right lower AC position to a coefficient of a left upper DC position may constitute a single group CG. N may be a positive integer greater than 0. Each of a plurality of CGs may be configured with the same number (N coefficients) of coefficients. Alternatively, all or a part of the plurality of CGs may be configured with a number of coefficients different from each other. Coefficients within each group may be scanned in a down-left diagonal direction from an area with the highest frequency to a DC position.

Figure 34:
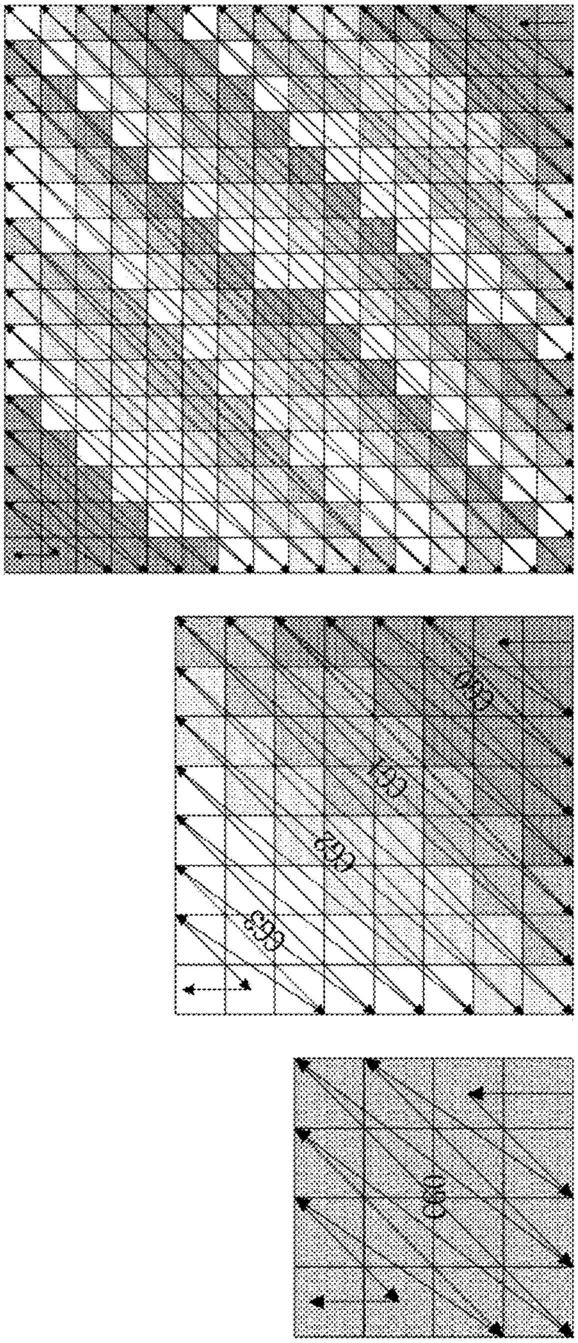
FIG. 34 is a view showing down-left diagonal scanning and/or grouping according to an embodiment of the present invention.

FIG. 34 is a view showing diagonal scanning and/or grouping based on a TU according to an embodiment of the present invention.

FIG. 34(*a*) is a view showing scanning and grouping of a 4×4 TU.

FIG. 34(*b*) is a view showing scanning and grouping of an 8×8 TU.

FIG. 34(*c*) is a view showing scanning and grouping of a 16×16 TU.

In FIG. 34, arrows show a scanning order of coefficients within each CG. In addition, consecutive areas with the same shading represent a single CG. A single CG includes 16 consecutive coefficients in a down-left diagonal direction stating from a coefficient of a right upper AC position. In other words, in an example shown in FIG. 34, each of a plurality of CGs includes the same number of coefficients (16 coefficients).

As shown in FIG. 34, coefficients within each CG may be scanned in a direction and in an order shown by arrows. In addition, when the last coefficient within each CG is scanned, scanning may be performed for a CG including a coefficient following the last coefficient in the scanning order in the down-left diagonal direction. All coefficients within the TU may be scanned by using the above method.

Although it is not shown in FIG. 34, up-right diagonal scanning may be used as the diagonal scanning method rather than down-left diagonal scanning.

Figure 35:
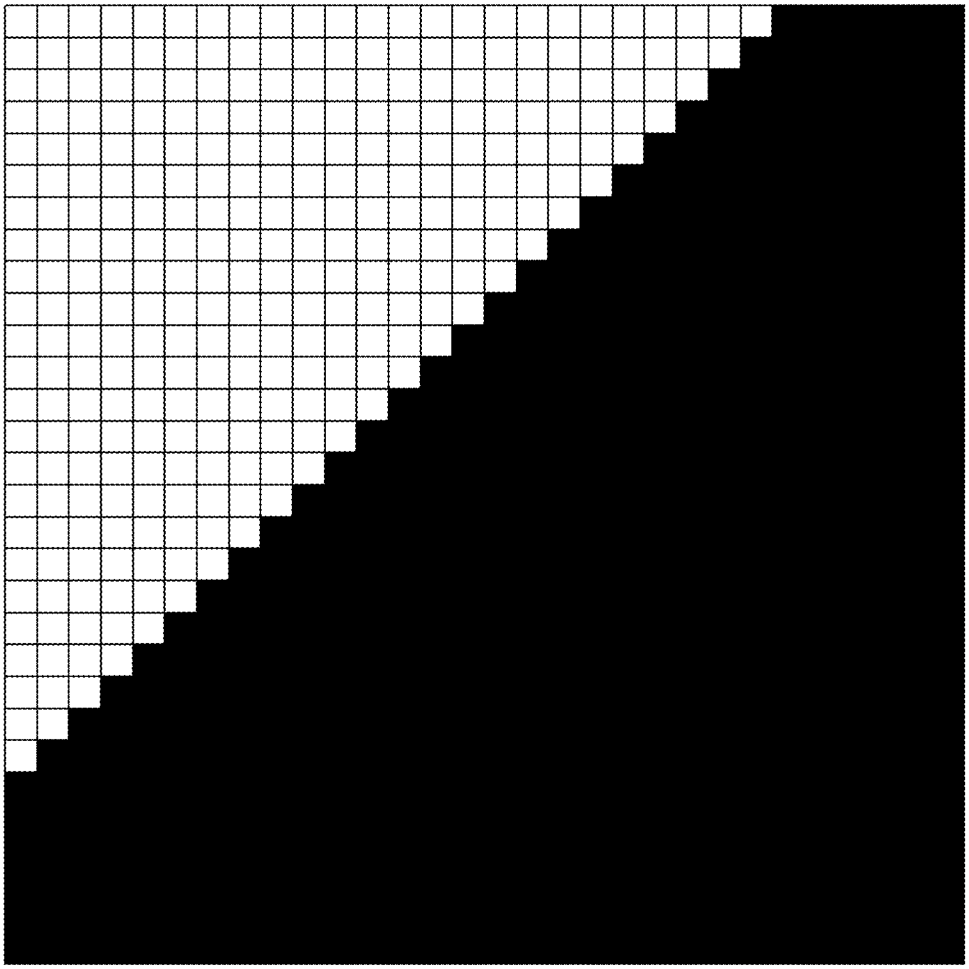
FIG. 35 is a view showing an example of an encoding/decoding area of a 32×32 TU.

FIG. 35 is a view showing an example of an encoding/decoding area of a 32×32 TU.

In FIG. 35, coefficients of a frequency area in which at least one of group information and level information about transformed and/or quantized coefficients is not encoded/decoded are represented with a black color. An occurrence frequency of a coefficient positioned at a high frequency area is low, or a value thereof is small. In addition, although a coefficient of a high frequency area is removed, there is no difference in the image quality that humans feel according to the HVS system. Accordingly, high encoding efficiency may be obtained by removing and not encoding coefficients of a high frequency area.

Accordingly, for a TU having a predetermined size or larger, coefficients of a part of a high frequency area may not be encoded/decoded. Herein, the predetermined size may be N×M. N and M may respectively be a positive integer. In addition, N and M may be identical or different from each other. For example, as shown in FIG. 35, N×M may be 32×32. The predetermined size (N and/or M) may be a fixed value pre-defined in an encoder/decoder, or explicitly, may be signaled. The part of the high frequency area may be determined based on a position within the TU. For example, the part of the high frequency area may be determined based on a horizontal coordinate and/or a vertical coordinate within the TU. For example, the part of the high frequency area may be an area in which a horizontal coordinate and/or a vertical coordinate is equal to or greater than a predetermined first threshold value, or may be an area in which the summation of the horizontal coordinate and the vertical coordinate is equal to or greater than a predetermined second threshold value.

The first threshold value and/or the second threshold value may be a fixed value predefined in the encoder/decoder, or explicitly, may be signaled. Alternatively, it may be determined depending on a characteristic of the TU (for example, a block size, a block shape, a depth, a prediction mode (inter or intra), an intra prediction mode, a transform type, a component (luma or chroma)). For example, it may be determined as ¾ of a horizontal length or a vertical length of the TU. Alternatively, it may be derived from a threshold value that is used by at least one neighboring TU. The part of high frequency area which is not encoded/decoded, or an area to be encoded and decoded, excluding the part of high frequency area which is not encoded/decoded, may have a block shape such as square, rectangle, triangle, or/and pentagon. The part of high frequency area may be determined based on a characteristic of the TU (for example, a block size, a block shape, a depth, a prediction mode (inter or intra), an intra prediction mode, a transform type, a component (luma or chroma)).

As described above, coefficients within the TU may be scanned in the down-left diagonal direction from the coefficient of the upper lower AC position to the coefficient of the left upper DC position, and N consecutive coefficients may be grouped in a single group. Alternatively, coefficients within the TU may be scanned in an up-right diagonal direction from the coefficient of the left upper DC position to the coefficient of the upper lower AC position, and N consecutive coefficients may be grouped in a single group. Alternatively, the grouping may be performed in a scanning direction from the coefficient of the right lower AC position to the coefficient of the left upper DC position.

Scanning and/or grouping according to an embodiment of the present invention may be zigzag scanning and/or grouping based on a TU.

Figure 36:
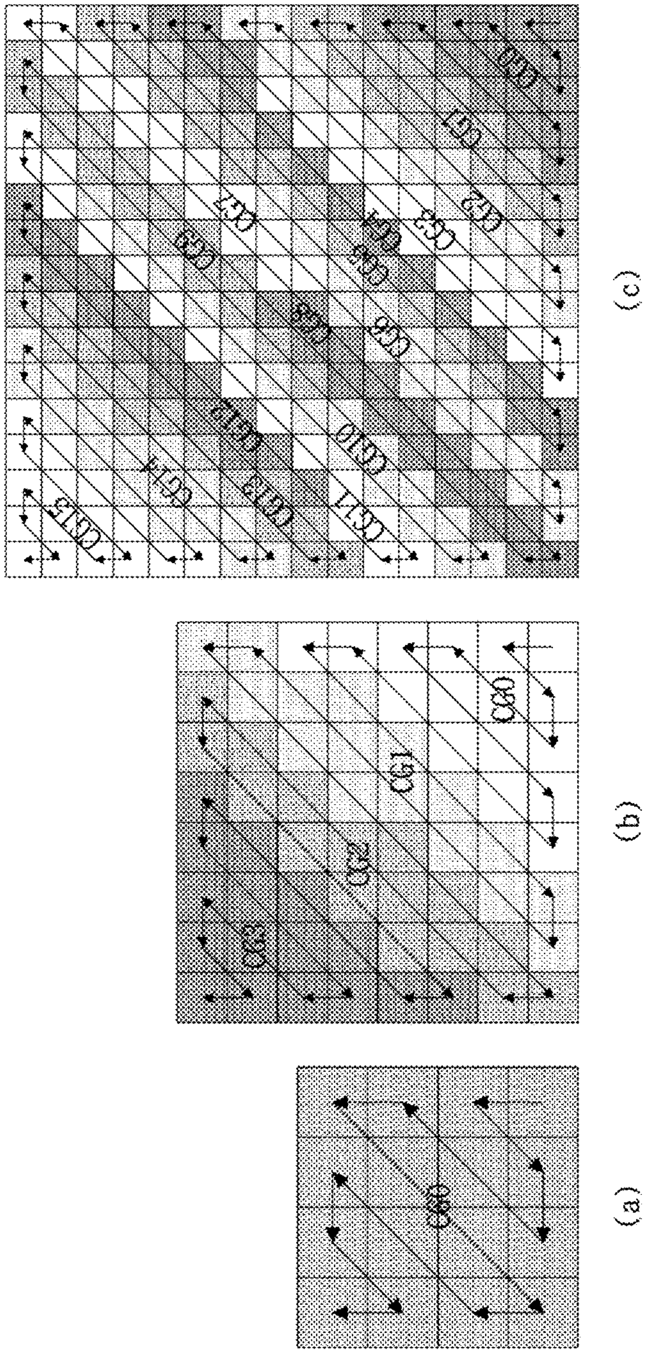
FIG. 36 is a view showing zigzag scanning and/or grouping according to an embodiment of the present invention.

FIG. 36 is a view showing zigzag scanning and/or grouping according to the embodiment of the present invention.

FIG. 36(*a*) is a view showing scanning and grouping of a 4×4 TU.

FIG. 36(*b*) is a view showing scanning and grouping of an 8×8 TU.

FIG. 36(*c*) is a view showing scanning and grouping of a 16×16 TU.

In FIG. 36, arrows represent a scanning order of coefficients within each CG. In addition, consecutive areas with the same shading represent a single CG. N consecutive coefficients from a coefficient of a right lower AC position to a coefficient of a left upper DC position of a TU in a zigzag direction may constitute a single CG. N may be a positive integer greater than 0. Each of a plurality of CGs may be configured with the same number of coefficients (N coefficients). Alternatively, all or a part of the plurality of CGs may be configured with a number of coefficients different from each other. Coefficients of each CG may be sequentially scanned in a zigzag direction from a coefficient of a right lower AC position to a coefficient of a left upper DC position. In addition, each CG may be scanned in a zigzag direction.

When the last coefficient of each CG is scanned, scanning may be performed for a CG including a coefficient following the last coefficient in a zigzag scanning order based on the TU. All coefficients within the TU may be scanned as described above.

When zigzag scanning and/or grouping based on a TU according to an embodiment of the present invention is performed, as diagonal scanning and/or grouping described above, for a TU having a predetermined size or larger, coefficients of a part of high frequency area may not be encoded/decoded. The method described with reference to FIG. 35 may be applied to determine the predetermined size and specify the part of high frequency area.

As described above, coefficients within the TU are scanned in a zigzag scanning direction from the coefficient of the right lower AC position to the coefficient of the left upper DC position, and N consecutive coefficients may be grouped into a single group. Alternatively, coefficients within the TU are scanned in a zigzag scanning direction from the coefficient of the left upper DC position to the coefficient of the right lower AC position, and N consecutive coefficients may be grouped into a single group. Alternatively, the grouping may be performed from the coefficient of the right lower AC position to the coefficient of the left upper DC position according to a scanning direction.

Scanning and/or grouping according to an embodiment of the present invention may be boundary scanning and/or grouping.

Figure 37:
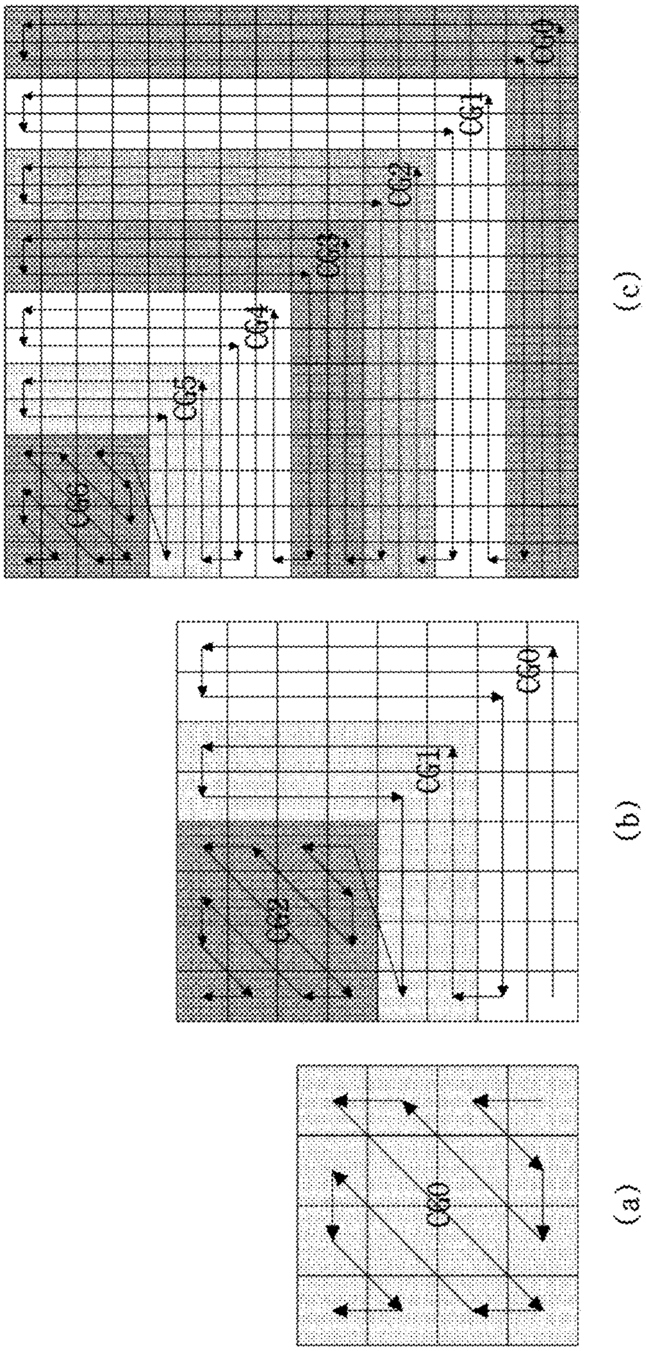
FIG. 37 is a view showing boundary scanning and/or grouping according to an embodiment of the present invention.

FIG. 37 is a view showing boundary scanning and/or grouping according to the embodiment of the present invention.

FIG. 37(*a*) is a view showing scanning and grouping of a 4×4 TU.

FIG. 37(*b*) is a view showing scanning and grouping of an 8×8 TU.

FIG. 37(*c*) is a view showing scanning and grouping of a 16×16 TU.

The methods of scanning and/or grouping described with reference to FIGS. 34 to 36 configure a fixed number of consecutive coefficients in a scanning order in a single group. According to boundary scanning and/or grouping described with reference to FIG. 37, at least one group of groups within a TU may have different size or shape. For example, a group size may become larger when the group includes more coefficients positioned at a high frequency component. As described above, coefficients positioned at a high frequency component may have high chance to be 0. Accordingly, there is no much difference between the probability in which all coefficients of a group including a plenty of high frequency components are 0, and the probability in which all coefficients of a 4×4 CG are 0. In addition, when the CG is configured as shown in FIG. 37, the total number of groups decreases, thus a bit amount required for encoding coefficients within the TU is reduced, and efficient grouping may be achieved.

Table 7 shows grouping shown in FIG. 37 and a number of groups according to grouping a CG in a 4×4 unit.

TABLE 7

| TU size | Method of configuring CG in 4 × 4 unit | Purposed grouping method |
|---|---|---|
| 4 × 4 | 1 | 1 |
| 8 × 8 | 4 | 3 |
| 16 × 16 | 16 | 7 |

From Table 7, it is confirmed that grouping using the method shown in FIG. 37 is advantageous in terms of the total number of groups than grouping the CG in a 4×4 unit when a TU size becomes large. In other words, the larger the TU size is, the more grouping efficiency shown in FIG. 37 increases.

As described above, each of a plurality of CGs may include a fixed number of coefficients, all or a part of the plurality of CGs may include a number of coefficients different from each other. According to boundary scanning and/or grouping shown in FIG. 37, zigzag scanning may be performed for a group having a fixed size (for example, 4×4 square size) and including a DC coefficient. In addition, for remaining groups, scanning repeatedly traversing coefficients within groups in a horizontal direction and/or a vertical direction may be performed. Herein, at least one of down-left diagonal scanning, up-right diagonal scanning, horizontal scanning, and vertical scanning may be used rather than zigzag scanning.

For a TU having a predetermined size or larger, scanning, grouping, and/or encoding/decoding may not be performed for coefficients of a part of high frequency area. The method described with reference to FIG. 35 may be similarly applied to determine the predetermined size and specify the part of high frequency area. For example, the part of high frequency area may be an area positioned at a coordinate of more than half of a TU width in a horizontal direction and/or a coordinate of more than half of a TU height in a vertical direction.

Figure 38:
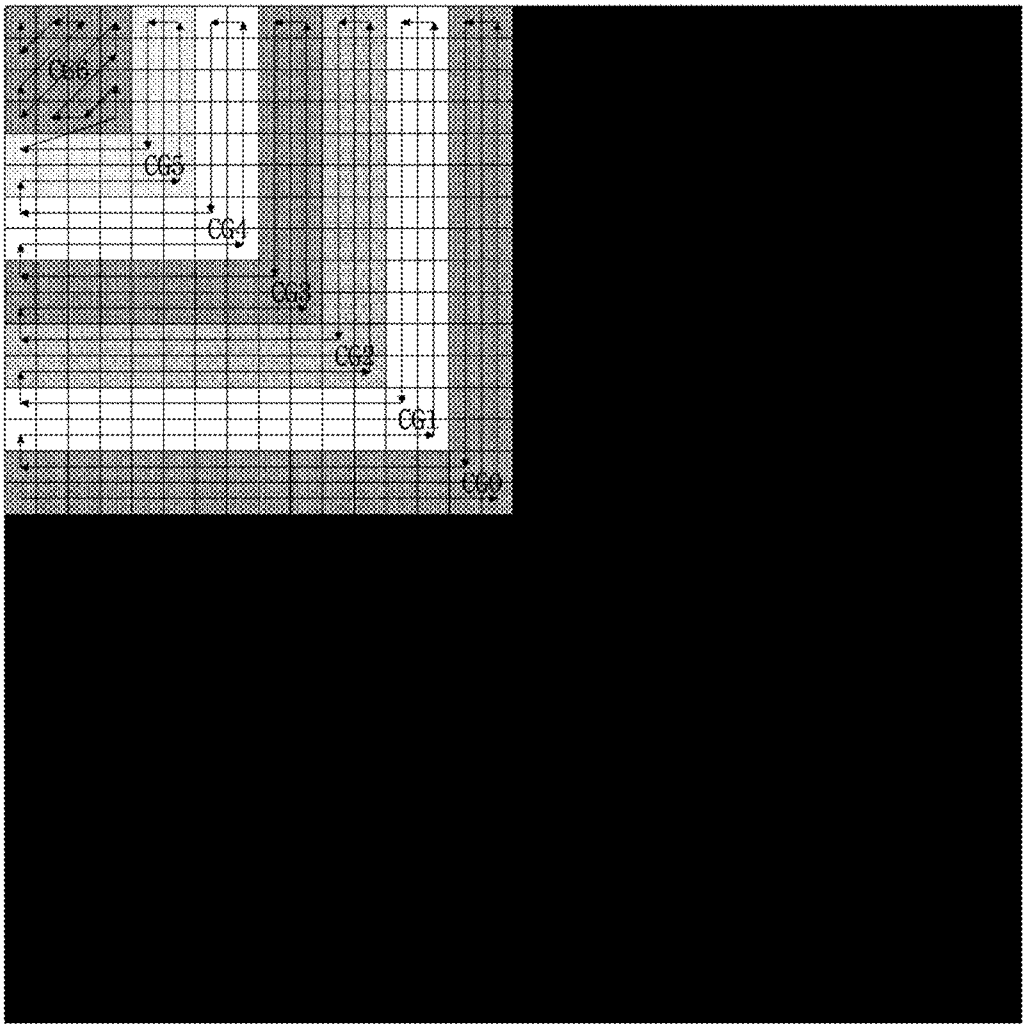
FIG. 38 is a view showing an example of an encoding/decoding area of a 32×32 TU.

FIG. 38 is a view showing an example of an encoding/decoding area of a 32×32 TU.

In FIG. 38, coefficients of an area in which scanning, grouping, and/or encoding/decoding is not performed are represented in a block color. When a horizontal position and/or a vertical position of a specific coefficient within the TU is equal to or greater than a third threshold value, the corresponding coefficient may be excluded from scanning and/or grouping. For the coefficient that is excluded from scanning and/or grouping, encoding/decoding may be omitted, and a value thereof may be set to 0.

The third threshold value may be a fixed value predefined in an encoder/decoder, or explicitly, may be signaled. Alternatively, it may be determined depending on a characteristic of the TU (for example, a block size, a block shape, a depth, a prediction mode (inter or intra), an intra prediction mode, a transform type, a component (luma or chroma)). For example, the third threshold value may be determined as ½ of a horizontal length and/or a vertical length of the TU. Alternatively, it may be derived from a threshold value used by at least one neighboring TU. Alternatively, a threshold value for a horizontal position of a coefficient may be set different from a threshold value for a vertical position of the coefficient. The part of high frequency area in which encoding/decoding is not performed, or an area excluding the part of high frequency area in which encoding/decoding is not performed and in which encoding/decoding is performed may have a shape of a square, a rectangle, a triangle and/or a pentagon. The part of high frequency area may be determined based on a characteristic of the TU (for example, a block size, a block shape, a depth, a prediction mode (inter or intra), an intra prediction mode, a transform type, a component (luma or chroma)).

As shown in FIG. 37, boundary scanning and/or grouping according to a TU size may scan coefficients within the TU in a direction from the coefficient of the AC position to the coefficient of the DC position, and group a variable number of consecutive coefficients in a scanning order into a single group. Alternatively, coefficients within the TU may be scanned in a direction form the coefficient of the DC position to the coefficient of the AC position, and a variable number of consecutive coefficients may be grouped in a scanning sequence into a single group. Alternatively, the grouping may be performed from the coefficient of the AC position to the coefficient of the DC position in a scanning direction.

Scanning and/or grouping according to the embodiment of the present invention may be scanning and/or grouping based on a rectangle (non-square) TU.

Scanning and/or grouping based on a rectangle TU may be performed when an M×N TU is not a square. For example, it may be applied to a rectangle TU such as 2N×N, N×2N, 4N×N, N×4N, 8N×Nm, N×8N, etc.

Figure 39:
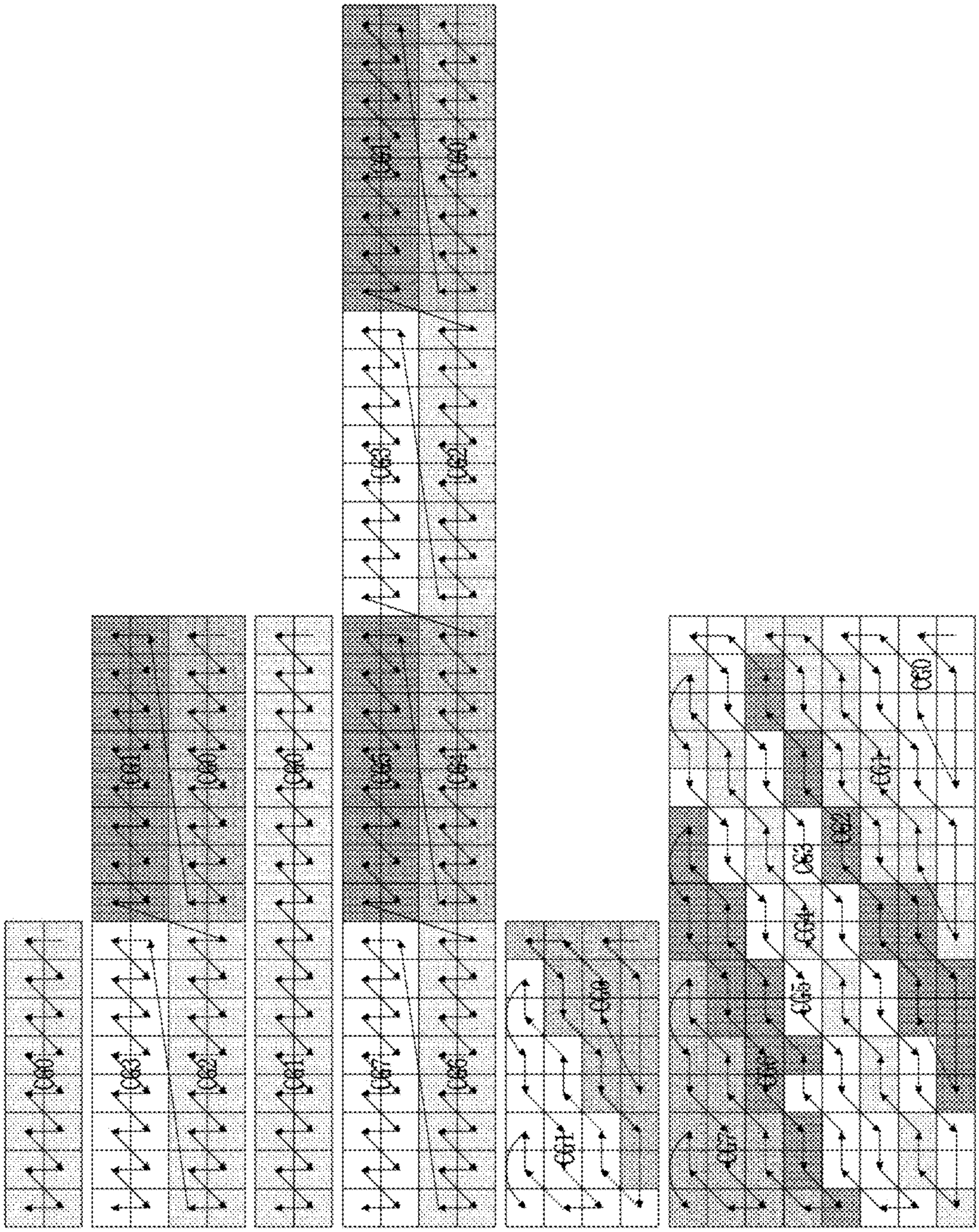
FIG. 39 is a view showing an example of scanning and/or grouping for a horizontally-long rectangle TU.

FIG. 39 is a view showing an example of scanning and/or grouping of a horizontally-long rectangle TU. FIG. 39 sequentially shows scanning and/or grouping of a 8×2 TU of an 4N×N configuration, a 16×4 TU of an 4N×N configuration, a 16×2 TU of an 8N×N configuration, a 32×8 TU of a 8N×N configuration, 8×4 TU of a 2N×N configuration, and 16×8 TU of a 2N×N configuration from the top.

Figure 40:
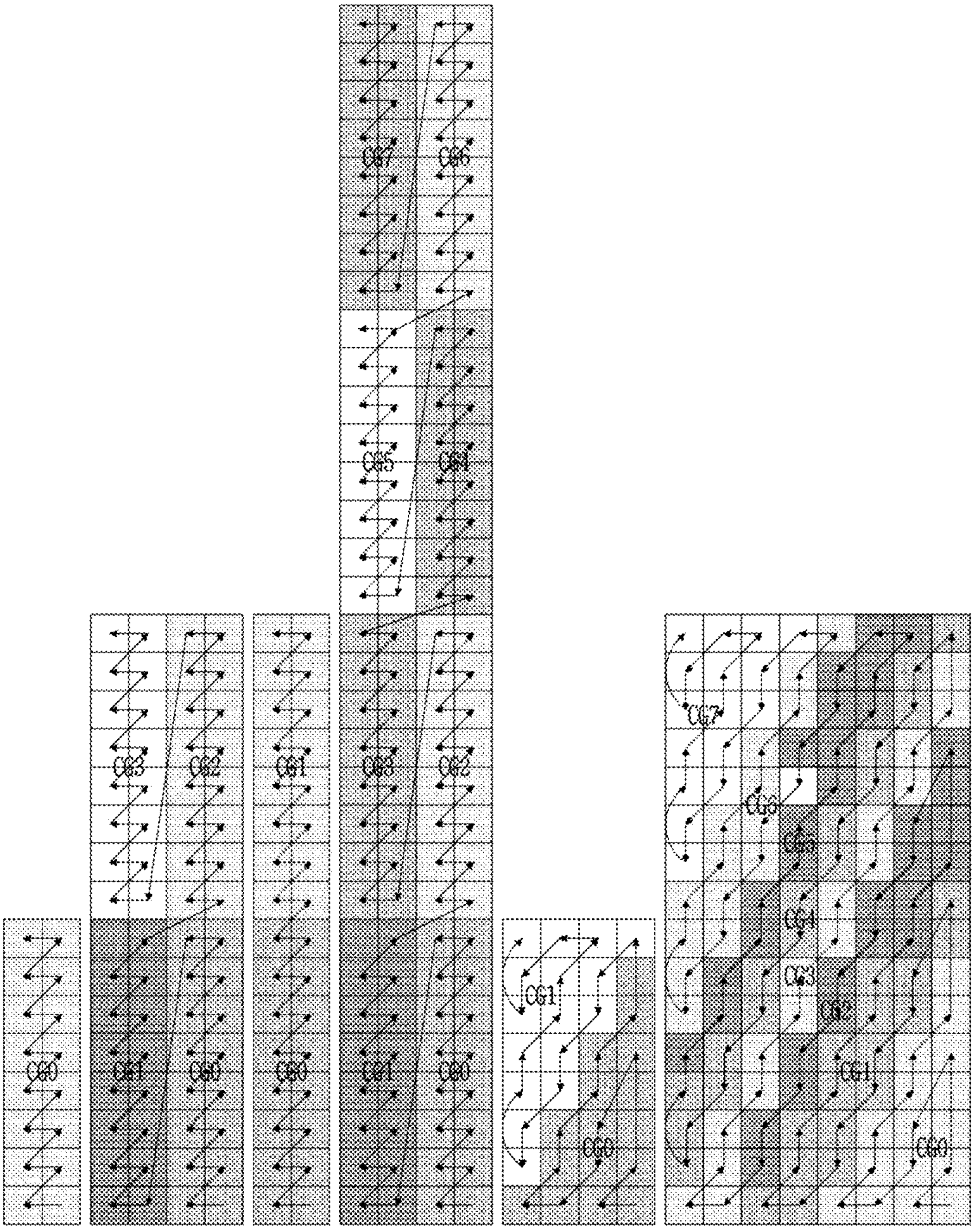
FIG. 40 is a view showing an example of scanning and/or grouping for a vertically-long rectangle TU.

FIG. 40 is a view showing an example of scanning and/or grouping of a vertically-long rectangle TU. FIG. 40 sequentially shows scanning and/or grouping of a 2×8 TU of an N×4N configuration, a 4×16 TU of an N×4N configuration, a 2×16 TU of an N×8 configuration, a 4×32 TU of an N×8N configuration, a 4×8 TU of an N×2N configuration, and a 8×16 TU of an N×2N configuration from the left side.

In FIGS. 39 and 40, arrows represent a scanning order of coefficients within each CG. In addition, consecutive areas with the same shading represent a single CG.

Coefficients within a TU having a rectangle configuration are also concentrated on a position of a frequency close to a DC component. Accordingly, coefficients within the TU may be scanned and grouped by considering the above feature. In addition, coefficients within the rectangle TU having a horizontal length longer than a vertical length may frequently occur close to the DC component and in a right area of the DC component. In addition, coefficients within the rectangle TU having a vertical length longer than a horizontal length may frequently occur close to the DC component and a lower area of the DC component.

Accordingly, for example, for a horizontally-long TU as a 16×8 TU of FIG. 39, zigzag scanning inclined to a horizontal axis may be performed. In addition, for example, for a vertically-long TU as an 8×16 TU of FIG. 40, zigzag scanning inclined to a vertical axis may be performed. In addition, 16 consecutive coefficients in a scanning order may be grouped into a single group.

In addition, although it is not shown in FIGS. 39 and 40, zigzag scanning inclined to a vertical axis may be performed for a horizontally-long TU, and zigzag scanning inclined to a horizontal axis may be performed for a vertically-long TU.

Herein, at least one of down-left diagonal scanning, up-right diagonal scanning, horizontal scanning, and vertical scanning may be used rather than zigzag scanning.

In addition, for example, for a TU having a rectangle configuration in which a vertical length or a horizontal length is four times or more longer than the opposite length such as N×4N, N×8N, N×16N, 4N×N, 8N×N, or 16N×N (or, equal to or greater than K times, K is an integer greater than 2), scanning and/or grouping may be performed from a coefficient of a AC position to a coefficient of a DC position by diving the TU into sub-blocks having the same ratio with the TU.

According to the present invention, when coefficients within a TU are distributed and concentrated on a DC position, there may be provided scanning and/or grouping methods of coefficients within a TU and which have higher compression efficiencies than a method of grouping a CG in a fixed 4×4 size and scanning in a CG unit.

For example, each of scanning and/or grouping methods according to the present invention may replace a scanning method and a grouping method of coefficients within a TU in a down-left diagonal direction from an AC position to a DC position (first method).

Alternatively, coefficients within a TU may be grouped in a CG of a fixed 4×4 size, and scanning according to the present invention may be performed in a CG unit or within the CG (second method).

Alternatively, at least one of the first method and the second method may be selectively performed (third method).

When the third method is performed, an encoder may select at least one of a plurality scanning and/or grouping methods. Information about the scanning and/or grouping method selected by the encoder may be encoded to a bitstream. A decoder may decode information about the selected scanning and/or grouping method from a bitstream. Then, the decoder may decode coefficients within a TU by using the selected scanning and/or grouping method. Alternatively, in order to decode information about the selected scanning and/or grouping method, a flag may be used. A number of bits of the flag may be determined by a number of selectable scanning/grouping methods. For example, when the number of selectable scanning and/or grouping methods is 2, the flag may be a 1-bit flag. For example, the two selectable methods may be least two of diagonal scanning and/or grouping using a CG of a fixed 4×4 size, diagonal scanning and/or grouping based on a TU, zigzag scanning and/or grouping based on a TU, and boundary scanning and/or grouping. The selectable scanning and/or grouping methods may be predefined in the encoder and the decoder.

When transform and/or quantization is performed, transformed and/or quantized coefficients may be concentrated close to the DC component. Herein, considering a distribution characteristic of coefficients within a TU, it is preferable to apply a fixed scanning and/or grouping method (first method) rather than applying a method of transmitting information about selecting a scanning and/or grouping method (third method). Herein, an index of 1-bit or more may be used for information about at least one of scanning and grouping. In addition, the scanning method may be determined or applied based on an intra prediction mode, an inter prediction mode, an intra prediction direction, a TU size, a transform type, a transform size, whether a luma signal is used or a chroma signal is used, etc.

Considering scanning and/or grouping methods according to the present invention, a method of determining a context model related to encoding/decoding of coefficients may be changed.

When a scanning and/or grouping method according to the present invention is applied, in order to select a context model for encoding/decoding CSBF, CSBF of a CG in which encoding/decoding is performed just before based on a current encoding/decoding target CG may be referenced. Alternatively, in order to encode/decode CSBF, at least one CG among CGs within a current TU may be referenced. Herein, the referenced CG may be selected regardless a position thereof within the TU.

Figure 41:
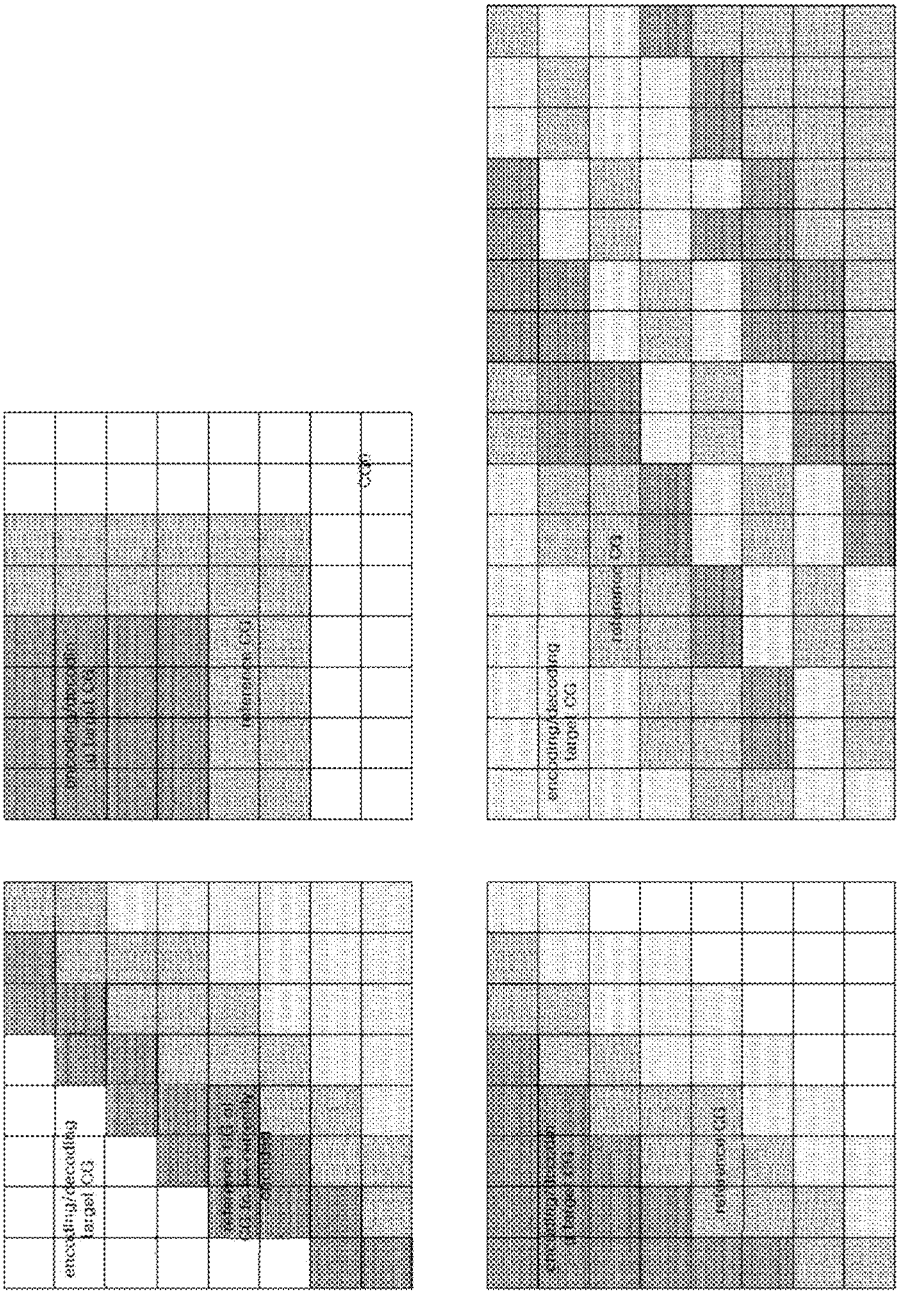
FIG. 41 is an example of showing a reference CG when encoding/decoding CSBF of a current CG in an 8×8 TU to which a scanning and/or a grouping method according to the present invention is applied.

FIG. 41 is an example of showing a referenced CG when encoding/decoding CSBF of a current CG in an 8×8 TU to which a scanning and/or a grouping method according to the present invention is applied.

In a scanning order, a context increment of CSBF may be selected based on a CSBF value of a CG that is encoded/decoded just before a current encoding/decoding target CG. Context information for encoding/decoding CSBF of the current CG may be obtained based on the selected context increment. The probability whether or not a coefficient not being 0 is present in the just previous CG may affect the probability whether or not a coefficient not being 0 is present in a current CG. Accordingly, the probability of a CSBF value of the just previous CG may affect the probability of a CBSF value of the current CG. When the current CG is the first CG in a scanning order (CG including a coefficient of an AC position) or when CSBF of just previously encoded/decoded CG is 0, a context increment for encoding/decoding CSBF of the current CG may be set to 0, otherwise, the context increment may be set to 1.

In addition, a method of determining a context model of sig_coeff_flag may be changed.

Figure 42:
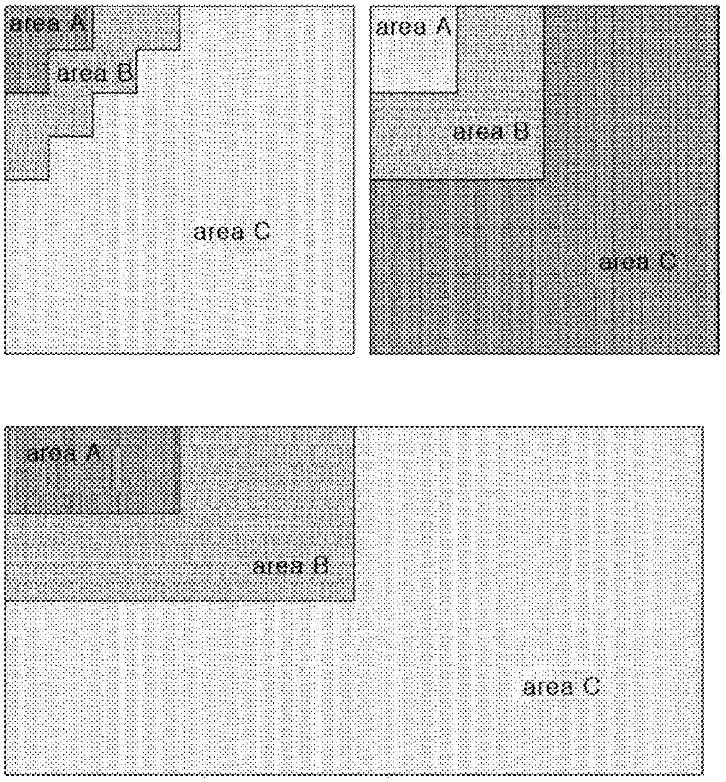
FIG. 42 is a view showing a method of referencing a context model for encoding/decoding sig_coeff_flag according to a position of a coefficient within a TU when a scanning and/or a grouping method according to the present invention is applied.

FIG. 42 is a view showing a method of referencing a context model for encoding/decoding sig_coeff_flag according to a position of a coefficient within a TU when a scanning and/or grouping method according to the present invention is applied.

For example, when a scanning and/or grouping method according to the present invention is applied, a context may be selected based on a position of each coefficient within a TU as shown in FIG. 42 rather than using CSBF of a neighboring CG when selecting a context model for encoding/decoding sig_coeff_flag of each coefficient within a current CG.

For example, since the TU may be divided into a plurality of areas, the same context increment may be used for a single area. The plurality of areas may be determined based on one-Nth of a horizontal length and/or one-Mth of a vertical length of the TU. N and M may be a positive integer greater than 0, and N and M may be identical or different from each other.

As shown in FIG. 42, each TU may be divided into at least two areas. For example, in FIG. 42, each TU is divided into three areas (area A, area B, and area C).

For example, an area A may be an area including a position in which a horizontal coordinate is smaller than one-fourth of a horizontal length of the TU, and a vertical coordinate is smaller than one-fourth of a vertical length of the TU. Alternatively, it may be an area including a position in which the summation of a horizontal coordinate and a vertical coordinate is smaller than one-fourth of a horizontal length or a vertical length of the TU. The same context increment may be used for coefficients included in the area A.

An area B may be defined among the TU excluding the area A. For example, the area B may be an area including a position in which a horizontal coordinate is smaller than one-half of a horizontal length of the TU and a vertical coordinate is smaller than one-half of a vertical length of the TU. Alternatively, it may be an area including a position in which the summation of a horizontal coordinate and a vertical coordinate is smaller than one-half of a horizontal length or a vertical length of the TU. The same context increment may be used for coefficients included in the area B.

An area C may be defined as the remaining part in the TU excluding the area A and the area B. The same context increment may be used for coefficients included in the area C.

When the context increment becomes larger, it is may refer that the probability of a sig_coeff_flag occurrence becomes high. Herein, the area may have a shape of at least one of a square, a rectangle, a triangle, and a pentagon. The area may be determined based on a characteristic of the TU (for example, a block size, a block shape, a depth, a prediction mode (inter or intra), an intra prediction mode, a transform type, a component (luma or chroma)).

In addition, sig_coeff_flag may be encoded/decoded without using a context model. For example, the context model may not be used to reduce the complexity of an encoder/decoder.

As described above, according to the present invention, an efficient scanning and/or grouping method of coefficients within an encoding/decoding target TU may be provided. Transformed and/or quantized coefficients generated by inter prediction are distributed and more concentrated close to a DC component than transformed and/or quantized coefficients generated by intra prediction. In addition, an amount of a generated residual signal amount may be reduced by performing efficient prediction (intra prediction or inter prediction). This may have an effect on transformed and/or quantized coefficients being more concentrated close to the DC component.

However, according to a conventional scanning and grouping method, efficiency may decrease when coefficients within a TU block are concentrated close to a DC component. According to the present invention, coefficients within a TU may be scanned and/or grouped in a diagonal or zigzag order based on the TU. When the scanning method according to the present invention is applied, coefficient values arranged in one dimension are steadily decreased, thus efficiency in terms of entropy encoding may be increased. In addition, when the grouping method according to the present invention is applied, coefficients positioned at a high frequency and which have high chance to be 0 are grouped into a single group according to a distribution characteristic of coefficients within the TU, thus there may be generated many groups in which all coefficients are 0 within each group. Accordingly, a syntax element and/or a flag required for encoding coefficients within a group may be saved, and a bit amount is also reduced.

The intra encoding/decoding process may be performed for each of luma and chroma signals. For example, in the intra encoding/decoding process, at least one method of deriving an intra prediction mode, dividing a block, constructing reference samples and performing intra prediction may be differently applied for a luma signal and a chroma signal.

The intra encoding/decoding process may be equally performed for luma and chroma signals. For example, in the intra encoding/decoding process being applied for the luma signal, at least one of deriving an intra prediction mode, dividing a block, constructing reference samples and performing intra prediction may be equally applied to the chroma signal.

The methods may be performed in the encoder and the decoder in the same manner. For example, in the intra encoding/decoding process, at least one method of deriving an intra prediction mode, dividing a block, constructing reference samples and performing intra prediction may be applied in the encoder and the decoder equally. In addition, orders of applying the methods may be different in the encoder and the decoder. For example, in performing intra encoding/decoding for the current block, an encoder may encode an intra prediction mode determined by performing at least one intra prediction after constructing reference samples.

The embodiments of the present invention may be applied according to the size of at least one of a coding block, a prediction block, a block, and a unit. Here, the size may be defined as the minimum size and/or the maximum size in order to apply the embodiments, and may be defined as a fixed size to which the embodiment is applied. In addition, a first embodiment may be applied in a first size, and a second embodiment may be applied in a second size. That is, the embodiments may be multiply applied according to the size. In addition, the embodiments of the present invention may be applied only when the size is equal to or greater than the minimum size and is equal to or less than the maximum size. That is, the embodiments may be applied only when the block size is in a predetermined range.

For example, only when the size of the encoding/decoding target block is equal to or greater than 8×8, the embodiments may be applied. For example, only when the size of the encoding/decoding target block is equal to or greater than 16×16, the embodiments may be applied. For example, only when the size of the encoding/decoding target block is equal to or greater than 32×32, the embodiments may be applied. For example, only when the size of the encoding/decoding target block is equal to or greater than 64×64, the embodiments may be applied. For example, only when the size of the encoding/decoding target block is equal to or greater than 128×128, the embodiments may be applied. For example, only when the size of the encoding/decoding target block is 4×4, the embodiments may be applied. For example, only when the size of the encoding/decoding target block is equal to or less than 8×8, the embodiments may be applied. For example, only when the size of the encoding/decoding target block is equal to or greater than 16×16, the embodiments may be applied. For example, only when the size of the encoding/decoding target block is equal to or greater than 8×8 and is equal to or less than 16×16, the embodiments may be applied. For example, only when the size of the encoding/decoding target block is equal to or greater than 16×16 and is equal to or less than 64×64, the embodiments may be applied.

The embodiments of the present invention may be applied according to a temporal layer. An identifier for identifying the temporal layer to which the embodiment can be applied may be signaled, and the embodiments may be applied for the temporal layer specified by the identifier. Here, the identifier may be defined as indicating the minimum layer and/or the maximum layer to which the embodiment can be applied, and may be defined as indicating a particular layer to which the embodiment can be applied.

For example, only when the temporal layer of the current picture is the lowest layer, the embodiments may be applied. For example, only when a temporal layer identifier of the current picture is zero, the embodiments may be applied. For example, only when the temporal layer identifier of the current picture is equal to or greater than one, the embodiments may be applied. For example, only when the temporal layer of the current picture is the highest layer, the embodiments may be applied.

As described in the embodiment of the present invention, a reference picture set used in processes of reference picture list construction and reference picture list modification may use at least one of reference picture lists L0, L1, L2, and L3.

According to the embodiments of the present invention, when a deblocking filter calculates boundary strength, at least one to at most N motion vectors of the encoding/decoding target block may be used. Here, N indicates a positive integer equal to or greater than 1 such as 2, 3, 4, etc.

In motion vector prediction, when the motion vector has at least one of a 16-pixel (16-pel) unit, a 8-pixel (8-pel) unit, a 4-pixel (4-pel) unit, an integer-pixel (integer-pel) unit, a ½-pixel (½-pel) unit, a ¼-pixel (¼-pel) unit, a ⅛-pixel (⅛-pel) unit, a 1/16-pixel (1/16-pel) unit, a 1/32-pixel (1/32-pel) unit, and a 1/64-pixel (1/64-pel) unit, the embodiments of the present invention may be applied. In addition, in performing motion vector prediction, the motion vector may be optionally used for each pixel unit.

A slice type to which the embodiments of the present invention may be defined and the embodiments of the present invention may be applied according to the slice type.

For example, when the slice type is a T (Tri-predictive)-slice, a prediction block may be generated by using at least three motion vectors, and may be used as the final prediction block of the encoding/decoding target block by calculating a weighted sum of at least three prediction blocks. For example, when the slice type is a Q (Quad-predictive)-slice, a prediction block may be generated by using at least four motion vectors, and may be used as the final prediction block of the encoding/decoding target block by calculating a weighted sum of at least four prediction blocks.

The embodiment of the present invention may be applied to inter prediction and motion compensation methods using motion vector prediction as well as inter prediction and motion compensation methods using a skip mode, a merge mode, etc.

The shape of the block to which the embodiments of the present invention is applied may have a square shape or a non-square shape.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:

1. An image encoding method, comprising:

determining a prediction mode for a current block;

performing prediction for the current block using the prediction mode;

determining a transform kernel of the current block;

generating at least one coefficient of the current block by performing a transform on residual samples of the current block, based on the transform kernel; and encoding transform kernel information indicating the transform kernel of the current block and the at least one coefficient, wherein the transform comprises a primary transform and a secondary transform, the at least one coefficient is generated by performing the secondary transform on a result of the primary transform using the transform kernel, the transform kernel information indicates one of predefined transform kernel sets, each of the predefined transform kernel sets comprises a predefined horizontal transform kernel and a predefined vertical transform kernel, the transform kernel of the current block comprises a horizontal transform kernel and a vertical transform kernel, and the horizontal transform kernel and the vertical transform kernel are determined based on a size of the current block, whether inter prediction is used for the prediction for the current block or not and whether intra prediction is used for the prediction for the current block or not.

2. The image encoding method of claim 1, wherein the transform kernel information is index information indicating one of the predefined transform kernel sets.

3. The image encoding method of claim 1, wherein the transform kernel information is encoded when the size of the current block is less than or equal to a predefined size.

4. The image encoding method of claim 1, wherein the transform kernel information is encoded when a non-zero transform coefficient exists in the current block.

5. A non-transitory computer-readable recording medium storing a bitstream generated by a processor performing the image encoding method of claim 1 to configure the non-transitory computer-readable recording medium, wherein the encoded transform kernel information is stored in the non-transitory computer-readable recording medium.

6. A non-transitory computer-readable recording medium having recorded thereon a bitstream generated by a processor performing the image encoding method according to claim 1 to result in the non-transitory computer-readable recording medium comprising the bitstream, wherein the encoded transform kernel information is stored in the non-transitory computer-readable recording medium as a part of the bitstream.

7. An image decoding method, comprising:

determining a prediction mode for a current block;

performing prediction for the current block using the prediction mode; and performing a transform on at least one coefficient of the current block, based on a transform kernel, to generate residual samples, wherein the transform comprises a primary transform and a secondary transform, the residual samples are generated by performing the primary transform using the transform kernel on a result of the secondary transform which is performed on the at least one coefficient, transform kernel information is obtained from a bitstream, the transform kernel information indicates one of predefined transform kernel sets as the transform kernel of the current block, each of the predefined transform kernel sets comprises a predefined horizontal transform kernel and a predefined vertical transform kernel, the transform kernel of the current block comprises a horizontal transform kernel and a vertical transform kernel, and the horizontal transform kernel and the vertical transform kernel of the transform kernel of the current block are determined based on a size of the current block, whether inter prediction is used for the prediction for the current block or not and whether intra prediction is used for the prediction for the current block or not.

8. The image decoding method of claim 7, wherein the transform kernel information is index information indicating one of the predefined transform kernel sets.

9. The image decoding method of claim 7, wherein the transform kernel information is decoded when the size of the current block is less than or equal to a predefined size.

10. The image decoding method of claim 7, wherein the transform kernel information is decoded when a non-zero transform coefficient exists in the current block.

11. A non-transitory computer-readable recording medium storing a bitstream, wherein the bitstream is configured to be decoded by an image decoding method, the image decoding method comprising:

determining a prediction mode for a current block;

performing prediction for the current block using the prediction mode;

determining a transform kernel of the current block; and performing a transform on at least one coefficient of the current block, based on the transform kernel, to generate residual samples, wherein the transform comprises a primary transform and a secondary transform, the residual samples are generated by performing the primary transform using the transform kernel on a result of the secondary transform which is performed on the at least one coefficient, transform kernel information is obtained from the bitstream, the transform kernel information indicates one of predefined transform kernel sets as the transform kernel of the current block, each of the predefined transform kernel sets comprises a predefined horizontal transform kernel and a predefined vertical transform kernel, the transform kernel of the current block comprises a horizontal transform kernel and a vertical transform kernel, and the horizontal transform kernel and the vertical transform kernel of the transform kernel of the current block are determined based on a size of the current block, whether inter prediction is used for the prediction for the current block or not and whether intra prediction is used for the prediction for the current block or not.

12. The non-transitory computer-readable recording medium of claim 11, wherein the transform kernel information is index information indicating one of the predefined transform kernel sets.

13. The non-transitory computer-readable recording medium of claim 11, wherein the transform kernel information is encoded when the size of the current block is less than or equal to a predefined size.

14. A method of transmitting a bitstream, the method comprising:

obtaining a bitstream comprising transform kernel information; and transmitting the bitstream, wherein the bitstream is structured to be decoded by an image decoding method, the bitstream is used to determine a prediction mode for a current block, the prediction mode is information used to perform prediction for the current block, the bitstream is used to determine a transform kernel of the current block, the transform kernel is used to perform a transform on at least one coefficient of the current block to generate residual samples, the transform comprises a primary transform and a secondary transform, the residual samples are generated by performing the primary transform using the transform kernel on a result of the secondary transform which is performed on the at least one coefficient, the transform kernel information indicates one of predefined transform kernel sets as the transform kernel of the current block, each of the predefined transform kernel sets comprises a predefined horizontal transform kernel and a predefined vertical transform kernel, the transform kernel of the current block comprises a horizontal transform kernel and a vertical transform kernel, and the horizontal transform kernel and the vertical transform kernel of the transform kernel of the current block are determined based on a size of the current block, whether inter prediction is used for the prediction for the current block or not and whether intra prediction is used for the prediction for the current block or not.

15. The method of claim 14, wherein the transform kernel information is index information indicating one of the predefined transform kernel sets.

16. The method of claim 14, wherein the transform kernel information is encoded when the size of the current block is less than or equal to a predefined size.

17. The method of claim 14, wherein the transform kernel information is encoded when a non-zero transform coefficient exists in the current block.

18. A non-transitory computer-readable recording medium storing a bitstream representing an encoded image, the bitstream comprising:

transform kernel information of a current block, wherein the bitstream is decoded by an image decoding method comprising:

determining a prediction mode for the current block;

performing prediction for the current block using the prediction mode; and performing a transform on at least one coefficient of the current block, based on a transform kernel, to generate residual samples, wherein the transform comprises a primary transform and a secondary transform, the residual samples are generated by performing the primary transform using the transform kernel on a result of the secondary transform which is performed on the at least one coefficient, the transform kernel information indicates one of predefined transform kernel sets as the transform kernel of the current block, each of the predefined transform kernel sets comprises a predefined horizontal transform kernel and a predefined vertical transform kernel, the transform kernel of the current block comprises a horizontal transform kernel and a vertical transform kernel, and the horizontal transform kernel and the vertical transform kernel of the transform kernel of the current block are determined based on a size of the current block, whether inter prediction is used for the prediction for the current block or not and whether intra prediction is used for the prediction for the current block or not.

19. The non-transitory computer-readable recording medium of claim 18, wherein the transform kernel information is index information indicating one of the predefined transform kernel sets.

20. The non-transitory computer-readable recording medium of claim 18, wherein the transform kernel information is encoded when the size of the current block is less than or equal to a predefined size.

* * * * *